United States Patent [19]
Onishi et al.

[11] Patent Number: 5,643,471
[45] Date of Patent: Jul. 1, 1997

[54] LIQUID CRYSTAL DEVICE AND METHOD FOR PRODUCING THE SAME

[75] Inventors: Noriaki Onishi, Nara; Masayuki Okamoto, Tenri; Toshiyuki Hirai, Kashihara; Nobuaki Yamada, Higashiosaka; Nobukazu Nagae, Tenri; Masahiko Kondo, Nara-ken; Shin-ichi Terashita, Tenri, all of Japan

[73] Assignee: Sharp Kabushiki Kaisha, Osaka, Japan

[21] Appl. No.: 555,728

[22] Filed: Nov. 9, 1995

[30] Foreign Application Priority Data

| Nov. 9, 1994 | [JP] | Japan | 6-275422 |
| Feb. 7, 1995 | [JP] | Japan | 7-019604 |
| Nov. 2, 1995 | [JP] | Japan | 7-310130 |

[51] Int. Cl.$^6$ ........................... B44C 1/22
[52] U.S. Cl. .............. 216/23; 216/33; 216/41; 349/84; 349/155
[58] Field of Search ............... 216/23, 33, 41; 359/53, 62, 67, 81; 428/1

[56] References Cited

U.S. PATENT DOCUMENTS

| 4,874,461 | 10/1989 | Sato et al. ........................ 216/23 |
| 5,425,848 | 6/1995 | Haisma et al. ..................... 216/23 |

FOREIGN PATENT DOCUMENTS

| 58-501631 | 9/1983 | Japan . |
| 59-222817 | 12/1984 | Japan . |
| 61-173223 | 8/1986 | Japan . |
| 61-184518 | 8/1986 | Japan . |
| 61-502128 | 9/1986 | Japan . |
| 62-240930 | 10/1987 | Japan . |
| 63-33730 | 2/1988 | Japan . |
| 64-61729 | 3/1989 | Japan . |
| 1-233421 | 9/1989 | Japan . |
| 1-239527 | 9/1989 | Japan . |
| 3-94230 | 4/1991 | Japan . |
| 4-338923 | 2/1992 | Japan . |
| 4-212928 | 8/1992 | Japan . |
| 5-27242 | 2/1993 | Japan . |
| 5-224919 | 9/1993 | Japan . |
| 6-175133 | 6/1994 | Japan . |
| 6-194672 | 7/1994 | Japan . |
| 6-301040 | 10/1994 | Japan . |
| WO83/01016 | 3/1983 | WIPO . |
| WO85/04262 | 9/1985 | WIPO . |

*Primary Examiner*—William Powell
*Attorney, Agent, or Firm*—Nixon & Vanderhye P.C.

[57] ABSTRACT

A liquid crystal device of the present invention includes a pair of substrates opposed to each other with a composite containing polymer regions and liquid crystal regions interposed therebetween, at least one of the substrates being transparent, wherein an insulator as a gap keeping member for keeping a gap between the substrates is formed in the polymer regions.

56 Claims, 50 Drawing Sheets

$\gamma_{LC} > \gamma_M$ $\gamma_{ITO} > \gamma_P$ $\gamma_{LC} < \gamma_M$

FIG.12A
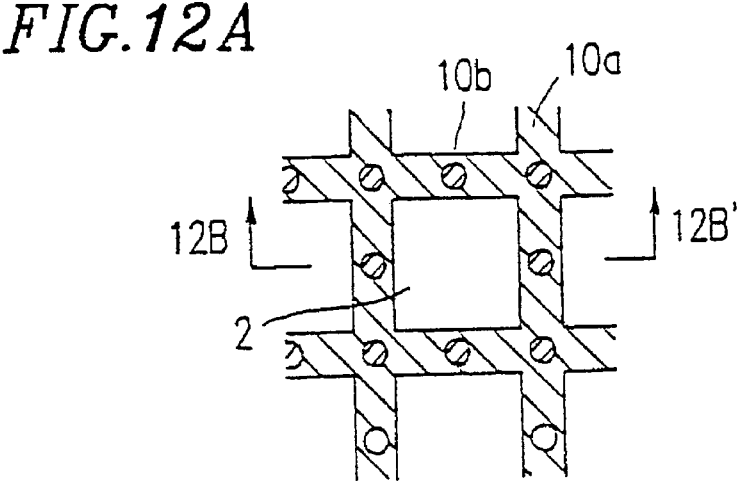
FIG.12B
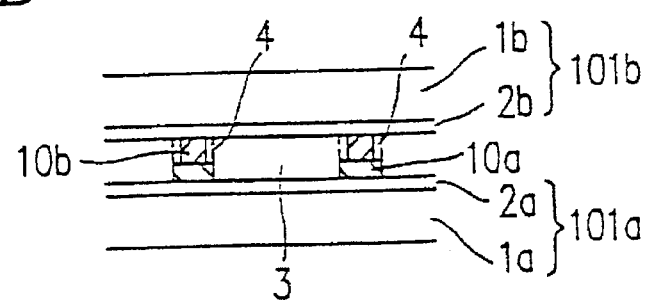
FIG.12C
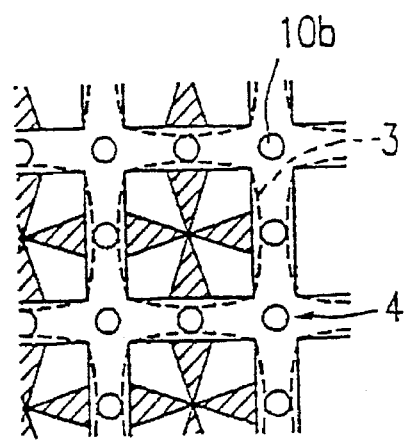
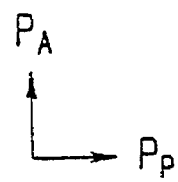

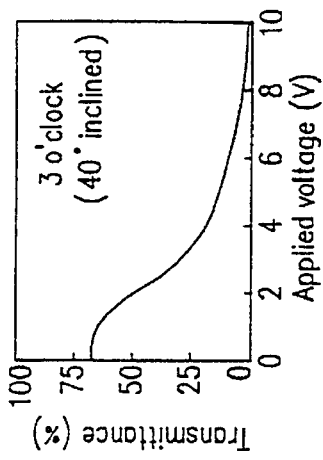
FIG.14A
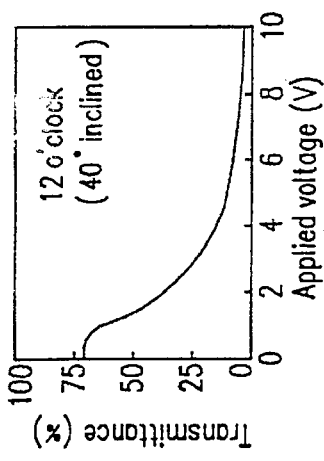
FIG.14B
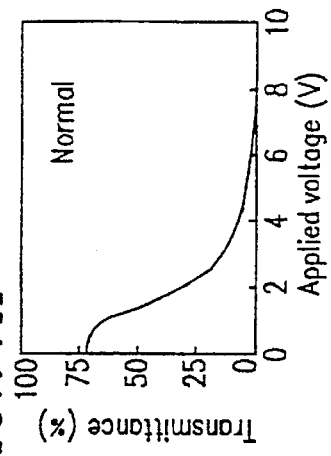
FIG.14C (should be at bottom)
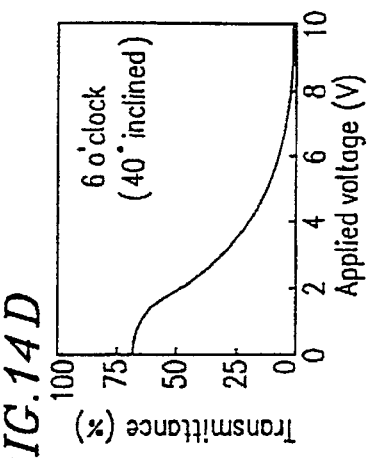
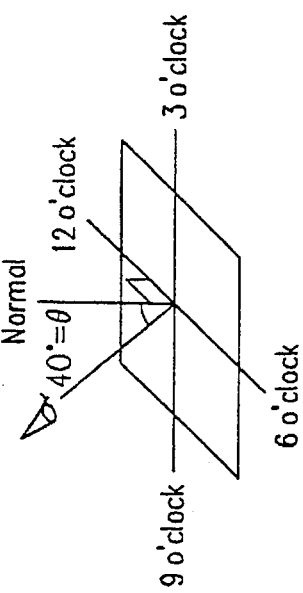
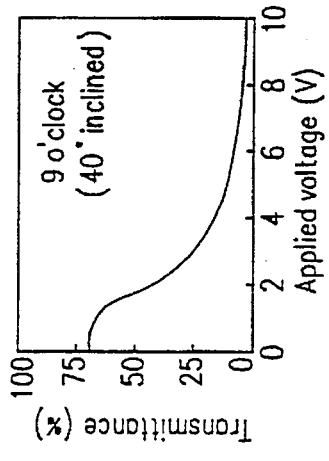

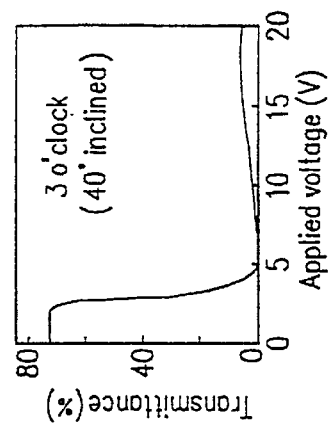
FIG.15A
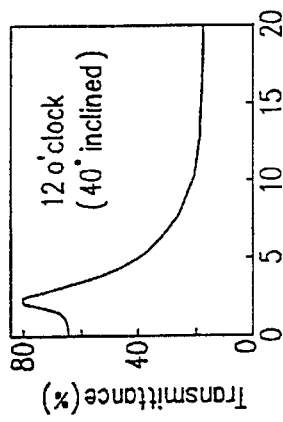
FIG.15B
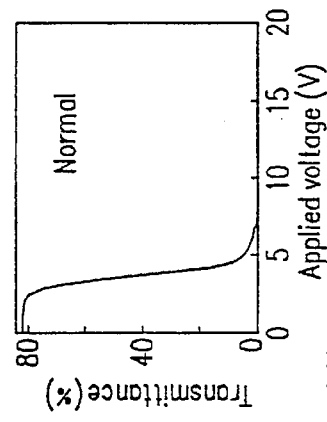
FIG.15C
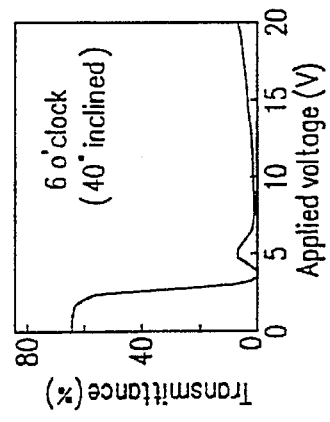
FIG.15D
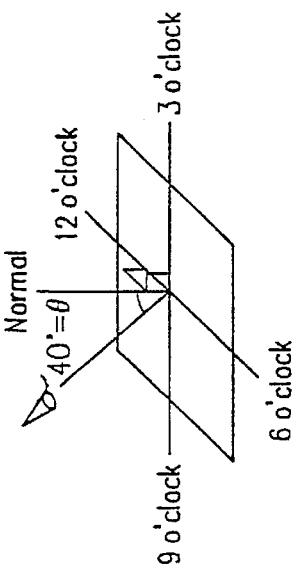
FIG.15E
FIG.15F
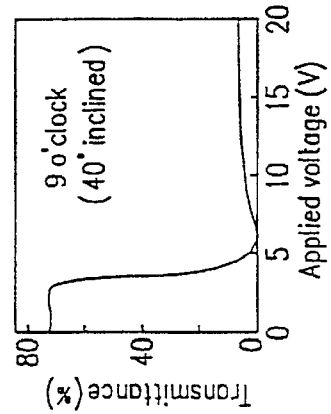

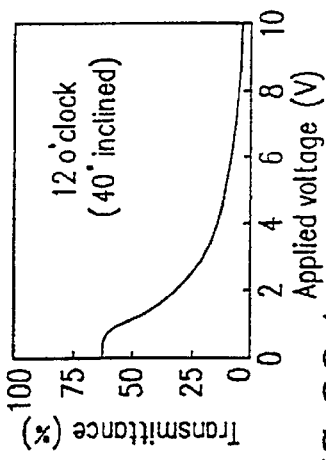
FIG.36B
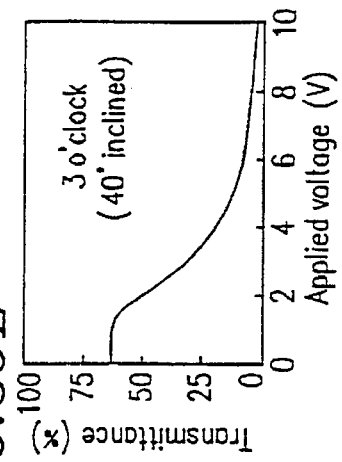
FIG.36A
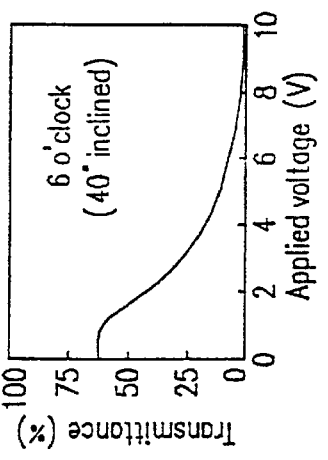
FIG.36E
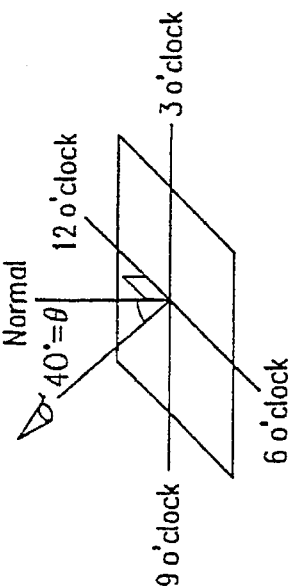
FIG.36F
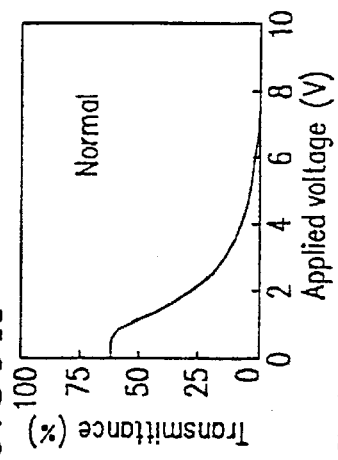
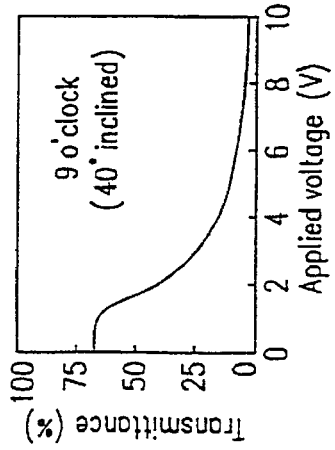
FIG.36C
FIG.36D FIG.61A
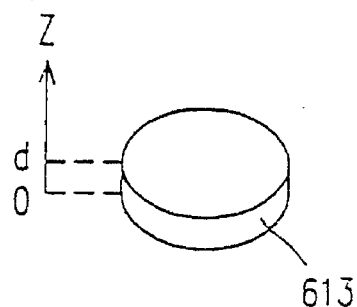
FIG.61B
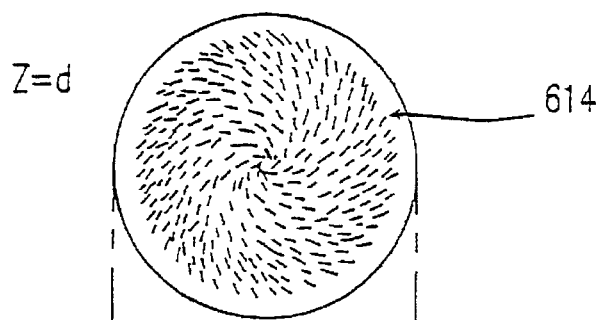
FIG.61C
FIG.61D
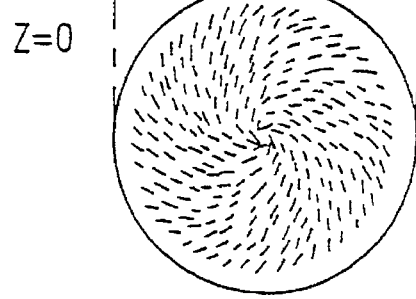

LIQUID CRYSTAL DEVICE AND METHOD FOR PRODUCING THE SAME

BACKGROUND OF THE INVENTION

1. Field of the Invention

The present invention relates to a liquid crystal display device equipped with a flat display, such as a portable information terminal, a personal computer, a word processor, amusement equipment, and TV sets, viewed by a plurality of people; and a liquid crystal device used for a display plate, a window, a door, a wall, or the like utilizing a shutter effect and a method for producing the same.

2. Description of the Related Art

Conventionally, liquid crystal devices utilizing various display modes have been developed for commercial use; for example, a TN (twisted nematic) mode, an STN (super twisted nematic) mode, and the like performing a display utilizing electro-optic effects of a birefringent mode, and using nematic liquid crystal have been generally used. These modes require the use of polarizing plates and alignment treatment. Liquid crystal molecules in liquid crystal devices under these modes have a pretilt in an initial orientation state as shown in FIG. 58A. As shown in FIG. 58B, the liquid crystal molecules rise in the same direction when a voltage is applied to a cell. Because of this, an apparent refractive index and a display contrast vary depending upon viewing directions A and B. Furthermore, a display quality remarkably decreases depending upon viewing angles in gray scales as shown in FIG. 58B; specifically, inversion phenomenon and the like occur. In recent years, liquid crystal devices driven in an FCL (ferroelectric liquid crystal) display mode have been marketed. FIG. 58C shows the case where a saturated voltage is applied.

In recent years, devices not requiring polarizing plates and alignment treatment have been proposed. In such devices, a transparent state or an opaque state is electrically controlled using the birefringence of liquid crystal molecules. According to this method, the ordinary refractive index of liquid crystal molecules is matched with the refractive index of a supporting medium, and a transparent state is displayed when the liquid crystal molecules are aligned under the application of a voltage and an opaque state (light scattering state) is displayed when the orientation of the liquid crystal molecules is disturbed under no application of a voltage.

As examples of the above-mentioned method, Japanese National Publication No. 58-501631 discloses a method for including liquid crystal in polymer capsules and Japanese National Publication No. 61-502128 discloses a method in which liquid crystal and a photocurable resin or a thermosetting resin are mixed and the resin is cured, whereby the liquid crystal is deposited to form liquid crystal droplets in the resin. Devices produced by these methods are called polymer dispersed liquid crystal devices.

As a device having improved viewing angle characteristics using polarizing plates, Japanese Laid-Open Patent Publication Nos. 4-338923 and 4-212928 disclose a device in which the above-mentioned polymer dispersed liquid crystal device is interposed between polarizing plates positioned so that polarizing axes are orthogonal to each other. This device has an effect of improving viewing angle characteristics; however, it utilizes depolarization due to light scattering, so that brightness is as much as ½ lower as that of a TN-mode. Thus, this device has low use importance.

Furthermore, Japanese Laid-Open Patent Publication No. 5-27242 discloses a method in which the orientation state of liquid crystals is disturbed with polymer walls and projections to form random domains, whereby viewing angle characteristics are improved. However, according to this method, since domains are random and a polymer material comes in pixel portions, light transmittance under no application of a voltage is low. In addition, since disclination lines are randomly formed between liquid crystal domains and do not disappear under the application of a voltage, a black level under the application of a voltage is low. For these reasons, this device has a low contrast.

The applicant of the present application proposes a liquid crystal device in which liquid crystal molecules are axis-symmetrically aligned in polymer walls 4. Such a device is obtained by irradiating UV-rays having a regular irradiation pattern to a liquid crystal cell with a mixture of liquid crystal and a resin material injected thereto and allowing the liquid crystal and the resin material to be regularly phase-separated. In this device, as shown in FIG. 58D, since liquid crystal molecules $3a$ are axis-symmetrically aligned in liquid crystal regions 3, a display contrast does not change and hence, inversion phenomenon does not occur even when the cell is observed in different viewing directions A and B as shown in FIG. 58E, viewing angle characteristics can be remarkably improved. FIG. 58F shows the case where a saturated voltage is applied.

In liquid crystal devices, particularly those in a birefringence mode using an optical rotatory power of a liquid crystal material as described above, inconsistencies in the cell gap (gap between substrates) cause display inconsistencies, color inconsistencies, and interference streaks to degrade display quality. When electrodes formed on the respective substrates come into contact with each other when the cell gap is narrowed by an external force, a display becomes impossible, and damages and short-circuit of a drive circuit are caused, so that controlling the cell gap so as to keep it uniform is very important.

In order to keep the cell gap uniform, inorganic substances such as glass fibers and glass beads and LCD spacers such as a particulate particle size controlling material made of an organic substance are generally used. It is necessary that these LCD spacers are used typically at a distribution density of about 15 to 100/mm$^3$ in order to keep the cell gap uniform.

However, when spacers are present in pixels, they sometimes adversely affect display quality. For example, in a liquid crystal device in a normally white mode, when spacers are present in pixels, light passing through the spacers is always shielded by a polarizing plate on a light outputting side; therefore, a substantial opening ratio of the device decreases. On the other hand, in a liquid crystal device in a normally black mode, light passing through the spacers is not completely shielded during a black display by a polarizing plate on a light outputting side; therefore, light leakage is caused. Furthermore, it is confirmed that when remaining spacers are distributed while nonuniformly aggregating in pixels, these spacers affect the uniform orientation of liquid crystal molecules to allow disclination lines to be formed. In any of these cases, there has been the problem of decrease in contrast.

Japanese Laid-Open Patent Publication Nos. 1-233421 and 1-239527 disclose that a polymer resin is patterned in an island shape as spacers in order to keep a cell gap uniform without providing spacers in pixels. According to this method, it is possible to keep the cell gap uniform and light leakage can be prevented because of the absence of spacers in pixels. Japanese Laid-Open Patent Publication No.

64-61729 discloses a method in which a cell gap controlling material is mixed in a sealant, and only the sealant portion is pressed to attach liquid crystal substrates to each other. Japanese Laid-Open Patent Publication Nos. 61-173223, 61-184518, and 62-240930 disclose a method in which a photosensitive resin or a polymer resin is patterned to a predetermined thickness on a substrate, whereby a stripe-shaped "adductor" structure is provided thereon so as to work as spacers. Furthermore, Japanese Laid-Open Patent Publication No. 63-33730 discloses a method in which a black light shielding film is provided in gaps between pixels of a three-color filter, and the black light shielding film is provided with projections so as to work as spacers.

According to the above-mentioned methods, although spacers for keeping a cell gap can be realized, strength and shock resistance cannot be provided over a large area. Furthermore, in liquid crystal devices in which polymer walls completely surround liquid crystal regions so as to minimize the change in orientation by an external pressure, a liquid crystal material cannot be subsequently injected into the devices.

Japanese Laid-Open Patent Publication Nos. 59-222817, 3-94230, 6-194672, and 6-175133 disclose liquid crystal panels in which spacers are provided only in regions outside pixels, obtained by a photolithography process such as light exposure, development, and peeling of a photosensitive material including spherical spacers or the like, and a method for producing the same. Japanese Laid-Open Patent Publication No. 6-301040 discloses a technology in which a light-shielding film with openings is provided between a plurality of electrodes, and a photosensitive resin is exposed to light through these openings from a reverse side, whereby spacers are fixed. However, according to these technologies, since openings or regions having a low light-shielding property are formed in the light-shielding film including signal lines, contrast characteristics of an image decrease. In addition, these technologies use an alignment film formed by an alignment treatment such as rubbing for uniformly aligning liquid crystal molecules in a liquid crystal layer; therefore, an electrical breakdown is produced in active matrix devices by static electricity generated during the alignment treatment. Furthermore, when an alignment film formed in pixel regions by an alignment treatment directly comes into contact with a chemical such as a developer while a resist or the like is developed and peeled off, there is a possibility that the alignment of liquid crystal molecules and the reliability of a liquid crystal device are adversely affected.

In order to improve a display quality of liquid crystal regions, the applicant of the present application disclosed liquid crystal devices in which liquid crystal regions with liquid crystal molecules uniformly aligned therein by rubbing treatment and polymer regions are formed by polymerization and phase separation. More specifically, Japanese Patent Application No. 6-49335 discloses a technology related to a structure in which a cell gap controlling material is present in polymer walls, and Japanese Patent Application No. 6-229946 discloses a technology related to a structure in which pressure resistance of polymer walls including a cell gap controlling material is improved.

According to a method proposed by the applicant of the present application in Japanese Patent Application No. 5-30996, liquid crystal domains or liquid crystal molecules in pixel regions are axis-symmetrically aligned to realize omnidirectional viewing angle characteristics. In this liquid crystal device, for example, as shown in FIGS. 58D and 58E, liquid crystal molecules rise in the direction of each wall by the interaction between the liquid crystal molecules and the polymer walls under the application of a voltage, so that an apparent refractive index becomes almost the same in viewing directions A and B. Thus, this method has a great effect on the improvement of viewing angle characteristics. However, in order to improve viewing angle characteristics most effectively, liquid crystal molecules are required to be uniformly aligned in an axis-symmetrical manner in pixels. This makes it necessary to control cores around which liquid crystal domains are formed. Thus, it is also effective to regulate the formation of polymer walls or to form an alignment film having spherulite nulei capable of inducing the axis-symmetrical orientation of liquid crystal molecules by generating liquid crystal cores during a non-rubbing process.

Even in a method proposed by the applicant of the present application in Japanese Patent Application No. 5-30996, in a liquid crystal layer interposed between two substrates 591a and 591b, regions 16 including liquid crystal and a polymer are present between electrodes (2a and 2b) on substrates (1a and 1b) and liquid crystal regions 3 as shown in FIG. 59. Therefore, light leakage is caused by birefringence of liquid crystal molecules taken in polymer regions 4 under the application of a saturated voltage and/or liquid crystal and a polymer are not phase-separated completely. Under these circumstances, a higher degree of control of phase separation has been demanded. Furthermore, liquid crystal devices of high image quality have been demanded. In FIG. 59, the reference numeral 15 denotes a patterned polymer and the reference numeral 16 denotes adhesion (invasion) of the polymer to the liquid crystal regions 3.

Furthermore, in the case where spacers such as beads are present in pixels in order to keep a cell gap uniform, the disturbance of the orientation of liquid crystal molecules with respect to the beads is observed. In this case, an orientation state as shown in a polarizing microscope photograph of FIG. 60 is obtained; specifically, symmetry axes of axis-symmetrical orientation of liquid crystal molecules are tilted or positions of axes are shifted. When the device is observed by changing viewing directions, an area of regions corresponding to portions 7 which look black in a viewing angle direction increases in one pixel, average transmittance becomes different from that of other pixels. This is observed as roughness in a display image as a whole. Thus, in this device, it is required to strictly control symmetry axes of the orientation of the liquid crystal molecules. In any event, LCDs of higher quality are demanded.

SUMMARY OF THE INVENTION

The liquid crystal device of this invention, includes a pair of substrates opposed to each other with a liquid crystal layer interposed therebetween, at least one of the substrates being transparent, wherein spacers covered with a light-shielding layer, provided so as to stipulate a size of each pixel, form a gap keeping member for keeping a gap between the substrates, and liquid crystal molecules in the pixels are aligned in at least two directions, axis-symmetrically, or at random.

In one embodiment of the invention, an insulator as the gap keeping member is formed outside the pixels.

Alternatively, the liquid crystal device of the present invention includes a pair of substrates opposed to each other with a composite containing polymer regions and liquid crystal regions interposed therebetween, at least one of the substrates being transparent, wherein spacers are present in the polymer regions outside pixels.

In one embodiment of the invention, liquid crystal molecules in the liquid crystal regions are aligned in at least two directions, axis-symmetrically, or at random.

Alternatively, the liquid crystal device of the present invention includes a pair of substrates opposed to each other with a composite containing polymer regions and liquid crystal regions interposed therebetween, at least one of the substrates being transparent, wherein an insulator as gap keeping member for keeping a gap between the substrates is formed in the polymer regions.

In one embodiment of the invention, liquid crystal molecules in the liquid crystal regions are aligned in at least two directions, axis-symmetrically, or at random.

In another embodiment of the invention, the insulator as the gap keeping member is composed of at least one layer.

In another embodiment of the invention, at least one of the insulator is composed of a photosensitive resin layer.

In another embodiment of the invention, at least one layer of the insulator is composed of a polymer film.

In another embodiment of the invention, the polymer film is composed of a dry film made of a photosensitive resin composition or a photosensitive polymer.

In another embodiment of the invention, polymer walls made of a polymer film or a polymer sheet for partitioning the pixels are provided outside the pixels.

In another embodiment of the invention, the polymer film is exposed to light and developed so as to be provided in a matrix.

In another embodiment of the invention, spacers as the gap keeping member are included in the polymer film.

In another embodiment of the invention, at least one pixel is surrounded by polymer walls made of the polymer film and a resin cured by phase separation of a mixture containing a photocurable resin and liquid crystal.

In another embodiment of the invention, one or a plurality of insulator is formed on either face of the polymer film.

In another embodiment of the invention, the insulator is composed of a photosensitive resin layer.

In another embodiment of the invention, the polymer film contains dyes and functions as a light-shielding layer.

Alternatively, the liquid crystal device of the present invention includes a pair of substrates opposed to each other with a composite containing polymer regions and liquid crystal regions interposed therebetween, at least one of the substrates being transparent, the liquid crystal regions forming pixels, wherein an insulator composed of at least one layer is provided in the polymer regions, and spacers previously mixed in the at least one layer keep a gap between the substrates.

In one embodiment of the invention, the pixels include at least one region in which the liquid crystal molecules are aligned in at least two directions, axis-symmetrically, or at random.

In another embodiment of the invention, in order to align the liquid crystal molecules in at least two directions, axis-symmetrically, or at random, polymer walls reaching both of the substrates are provided in the region in which the liquid crystal molecules are aligned in at least two directions, axis-symmetrically, or at random.

In another embodiment of the invention, in order to align the liquid crystal molecules in at least two directions, axis-symmetrically, or at random, either one of a convex portion and a concave portion is patterned at a center of the region in which the liquid crystal molecules are aligned in at least two directions, axis-symmetrically, or at random on at least one of the pair of substrates.

In another embodiment of the invention, in order to align the liquid crystal molecules in at least two directions, axis-symmetrically, or at random, spherulite is provided in the region in which the liquid crystal molecules are aligned in at least two directions, axis-symmetrically, or at random on at least one of the pair of substrates.

In another embodiment of the invention, spacers are provided so as to be covered with an insulator at a center of the region in which the liquid crystal molecules are aligned in at least two directions, axis-symmetrically, or at random.

In another embodiment of the invention, the spacers are fixed by a resin layer which is formed by patterning a resin with the spacers mixed therein, and a width D2 of a light-shielding layer covering the spacers satisfies a relationship: $D1+4r2<D2$, where D1 is a width of the resin layer, r2 is ½ of a length of the spacers in a width direction of the resin layer.

In another embodiment of the invention, wherein a width D of the polymer regions in which the spacers are present satisfies a relationship: $r1<A \leq D/2$, where r1 is ½ of a length of the spacers in a width direction of the polymer regions, and A is a distance from a center of the spacer in the width direction of the polymer regions to an end of the polymer regions.

In another embodiment of the invention, a width D of the layer including spacers of the insulator satisfies a relationship: $r1<A \leq D/2$, where r1 is ½ of a length of the spacers in a width direction of the layer including the spacers of the insulator, and A is a distance from a center of the spacer in the width direction of the layer including spacers of the insulator to an end of the layer including spacers of the insulator.

In another embodiment of the invention, the insulator is composed of a layer including spacers and at least one layer not including spacers, and a width D2 of the at least one layer not including spacers satisfies a relationship: $D1+4r2<D2$, where D1 is a width of the layer including the spacers, and r2 is ½ of a length of the spacers in a width direction of the layer including spacers.

In another embodiment of the invention, the insulator is composed of a layer including spacers and at least one layer not including spacers, a width D of the layer including spacers satisfies a relationship: $r1<A \leq D/2$, where r1 is ½ of a length of the spacers in a width direction of the layer including the spacers of the insulator, and A is a distance from a center of the spacer in the width direction of the layer including spacers of the insulator to an end of the layer including spacers of the insulator, and a width D2 of the at least layer not including spacers satisfies a relationship: $D1+4r2<D2$, where D1 is a width of the layer including the spacers, and r2 is ½ of a length of the spacers in a width direction of the layer including spacers.

According to another aspect of the present invention, a method for producing the above-mentioned liquid crystal device includes the steps of: forming a member for regulating orientation of a liquid crystal layer by a rubbingless process on at least one of a pair of substrates at least one of which is transparent; patterning a light-shielding layer stipulating a size of pixels on the substrate with the member for regulating orientation formed thereon or on the other substrate and patterning a polymerizable material including spacers on the light-shielding layer, thereby forming gap keeping member for keeping a gap between the substrates; attaching the pair of substrates so as to be opposed to each other to obtain a liquid crystal cell; and filling the liquid crystal cell with liquid crystal.

Alternatively, the method for producing a liquid crystal device of the present invention includes the steps of: patterning a polymerizable material including spacers on one of a pair of substrates at least one of which is transparent; attaching the pair of substrates so as to be opposed to each other and to have a uniform gap therebetween with the spacers to construct a liquid crystal cell; and filling the liquid crystal cell with a mixture containing at least a liquid crystal material and a polymerizable material, and allowing the mixture to be phase-separated by polymerization to provide polymer regions including portions corresponding to the patterned polymerizable material and liquid crystal regions in the other portions.

Alternatively, the method for producing a liquid crystal device of the present invention includes the steps of: patterning an insulator as gap keeping member composed of at least one layer on one of a pair of substrates at least one of which is transparent; attaching the pair of substrates so as to be opposed to each other and to have a uniform gap therebetween with the insulator to construct a liquid crystal cell; filling the liquid crystal cell with a mixture containing at least a liquid crystal material and a polymerizable material, and allowing the mixture to be phase-separated by polymerization to provide polymer regions including portions corresponding to the insulator and liquid crystal regions in the other portions.

In one embodiment of the invention, a photosensitive resin is used for at least one layer of the insulator as the gap keeping member.

Alternatively, the method for producing a liquid crystal device of the present invention includes the steps of: patterning an insulator composed of at least one photosensitive resin layer, at least one of which is mixed with spacers, on a pair of substrates at least one of which is transparent; attaching the pair of substrates so as to be opposed to each other and to have a uniform gap therebetween with the spacers to construct a liquid crystal cell; and filling the liquid crystal cell with a mixture containing at least a liquid crystal material and a polymerizable material, and allowing the mixture to be phase-separated by polymerization to provide polymer regions including portions corresponding to the insulator and liquid crystal regions in the other portions.

In one embodiment of the invention, in the step of allowing the mixture containing at least a liquid crystal material and a polymerizable material to be phase-separated by polymerization, the mixture is polymerized at a homogeneously miscible temperature or higher and phase-separated into the liquid crystal material and the polymerizable material, and the cell is cooled so as to regularly provide liquid crystal regions and polymer regions.

In another embodiment of the invention, in the step of allowing the mixture containing at least a liquid crystal material and a polymerizable material to be phase-separated by polymerization, the mixture is cooled from a homogeneously miscible temperature, whereby the mixture is phase-separated by polymerization into the liquid crystal material and the polymerizable material so as to regularly provide liquid crystal regions and polymer regions.

Alternatively, the liquid crystal device of the present invention includes a pair of substrates with a composite containing polymer regions and liquid crystal regions interposed therebetween, at least one of which is transparent, wherein liquid crystal molecules are axis-symmetrically aligned with respect to axes made of an insulator in pixels and spacers are provided so as to be covered with the axes.

In one embodiment of the invention, the axes made of the insulator are composed of a polymer.

Alternatively, the method for producing the above-mentioned liquid crystal device, includes the steps of: forming polymer islands including spacers on one of a pair of substrates at least one of which is transparent; attaching the pair of substrates so as to be opposed to each other and to have a uniform gap therebetween to construct a liquid crystal cell; injecting a mixture containing at least a liquid crystal material and a polymerizable material in the liquid crystal cell; and polymerizing the mixture at a homogeneously miscible temperature or higher so as to phase-separate the mixture into a liquid crystal material and a polymerizable material, thereby providing liquid crystal regions around the polymer islands and polymer regions in the other portions.

Alternatively, the method for producing the above-mentioned liquid crystal device, includes the steps of: forming polymer islands including spacers on one of or both of a pair of substrates at least one of which is transparent; attaching the pair of substrates so as to be opposed to each other and to have a uniform gap therebetween to construct a liquid crystal cell; injecting a mixture containing at least a liquid crystal material and a polymerizable material in the liquid crystal cell; and cooling the mixture from a homogeneously miscible temperature, thereby allowing the mixture to be phase-separated into the liquid crystal material and the polymerizable material and providing liquid crystal regions around the polymer islands and the polymer regions in the other portions.

In one embodiment of the invention, in the step of patterning the polymerizable material including the spacers, the polymerizable material is patterned so that a width D of the polymerizable material satisfies a relationship: $r1 < A \leq D/2$, where $r1$ is ½ of a length of the spacer in a width direction of the polymerizable material and A is a distance from a center of the spacer in the width direction of the polymerizable material to an end of the polymerizable material.

In another embodiment of the invention, before or after the step of patterning the polymerizable material including the spacers, at least one layer different from the polymerizable material is patterned so that a width D2 thereof satisfies a relationship: $D1 + 4r2 < D2$, where D1 is a width of the polymerizable material including the spacers, and $r2$ is ½ of a length of the spacers in a width direction of the polymerizable material including the spacers.

In another embodiment of the invention, in the step of patterning the polymerizable material including the spacers, the polymerizable material is patterned so that a width D of the polymerizable material satisfies a relationship: $r1 < A \leq D/2$, where $r1$ is ½ of a length of the spacer in a width direction of the polymerizable material and A is a distance from a center of the spacer to an end of the polymerizable material, and before or after the step of patterning the polymerizable material including the spacers, at least one layer different from the polymerizable material is patterned so that a width D2 thereof satisfies a relationship: $D1 + 4r2 < D2$, where D1 is a width of the polymerizable material including the spacers, and $r2$ is ½ of a length of the spacers in a width direction of the polymerizable material including the spacers.

In another embodiment of the invention, at least one of an electric field and a magnetic field is applied to the mixture provided between the pair of substrates during the phase separation and the polymerization.

Alternatively, the method for producing the above-mentioned liquid crystal device includes the steps of: preheating a substrate to which a polymer film is to adhere under pressure, the substrate being either one of a pair of substrates at least one of which is transparent; allowing the polymer film to adhere to the substrate under pressure; heating the polymer film and the substrate while allowing the polymer film to adhere to the substrate under pressure; patterning the polymer film into an arbitrary shape; attaching the pair of substrates to each other to obtain a liquid crystal cell; and filling the liquid crystal cell with a mixture containing at least a liquid crystal material and a polymerizable material, and allowing the mixture to be phase-separated polymerization to provide polymer regions including portions corresponding to the patterned polymer film and liquid crystal regions in the other portions.

Alternatively, the method for producing the above-mentioned liquid crystal device, includes the steps of: patterning a polymer dry film outside pixels on either one of a pair of substrates at least one of which is transparent; attaching the pair of substrates to each other to obtain a liquid crystal cell; and filling the liquid crystal cell with liquid crystal.

In one embodiment of the invention, the insulator in a layered-shape including the spacers is composed of a polymerizable resin.

In another embodiment of the invention, surface free energy of the polymerizable material after polymerized is about 70 mN/m or less.

In another embodiment of the invention, a polar component of surface free energy of the polymerizable material after polymerized is in the range of about 5 mN/m to about 40 mN/m.

In another embodiment of the invention, the polymerizable material is a photopolymerizable resin.

In another embodiment of the invention, the polymerizable material is a thermally polymerizable resin.

In another embodiment of the invention, at least one layer made of a polymerizable resin is formed on the layer made of the polymerizable material including the spacers.

Alternatively, the method for producing a liquid crystal device of the present invention including a pair of substrates opposed to each other with a display medium interposed therebetween, at least one of which is transparent, comprises the steps of: coating an insulator on at least one of the substrates (first insulating film coating step); dispersing spacers over the insulator and coating another insulator thereon or coating an insulator including spacers on the insulator (second insulating film coating step); patterning the insulator including the spacers with a pattern width D' satisfying a relationship: $D' \leq D-2S$, where D is a final pattern width, and S is a diameter of the spacers or a size thereof in a long axis direction (first patterning step); coating an insulator on the substrate subjected to the first patterning step (third insulating film coating step); patterning the insulator coated in the third insulating film coating step with the final pattern width D so that the spacers lying off an end of the insulator after the first patterning step and before the third insulating film coating step are covered with the insulator (second patterning step).

In one embodiment of the invention, the display medium is allowed to have liquid crystal regions in which liquid crystal molecules are aligned in at least two directions, axis-symmetrically, or at random and polymer regions.

In another embodiment of the invention, the display medium is allowed to have liquid crystal regions in which liquid crystal molecules are aligned in one direction and polymer regions.

In another embodiment of the invention, a photosensitive material is used as at least one layer of the insulator used in the first, second, and third insulating film coating steps.

According to the present invention, a cell gap is kept uniform by using an insulator as a gap keeping member provided outside pixel regions. The gap keeping member made of an insulator of the present invention can be formed by patterning an insulating film, using photolithography. As the insulating film for a gap keeping member, a thin film made of a photosensitive material such as a photosensitive polyimide resin or a photoresist film itself can be used. Alternatively, an insulating film not having photosensitivity can be patterned using a patterned photoresist film as a mask. As a photoresist material, any negative and positive materials can be used. The resist material can be of a liquid type or of a dry film type. The gap keeping member can be composed of a plurality of insulating films. As the gap keeping member, the combination of an insulating film and conventional spacers can be used. By using the combination of an insulating film and spacers, the position of spacers can be controlled, and mechanical strength of the gap keeping member can be enhanced.

Thus, according to the conventional method in which a cell gap is kept by using spacers (bead-shaped spacers, fiber-shaped spacers, etc.) dispersed on a substrate, the position of the spacers cannot be controlled; however, according to the present invention, the position of the gap keeping member can be controlled. According to the present invention, since the gap keeping member can be effectively positioned outside the pixel regions of the liquid crystal device, the spacers can be prevented from disturbing the orientation of the liquid crystal molecules in the pixels, strength and shock resistance of the liquid crystal device can be enhanced over a large area, and the change in display by an external pressure (external force) can be suppressed.

In the case of using a liquid crystal layer having a plurality of liquid crystal regions respectively having different orientation directions of liquid crystal molecules, the position of the liquid crystal regions (boundaries between the liquid crystal regions) can be controlled by controlling the position at which the gap keeping member is formed. More specifically, the position of disclination lines (orientation defect) formed between liquid crystal regions having different orientation directions can be controlled. For example, in the case where a TN type liquid crystal layer (orientation direction of liquid crystal molecules in each liquid crystal region is one direction) having a different alignment direction per pixel in order to provide a large viewing angle liquid crystal device, disclination lines can be formed outside pixels by forming the gap keeping member so as to surround each pixel. The orientation of liquid crystal molecules in each liquid crystal region can be used for an STN type as well as a TN type. Liquid crystal layers in which liquid crystal molecules are aligned axis-symmetrically, in at least two directions, or at random by a non-rubbing process (an alignment film is not subjected to a rubbing treatment) can be used.

Each liquid crystal region is not required to be formed so as to correspond to each pixel. Liquid crystal regions each including a plurality of pixels can be formed, or one pixel can be divided into a plurality of liquid crystal regions. In the case where one pixel is divided into a plurality of liquid crystal regions, the gap keeping member can be formed in pixels. In this case, the gap keeping member controls the position at which disclination lines are formed, so that a light-shielding layer (black mask (BM), etc) can be formed at the corresponding position so as to make any display defects caused by the disclination lines undetectable to the naked eye.

Furthermore, in the case where a liquid crystal layer (display medium layer) made of a composite of a polymer material and a liquid crystal material is formed utilizing a phase separation reaction (polymerization induced phase separation), the positions of polymer regions and liquid crystal regions can be controlled by controlling the relationship in surface tension between an insulator and the liquid crystal material and the polymer material (i.e., selecting materials). More specifically, the polymer regions are formed at a position of the insulator previously formed outside pixels and the liquid crystal regions can be formed in the pixels. The insulator and the polymer regions formed at the position of the insulator function as gap keeping members, whereby resistance against an external pressure and shock resistance can be enhanced.

The insulator can be formed around the perimeter of the respective liquid crystal regions corresponding to the pixels. Alternatively, the insulator can be formed around the perimeter of a plurality of liquid crystal regions included in each pixel. It is preferred that liquid crystal regions are in a mono-domain state in pixels so as not to allow disclination lines to come in the pixels.

When either one of or both of a convex portion and a concave portion is patterned at the center of each pixel on the substrate, the position at which liquid crystal regions are formed can be controlled; therefore, for example, symmetry axes of liquid crystal molecules to be axis-symmetrically aligned can be controlled.

Regarding the insulator provided outside the pixels, at least one insulating film can be partially or entirely formed. In this case, a material for the insulator can be selected so that liquid crystal regions are stably grown by phase separation from a mixture of a liquid crystal material and a resin material. When a colored additive such as a black additive is included in at least one insulating film, the insulating film can be used as a BM, making disclination lines invisible. Furthermore, by including spacers made of an inorganic material or an organic material in at least one insulating film, a cell gap can be uniformly controlled without any influence of temperature and external pressure.

As the insulator, at least one layer can be composed of a photosensitive resin layer. In this case, the resin layer can be formed by photolithography. As at least one layer of the insulator, a polymer film can be used. Because of this, the waste of a material caused when the insulator is formed by spin-coating a resist material can be eliminated; as a result use efficiency of the material is enhanced. Thus, production costs can be decreased.

Furthermore, the polymer film can adhere to a large area on a substrate at a time by thermocompression or the like and has outstanding adhesion and uniformity and high convenience. Thus, the use of the polymer film gives satisfactory reliability with respect to large display devices, and hence production efficiency can be further increased.

In the case where the above-mentioned insulator is composed of at least two layers, at least one layer can be formed in the pixels. At least one layer can function as at least one of a convex portion and a concave portion. Depending upon the relationship in surface tension between a liquid crystal material and a polymerizable material, the liquid crystal material is preferentially separated into insulator formation regions in pixels or the polymer material is preferentially separated into insulator regions outside pixels and polymer regions are formed outside pixels.

The mixture containing at least a liquid crystal material and a polymerizable material can be phase-separated into the liquid crystal material and the polymerized material (polymer) by polymerization of the polymerizable material. Alternatively, the mixture is first phase-separated into the liquid crystal material and the polymerizable material by controlling temperature thereof and the polymerizable material thus obtained is polymerized.

When an electric field or a magnetic field or both of them is applied to the mixture during phase separation, symmetry axes can be aligned in the vertical direction of the substrates.

In the case where phase separation of the polymerizable material and the liquid crystal material is not used, orientation control can be performed without disturbing the orientation of liquid crystal molecules by forming alignment films controlling the orientation of the liquid crystal molecules on the substrates without performing alignment treatment.

By allowing liquid crystal molecules in liquid crystal regions to be axis-symmetrically aligned in pixels so that spacers are present only at symmetry axes of the liquid crystal regions or in the vicinity thereof, orientation axes of the liquid crystal molecules are present only at the symmetry axes of the liquid crystal regions or in the vicinity thereof and the orientation axes of the liquid crystal molecules do not present between the pixels and the polymer walls, for example. Thus, a liquid crystal device of outstanding display quality and uniformity without roughness can be obtained.

FIG. 1 is a view showing the relationship between spacers 7 and a layer with the spacers 7 mixed therein. In this figure, in the case where a distance A from the center of the spacer 7 to the end of the layer with the spacer 7 mixed therein is smaller than r1 which is ½ of a length of the spacer 7 in the width direction of the layer, the spacers 7 projected into the pixels from the end of the layer adversely affect display characteristics; specifically, increase in roughness or the like is caused by the disturbance of the orientation of the liquid crystal regions and the positional shift of orientation axes. On the other hand, the maximum value of the distance A becomes ½ of the width D of the layer.

Thus, the width D of the layer including the spacers 7 needs to satisfy the following Expression (1). According to the present invention, the layer including the spacers 7 corresponds to polymer regions in which the spacers 7 are present and one or a plurality of layers including spacers is made of an insulator.

$$r1 < A < D/2 \tag{1}$$

FIGS. 2A and 2B show the relationship between the spacers 7, a layer 9a including the spacers 7, and a layer 9b covering the spacers 7. As shown in FIG. 2A, assuming that r2 represents ½ of the length of the spacer 7 in the width direction of the layer 9a, when a width D1 of the layer 9a and a width D2 of the layer 9b has a relationship: D1+4r2=D2 or D1+4r2>D2, the spacers 7 project from the end of the layer 9b and at least part of the spacers 7 projects into the pixels. Therefore, the disturbance of the orientation of the liquid crystal regions and the positional shift of the orientation axes are caused as described above.

Thus, the width D1 of the layer 9a and the width D2 of the layer 9b need to satisfy the following Expression (2). FIG. 2B shows the case where Expression (2) is satisfied. The layer 9b corresponds to a light-shielding layer in the case where a display medium is made of only liquid crystal. In the case where an insulator is composed of at least two layers, the layer 9a corresponds to the layer including the spacers 7 of these layers, and the layer 9b corresponds to the other layers of these layers.

$$D1+4r2<D2 \tag{2}$$

r1 and r2 respectively correspond to a radius of a spacer when the spacer is spherical and correspond to a radius or height in the case where the spacer is cylindrical, such as that obtained by cutting fibers or the like.

FIG. 3 is a view illustrating the case where a cell gap is kept uniform in an active matrix panel provided with TFTs according to the present invention. As shown in this figure, the vicinity of a TFT 205 is mounted compared with the periphery thereof because of layered metal layers and insulating layers. It is preferred that the above-mentioned spacers are patterned by multi-steps, using the difference in thickness distribution of a multilayered film in the vicinity of the TFT 205 and the difference in width between a gate signal line 202 and a source signal line 203. By doing so, the cell gap can be kept uniform. In this figure, the reference numeral 107 denotes a pixel electrode.

Furthermore, according to the present invention, when the insulator is patterned by photolithography such as light exposure and development, it is very effective to irradiate light to a cell through a reverse side thereof, using light-shielding layers such as a light-shielding film and a metal wiring film as a photomask. More specifically, in this case, there are advantages in that the formation of a photomask and a strict alignment step can be omitted. In particular, when the present invention is applied to an active matrix type panel provided with TFTs, the number of steps can be decreased and thus simplified, thereby decreasing production costs.

According to the present invention, an insulator is coated on a substrate with required members such as pixel electrodes provided thereon so as to cover the pixel electrodes, whereby an insulating layer is formed. Then, spacers are dispersed on the substrate, and an insulator is coated thereon. Alternatively, in place of dispersing spacers and coating an insulator, an insulator including spacers is coated on the insulating layer. Then, patterning is conducted so as to remove the insulators over the pixel electrodes and in the vicinity thereof. In this patterning, the remaining insulator has a grid pattern surrounding pixel electrodes provided in a matrix. It is assumed that a pattern width D' satisfies the relationship $D' \leq D-2S$, in the case where a final pattern width is D and a diameter or a length in a long axis direction of the spacers is S (sphere or cylinder, respectively). Because of this patterning, a distance between the pixel electrodes and the side walls at the edge of the insulator becomes S or more, and the spacers are positioned outside from the positions over the pixel electrodes, even when the spacers lie off the side walls at the edge of the insulator (FIG. 49).

Next, an insulator is further coated on the substrate with the insulator patterned thereon as described above. Next, patterning is conducted with a pattern width D. The center of patterning at this time is matched with that of the previous patterning. Because of this, as described above, all of the spacers which lie off the side walls at the edge of the insulator are finally covered with the insulator. The upper portions of the spacers are kept lying off the insulator in order not to cause any problems when a mixture containing a liquid crystal material is injected in the steps conducted later.

By doing so, the spacers do not exist on the interfaces between the pixels and the insulator and the spacers do not remain in the pixels. Furthermore, in the case where liquid crystal molecules are axis-symmetrically aligned, the axis-symmetrical orientation is not disturbed by the spacers; therefore, roughness can be prevented.

Thus, the invention described herein makes possible the advantages of (1) providing a liquid crystal device being capable of suppressing spacers from being mixed in pixels to perform a display with a high contrast without any roughness and having a uniformly controlled cell gap and improved strength and shock resistance over a large area; (2) providing a method for producing the same; (3) providing a liquid crystal device without roughness in a display image, preventing spacers from disturbing liquid crystal regions and positionally shifting orientation axes thereof; and (4) providing a method for producing the same.

These and other advantages of the present invention will become apparent to those skilled in the art upon reading and understanding the following detailed description with reference to the accompanying figures.

BRIEF DESCRIPTION OF THE DRAWINGS

FIG. 12A is a plan view of the liquid crystal device in Example 1 according to the present invention; FIG. 12B a cross-sectional view taken along a line 12B–12B' of FIG. 12A; FIG. 12C is a view thereof observed with a polarizing microscope.

FIGS. 14A through 14E show electro-optic characteristics of the liquid crystal device in Example 1 according to the present invention; FIG. 14F shows directions in which the electro-optic characteristics are measured.

FIGS. 15A through 15E show electro-optic characteristics of the liquid crystal device in Comparative Example 1; FIG. 15F shows directions in which the electro-optic characteristics are measured.

FIGS. 36A through 36E show electro-optic characteristics of the liquid crystal device in Example 18 according to the present invention; FIG. 36F shows directions in which the electro-optic characteristics are measured.

FIG. 61A through 61D show twisted orientations of liquid crystal molecules. FIG. 61B shows the vicinity of an upper substrate surface (Z=d); FIG. 61C a middle layer (Z=d/2); and FIG. 61B the vicinity of a lower substrate surface (Z=0) in the case where a liquid crystal region 613 shown in FIG. 61A is cut in round slices so as to be parallel to the substrates.

FIG. 62B shows the vicinity of an upper substrate surface (Z=d); FIG. 62C a middle layer (Z=d/2); and FIG. 62D the vicinity of a lower substrate surface (Z=0) in the case where a liquid crystal region 623 shown in FIG. 62A is cut in round slices so as to be parallel to the substrates.

DESCRIPTION OF THE PREFERRED EMBODIMENTS

EXAMPLES

Figure 1:
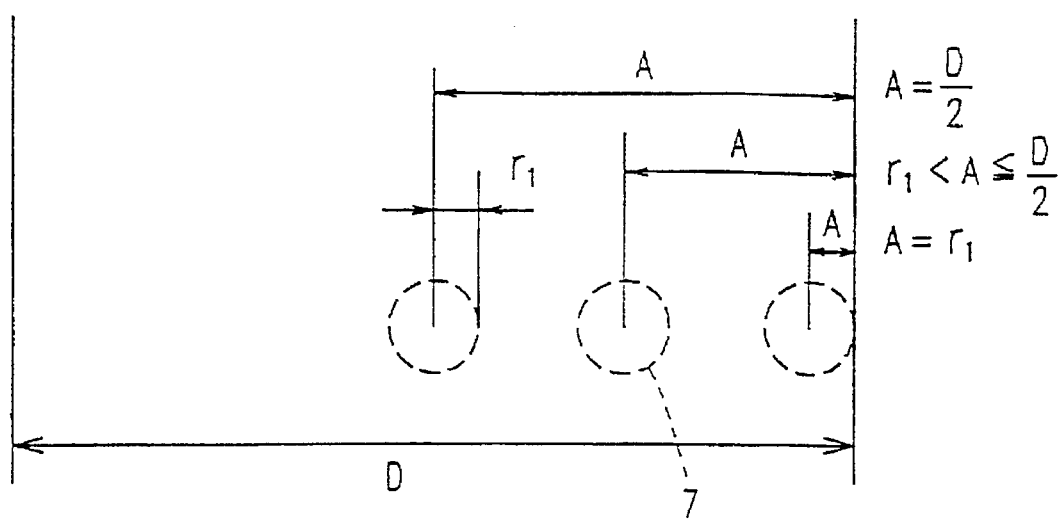
FIG. 1 is a view showing the relationship between the spacer and the layer including the spacer.
Figure 2A:
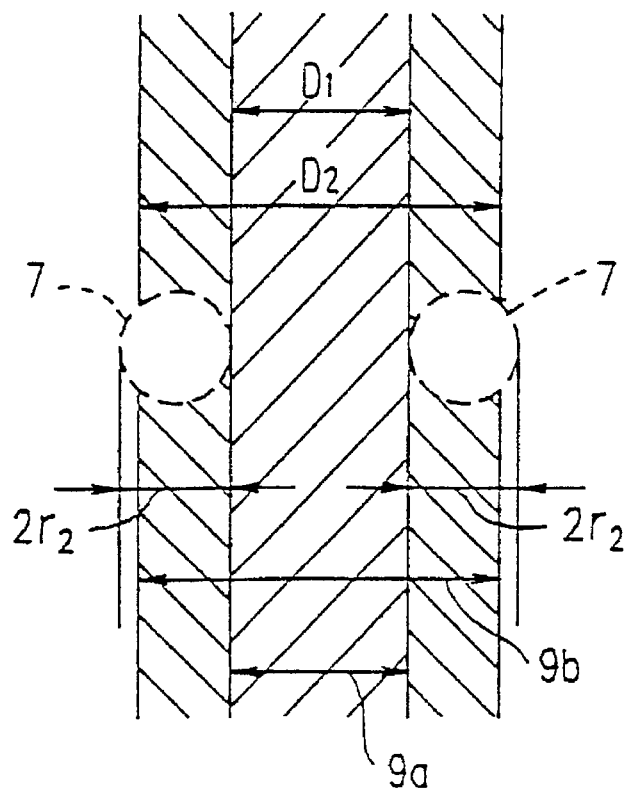
FIG. 2A is a view showing the relationship between the spacer and the layer including the spacer in the case where the spacer is deposited at a pixel portion.
Figure 2B:
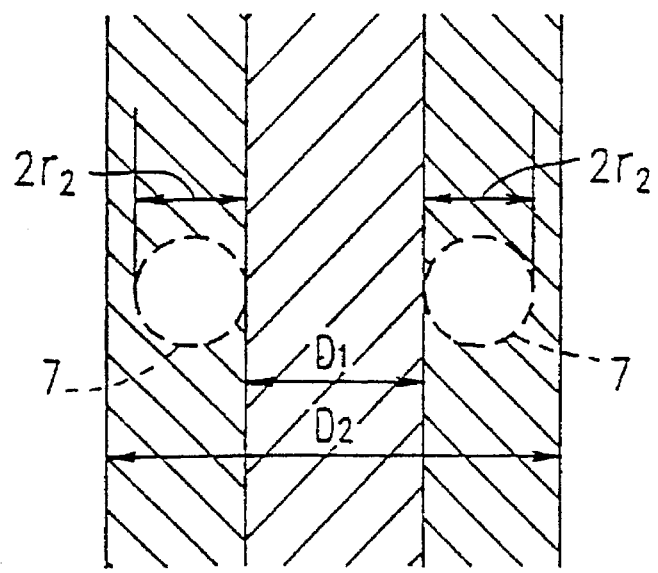
FIG. 2B is a view showing the relationship between the spacers and the layer including the spacers in the case where the spacers are completely buried in an insulating film.
Figure 3:
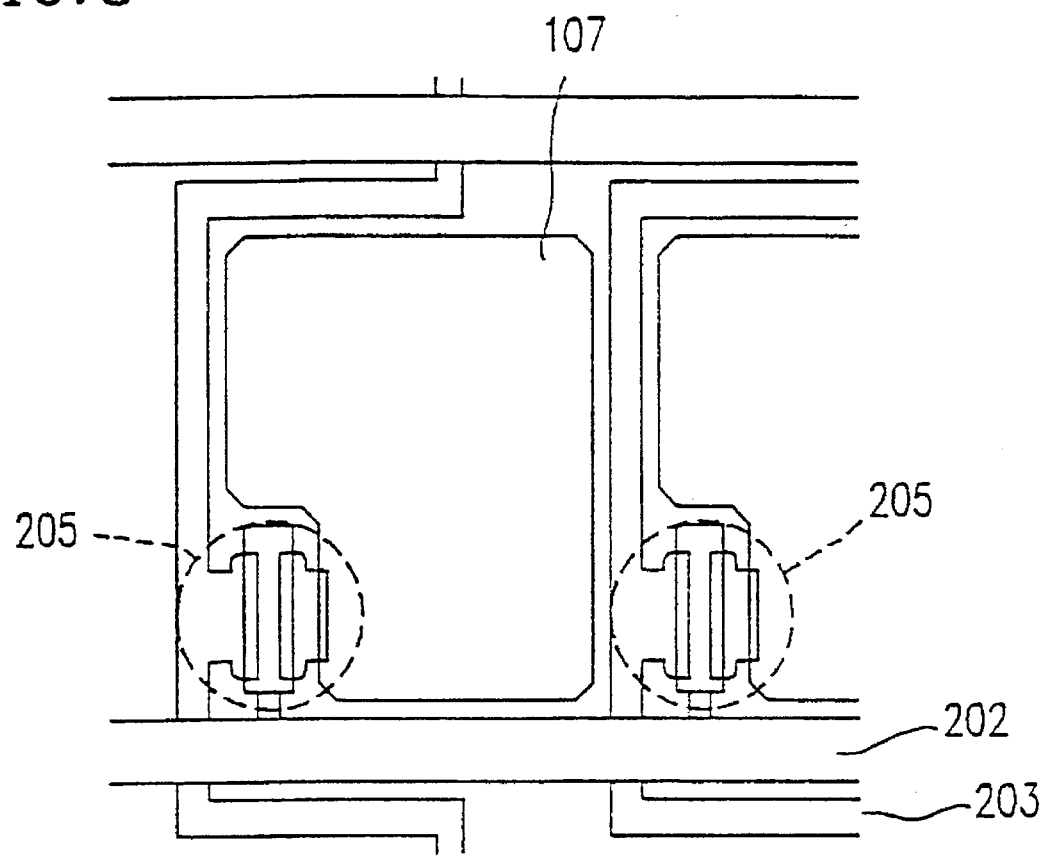
FIG. 3 is a view illustrating the case where the present invention is applied to an active matrix type panel provided with TFTs to keep the cell thickness uniform.

Hereinafter, the present invention will be described by way of illustrative examples with reference to the drawings.

The liquid crystal device of the present invention has, for example, the following structure: pixel electrodes made of ITO (indium tin oxides) or the like are patterned on one of substrates made of glass or the like and an insulator made of a resist is formed thereon so as to surround each pixel. A liquid crystal layer, i.e., a display medium composed of liquid crystal regions containing liquid crystals surrounded by polymer regions is interposed between the substrate with the pixel electrodes formed thereon and the other substrate with a counter electrode formed thereon.

In such a liquid crystal device, the alignment films formed on the substrates by a non-rubbing process can align liquid crystal molecules in the liquid crystal layer in an axis-symmetrical shape, such as a radial shape, a tangential (concentric) shape, and a spiral-like shape; in at least two directions; or at random. Alternatively, the insulator formed outside the pixels can align the liquid crystal molecules in the liquid crystal regions in at least two directions, in an axis-symmetrical shape, or at random. Furthermore, the insulator is capable of working as a gap keeping member to keep a cell gap uniform.

(Method for producing spacerless (beadless) liquid crystal cell)

In the above-mentioned liquid crystal device, the insulator formed outside the pixels aligns the liquid crystal molecules in the liquid crystal regions surrounded by the polymer regions and keeps the cell gap uniform. Thus, spacers (bead-shaped spacers) are prevented from mixing into the liquid crystal regions or portions of the liquid crystal layer not surrounded by the polymer regions. This insulator is practical for use in the liquid crystal cell when patterned on signal lines provided outside the pixels.

There are the following three methods for patterning the insulator.

(1) An organic film or the like with a high insulating property is uniformly formed on a substrate, and a photoresist is coated thereto. The resultant substrate is exposed to light with a mask placed thereon, the photoresist is developed, the organic film is etched using the resist pattern as a mask, and the photoresist is removed from the substrate, whereby an insulator is patterned on the substrate.

(2) An insulating organic film having photosensitivity (e.g., negative photoresist, positive photoresist, and photosensitive polyimide) is uniformly formed on a substrate, and the resultant substrate is subjected to the steps such as mask exposure and development, whereby an insulator is patterned on the substrate. According to this method, the above-mentioned method (1) can be simplified.

(3) An insulator of predetermined thickness is patterned on a substrate by singularly using printing methods such as relief printing, intaglio printing, and screen printing or by any combination thereof.

The insulator can also be formed by pattering two or more insulating films in combination. In particular, in the case where liquid crystal regions are grown from a mixture of a liquid crystal material and a polymerizable material by utilizing phase separation (polymerization induced phase separation), the surface energy of the substrate and the insulating film can be partially changed by multi-layering insulating films. Therefore, the liquid crystal regions can be stably formed by selecting materials.

In order to keep the cell gap uniform over a large area irrespective of environmental temperature and external pressure, glass fibers, glass beads, or a particulate particle-size control material made of an organic substance or an inorganic substance (bead-shaped spacers) can be mixed into at least one insulating film of the insulator. In the case where the bead-shaped spacers are mixed into the insulating film, they can be uniformly dispersed in an insulating material and coated onto a substrate. In the case where a photocurable resin such as a W-rays curable resin is used as an insulating material, the material is coated onto a substrate and spacers are sprayed thereon, and the resin with the spacers sprayed thereon are patterned with a mask.

Furthermore, a photosensitive material, in which a black material such as a black pigment and carbon black or a colored material is dispersed, can be formed on the signal lines outside the pixels. When a black matrix (BM) is formed by patterning a black resin layer outside the pixels, the surface reflectivity can be reduced compared with the conventional BM composed of Cr. This allows a liquid crystal panel to have low reflectivity. In the case where a black resin layer is formed on a substrate with TFT arrays formed thereon, the black resin layer is capable of working as a uniform cell gap keeping spacer and a BM; therefore, a pixel opening ratio can be improved compared with a liquid crystal panel in which a BM is provided on the counter electrode substrate with a color filter formed thereon.

Furthermore, by providing a black resin layer as first insulating film and a second insulating film which is the same as or different from the first insulating film, mask alignment at the time when the second insulating film is pattered becomes easy and uniformity of a large liquid crystal panel can be improved.

As described above, by forming an insulator outside the pixels, the cell gap can be kept uniform without providing particulate spacers made of an inorganic substance or an organic substance in the liquid crystal layer or in the liquid crystal regions.

In the case where liquid crystal regions are grown from a mixture of a liquid crystal material and a polymerizable material by utilizing phase separation, polymer regions are selectively formed outside the pixels so as to combine with the insulator provided outside the pixels while the mixture is polymerized and phase-separated. In this case, shock resistance and strength against an external pressure of the cell can be further improved.

A polymer film can be used in place of the insulating organic film having photosensitivity. The polymer film is composed of a photosensitive polymer, or a photosensitive material and a polymer material supporting the photosensitive material. The polymer film is attached to a substrate by thermocompression bonding or with an adhesive, a photocurable resin, a thermosetting resin, or the like, a laser beam is partially irradiated to the film with a photomask placed thereon, and the polymer material is subjected to photodissociation to be patterned in an arbitrary shape at the light irradiated portions. Alternatively, the polymer film is attached to substrate after being patterned in an arbitrary shape.

In order to enhance adhesion of the polymer film with respect to a substrate, for example, at least one insulating organic film having photosensitivity can be formed on either face of the film, and the resultant film is patterned in an arbitrary shape. Alternatively, the polymer film can be first patterned in an arbitrary shape, and at least one insulating organic film is patterned thereon to give a multi-layered structure.

(Added amount of spacers)

The adding amount of spacers used with the insulator slightly varies depending upon the position at which spacers as a gap keeping member are provided. For example, when the gap keeping member is formed of an insulating material such as a photoresist and spacers mixed therewith, in the case (1) where spacers and an insulator as gap keeping members are fixed only onto a light-shielding layer outside pixels, the added amount of spacers is preferably in the range of about 0.1 to about 0.9% by weight. In the case (2) where the spacers and the insulator are fixed on a light-shielding layer outside pixels and on island-shaped convex portions in the pixels, the added amount of spacers is preferably in the range of about 1.0 to about 4.5% by weight. In the case (3) where spacers are provided on orientation axes in liquid crystal regions at the center of each pixel, the added amount of spacers is preferably in the range of about 2.0 to about 7.0% by weight.

In each of the cases (1) to (3), in the case where the added amount of spacers is smaller than the above-stipulated range, a uniform cell gap cannot be obtained by using the spacers. In the case where the added amount is larger than the above-stipulated range, it is difficult to sufficiently control the position of the spacers, and hence, the axis-symmetrical orientation of the liquid crystal regions cannot be sufficiently controlled.

When the spacers are scattered on a resist film, the preferable range of the amount of the spacers may be determined taking the area of the gap keeping member with respect to an area of display panel in to consideration so as to obtain a sufficient gap keeping capability. In some cases, the gap keeping member may be formed of an insulator without including spacers therein. In addition, in the configuration where an insulator including spacers are covered by another insulator, the orientation of the liquid crystal molecules is not disturbed by the spacers. Therefore, the added amount of the spacers may beyond the above-mentioned range.

(Effect of surface tension of substrates with respect to phase separation of mixture of liquid crystal material and polymerizable material)

The case where liquid crystal regions are grown from a mixture of a liquid crystal material and a polymerizable material by utilizing phase separation in the above-mentioned liquid crystal device will be described.

The inventors have already proposed a positional control of liquid crystal regions and polymer regions under the control of free energy. According to their proposal, a mixture of a liquid crystal material and a polymerizable material in a single phase is phase-separated under the control of free energy to form intended two phases in which the liquid crystal material and the polymerizable material are separated and fixed in terms of position and shape, whereby the position and shape of liquid crystal regions and polymer regions are controlled. As controllable free energy, interface free energy can be used. For example, when a material whose interface free energy is different with respect to a liquid crystal phase and an isotropic phase is patterned on a substrate, a liquid crystal phase can be formed in accordance with the pattern. Furthermore, a method for controlling the position of the liquid crystal regions and the polymer regions by controlling a gap between a pair of substrates constituting a device is considered. According to this method, the position and shape of the liquid crystal regions and the polymer regions are controlled by regulating the size of the gap between the substrates, utilizing "interfacial tension making the interface area smaller".

In the above-mentioned liquid crystal device, a mixture containing materials respectively having different interfacial tensions is patterned on a substrate or regions having different cell gaps are formed, whereby the position and shape of the liquid crystal regions and the polymer regions are controlled by utilizing the difference in affinity between a polymerizable material and a liquid crystal material and liquid crystal molecules are aligned in at least two directions, in an axis-symmetrical shape, or at random. Specifically, when regions where an insulating material previously patterned on a substrate are present, interfacial free energy with respect to a liquid crystal phase and that with respect to an isotropic phase can be controlled in the regions with the insulating material patterned thereon and the other regions. Thus, by regulating interfacial free energy such as surface tension of an insulator provided as spacers outside the pixels, the liquid crystal material and the polymerizable material are phase-separated under control.

Particularly in the case where polymerization is relatively slow, the polymerizable material sufficiently moves in a phase separation process, either of the liquid crystal material and the polymerizable material, which has higher surface tension, is preferentially separated in either of the region with an insulator patterned as a gap keeping member or a region with no insulator patterned, which has higher surface tension. On the other hand, either of the liquid crystal material and the polymerizable material, which has lower surface tension, is preferentially separated in either of the region with an insulator patterned as a gap keeping member or a region with no insulator patterned, which has lower surface tension.

Figure 4:
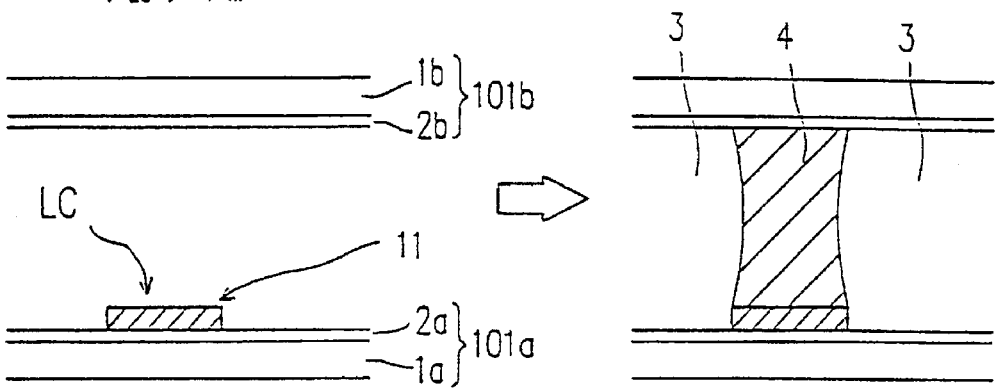
FIG. 4 is a view illustrating a phase separation state between a liquid crystal material and a polymerizable material in the case where the surface tension of the liquid crystal material is larger than that of the polymerizable material.

(1) Surface tension $\gamma LC$ of liquid crystal material>Surface tension $\gamma M$ of polymerizable material A liquid crystal device shown in FIG. 4 includes a pair of substrates 101a and 101b having substrates 1a and 1b made of glass or the like and transparent electrodes 2a and 2b formed thereon; and a liquid crystal layer (display medium layer) having polymer regions 4 and liquid crystal regions 3. As shown in FIG. 4, when a region 11 whose surface tension is lower than that of pixel regions on a substrate 1 is formed in at least part of a liquid crystal layer outside pixels, a polymerizable material such as a monomer is separated from a mixture and preferentially forms a polymer region 4 on the region 11. In each pixel, a liquid crystal region 3 is formed. Hereinafter, elements having similar functions are denoted by the same reference numerals.

In this case, for example, it is preferred that another polymerizable material containing fluorine atoms is added to the polymerizable resin material, since the surface tension $\gamma M$ of the polymerizable material is lowered. In general, a polymerizable material containing fluorine atoms and a liquid crystal material have low compatibility with each other, so that the liquid crystal material and the polymerizable material become difficult to mix with each other during phase separation, whereby the amount of liquid crystal molecules present in the polymer regions can be decreased. Thus, the proportion of liquid crystal which does not respond to an electric field decreases, improving a contrast. Furthermore, since fluorine atoms are distributed at the interface between the liquid crystal regions and the polymer regions, anchoring strength between the liquid crystal and the polymer decreases, allowing a drive voltage to decrease.

Figure 5:
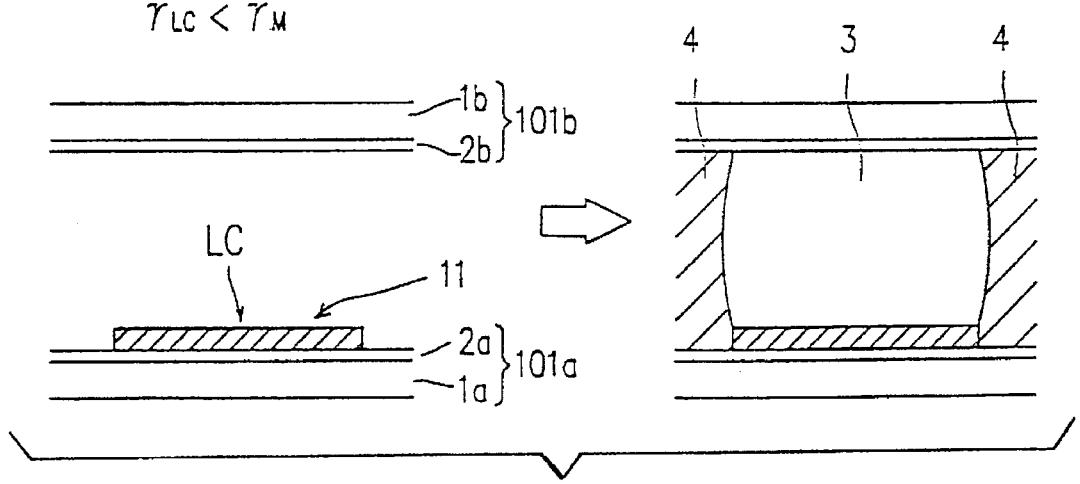
FIG. 5 is a view illustrating a phase separation state between a liquid crystal material and a polymerizable material in the case where the surface tension of the liquid crystal material is smaller than that of the polymerizable material.

(2) Surface tension $\gamma LC$ of liquid crystal material<Surface tension $\gamma M$ of polymerizable material As shown in FIG. 5, when a region 11 whose surface tension is lower than that of pixel regions is formed in at least part of a liquid crystal layer, a liquid crystal region 3 is separated from a mixture and preferentially formed on the region 11, and polymer regions 4 are formed outside pixels.

Thus, in the case where the above-mentioned insulator is patterned outside the pixels as in the above method (1), the phase separation of a mixture of a liquid crystal material and a polymerizable material can be controlled by regulating surface energy of the materials, the insulator works as a spacer to control the cell gap uniform and combines with the polymer regions to improve the cell strength. In the case where the above-mentioned insulator is patterned in the pixels as in the above method (2), the cell gap can be uniformly controlled by patterning the other insulator outside the pixels.

(Method for producing alignment film controlling orientation of liquid crystal molecules)

In the case of using a liquid crystal layer with no polymer regions as described above formed therein, liquid crystal molecules are aligned in at least two directions, in an axis-symmetrical shape, or at random with an alignment film. As the alignment film, those produced by a method not using alignment treatment are used so as not to disturb the orientation of liquid crystal molecules. For example, an alignment film having spherulite can be used, which is obtained by coating a solution containing a linear crystalline polymer onto a substrate, followed by cooling it.

(Orientation state of liquid crystal molecules in domain)

Figure 6A:
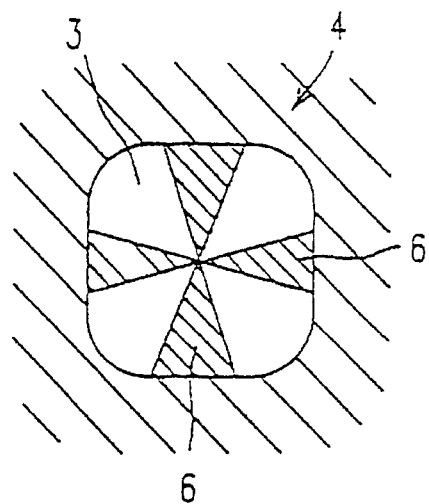
FIG. 6A is a view of a liquid crystal device in an example according to the present invention observed with a polarizing microscope under no application of a voltage.

When the above-mentioned liquid crystal device is observed with a polarizing microscope, a cross-shaped extinction pattern 6 is observed in the polarizing axis direction of a polarizing plate in a liquid crystal region 3 surrounded by a polymer wall 4 as shown in FIG. 6A or in a liquid crystal layer (not shown). This indicates that liquid crystal molecules are aligned in a mono-domain state around a center portion of each liquid crystal domain axis-symmetrically (for example, radially, tangentially (concentrically), and in a spiral-like shape).

The inventors of the present invention disclose three-dimensional views of the liquid crystal regions 613 as shown in FIGS. 61A through 61D and 62A through 62D in Japanese Laid-Open Patent Publication No. 7-120728. In these figures, liquid crystal regions 613 are in a disk shape.

FIGS. 61A through 61D show twisted orientations of liquid crystal molecules 614. FIG. 61B shows the vicinity of an upper substrate surface (Z=d), FIG. 61C a middle layer (Z=d/2), and FIG. 61D the vicinity of a lower substrate surface (Z=0) in the case where a liquid crystal region 613 shown in FIG. 61A is cut in round slices so as to be parallel to the substrates. As is understood from these figures, liquid crystal molecules are axis-symmetrically aligned with respect to an axis at the center of the liquid crystal region. Furthermore, when the cell is seen from above, it is presumed that each portion is in a TN-like orientation state and the TN orientation is axis-symmetrical with respect to the center axis while rotating.

FIGS. 62A through 62D show the case where the orientation of liquid crystal molecules 624 is not twisted. These figures correspond to FIGS. 61A through 61D. As is understood from these figures, the vicinity of an upper substrate surface (Z=d), a middle layer (Z=d/2), and the vicinity of a lower substrate surface (Z=0) have liquid crystal molecules aligned in the same direction because of no twist of the orientation of the liquid crystal molecules. In addition, as shown in these figures, the liquid crystal molecules are presumed to be axis-symmetrically aligned with respect to an axis at the center of the liquid crystal region 623 in the same way as in FIGS. 61A through 61D.

As described above, in the liquid crystal device of the present invention, the liquid crystal regions 3 are in a mono-domain state, and liquid crystal molecules in the liquid crystal regions 3 are aligned axis-symmetrically (for example, radially, tangentially (concentrically), and in a spiral-like shape) with respect to the center of each liquid crystal region.

Figure 6B:
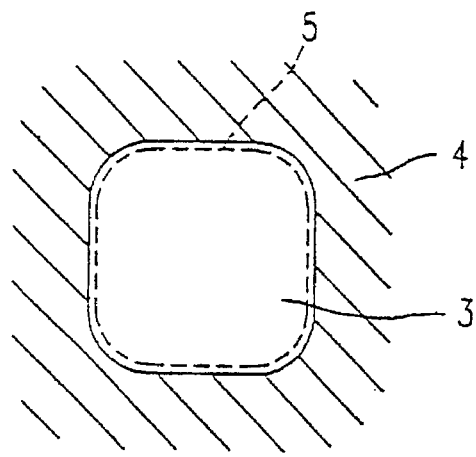
FIG. 6B is a view of a liquid crystal device in an example according to the present invention observed with a polarizing microscope under the application of a voltage.

In the liquid crystal device in such an orientation state, as shown in FIG. 6B, a disclination line 5 is formed on the periphery of the liquid crystal region 3 under the application of a voltage and will never be formed inside the liquid crystal region 3. Accordingly, when the outer peripheral portion of the liquid crystal region 3 is slightly covered with a BM, a disclination line can be intentionally formed outside a pixel. Furthermore, the disclination line or a disclination point (not shown) which is to be formed at the center of the liquid crystal region 3 can be formed under a light-shielding layer so as to improve the black level of the liquid crystal device and enhance the contrast thereof. In this case, the disclination line can be made less visible by adding an additive developing a color (black, for example) to the material for the insulator. Alternatively, an orientation state where no disclination line arises can be obtained by adding a polymerizable liquid crystalline compound to the polymer region 4.

Figure 58A:
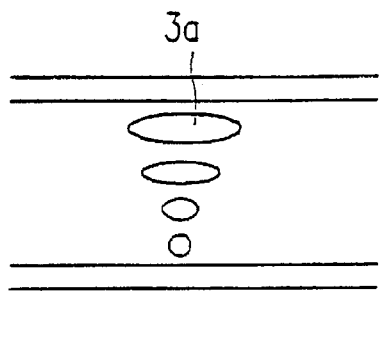
FIGS. 58A through 58C are views illustrating the change in contrast of a liquid crystal device in a TN mode depending upon the viewing angle.
Figure 58D:
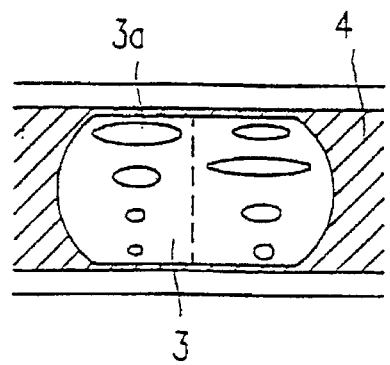
FIGS. 58D through 58F are views illustrating the change in contrast of a liquid crystal device in a large viewing angle mode depending upon the viewing angle.
Figure 58B:
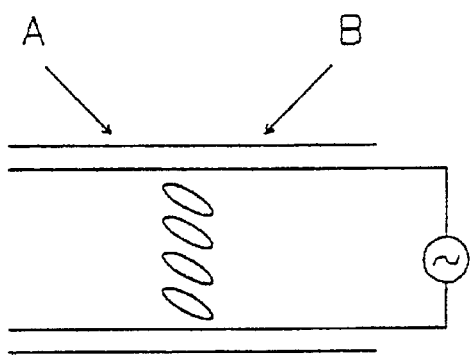
Figure 58E:
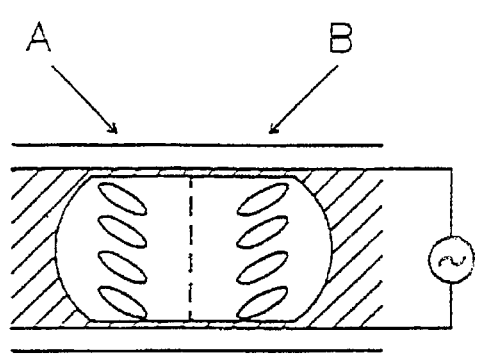
Figure 58C:
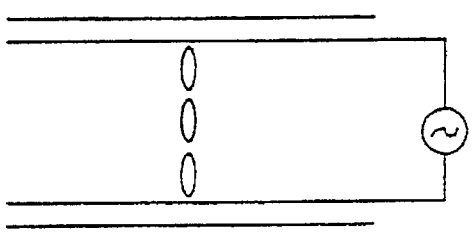
Figure 58F:
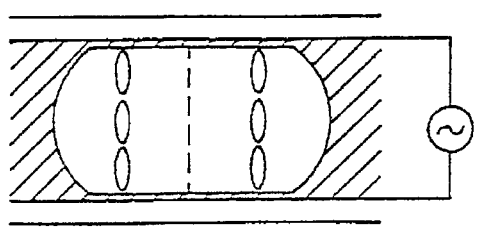
Figure 59:
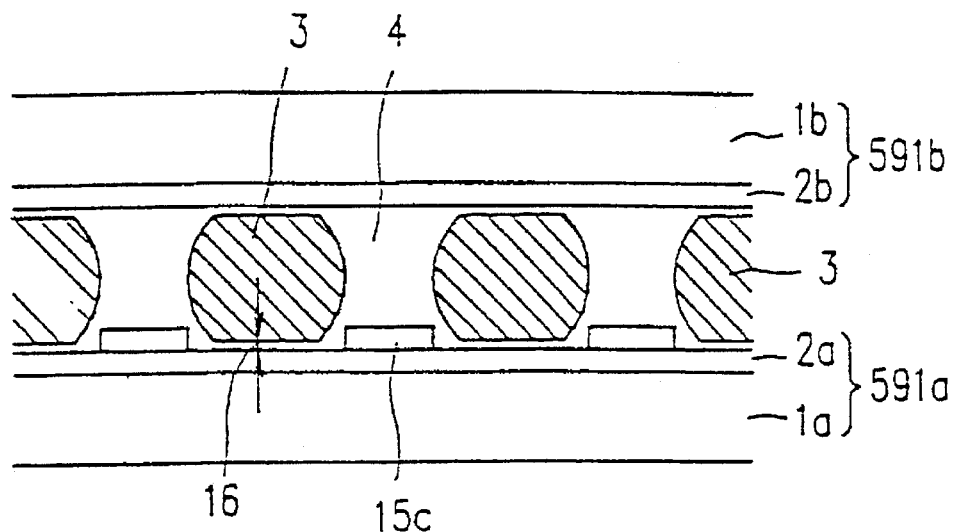
FIG. 59 is a cross-sectional view of a conventional liquid crystal device having liquid crystal regions surrounded by polymer regions, showing a state in which a polymer adheres to a substrate in liquid crystal regions.

When a display voltage is applied to the liquid crystal device having the above orientation state, liquid crystal molecules 3a rise in parallel with each other so as to be vertical with respect to the substrates, as shown in FIGS. 58D to 58F, for example. At this time, the liquid crystal molecules rise along an axis-symmetrical direction which is an initial orientation; therefore, the apparent refractive indexes when the device is viewed in various directions are made uniform, and thus the viewing angle characteristic of the liquid crystal device can be improved.

Even when the initial orientation is in at least two directions or at random, the liquid crystal molecules can be allowed to rise in at least two directions or at random. Thus, the viewing angle characteristic can also be improved.

(Number of domains in one pixel)

The number of domains in each pixel is preferably as small as possible. If one pixel includes a number of domains, a disclination line arises between domains, that decreases the black level of the display. For this reason, it is desirable that each pixel is composed of a single domain in which liquid crystal molecules are aligned in at least two directions, in an axis-symmetrical shape, or at random in the liquid crystal regions. With this arrangement, since only one domain is formed per pixel, a disclination line can be covered with a BM.

Figure 7A:
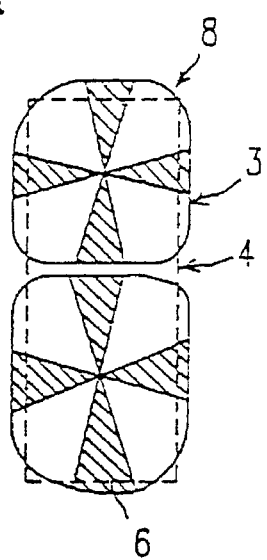
FIG. 7A is a view of a liquid crystal device having rectangular pixels in another example according to the present invention observed with a polarizing microscope in the case where each pixel includes two liquid crystal regions.

In the case of a liquid crystal device with a rectangular pixel 8 as shown in FIG. 7A, the pixel 8 can include two or more liquid crystal regions 3 each having liquid crystal molecules aligned axis-symmetrically. Such a liquid crystal device can also have the same outstanding viewing angle characteristic as the liquid crystal device having a monodomain liquid crystal region. In this case, a polymer region 4 or the above-mentioned insulator can be formed in the pixel 8 to divide the pixel 8.

Figure 7B:
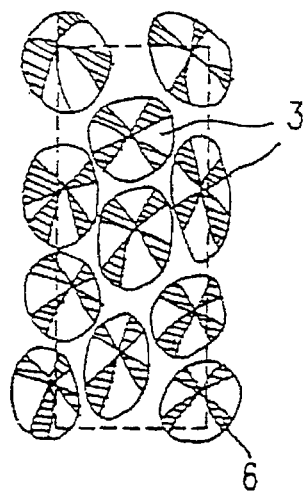
FIG. 7B is a view of a liquid crystal device having rectangular pixels in another example according to the present invention observed with a polarizing microscope in the case where each pixel includes a plurality of liquid crystal regions.

Furthermore, in the case of the liquid crystal device shown in FIG. 7B, by matching the direction of disclination lines formed at each boundary of a plurality of liquid crystal regions 3 in the pixel 8 with the polarizing axes of polarizing plates, the disclination lines can be less visible to the naked eye under the application of a voltage.

As described above, when each pixel is divided into a plurality of liquid crystal regions (or liquid crystal domains), it is required to provide means for aligning orientation axes of liquid crystal molecules in each liquid crystal region (or liquid crystal domain).

(Method for uniformly aligning liquid crystal molecules axis-symmetrically)

As described above, a material such as a resist material having different surface tension from that of a liquid crystal material is patterned as an insulator in at least part of a liquid crystal layer outside pixels on a substrate, and a mixture of a liquid crystal material and a polymerizable material is polymerized and phase-separated, liquid crystal molecules are aligned in an axis-symmetrical shape, in at least two directions, or at random by controlling the position and shape of the liquid crystal regions and the polymer regions. At this time, by patterning a concave or convex portion or both thereof on at least one of a pair of substrates, regions having different cell gaps are formed between the substrates, the phase separation between the liquid crystal material and the polymerizable material, and the position of the symmetry axes of the liquid crystal molecules can be controlled.

Figure 8A:
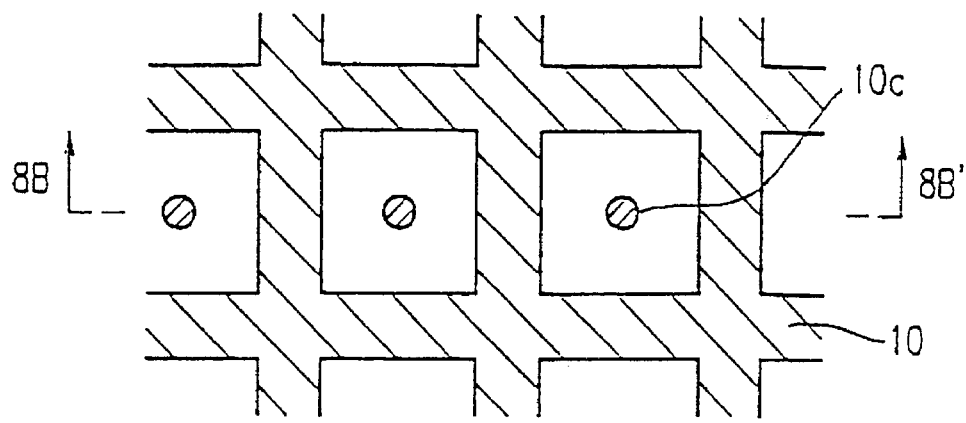
FIG. 8A is a plan view of one of substrates of a liquid crystal device provided with a convex portion at the center of each pixel in another example according to the present invention.
Figure 8B:
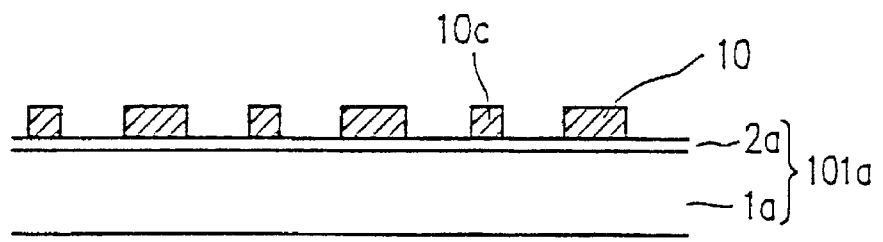
FIG. 8B is a cross-sectional view taken along a line 8B–8B' of FIG. 8A.

(1) Case where cell gaps of regions serving as symmetry axes in pixels during phase separation are small (case where convex portions are formed):

When the liquid crystal material and the polymerizable material are phase-separated by polymerization or temperature drop, a convex portion 10c if any on the substrate 101a as shown in FIGS. 8A and 8B serves as a nucleus around which the liquid crystal region 3 grows. As a result, the symmetry axis can be aligned with the convex portion 10c. Thus, the position of the symmetry axis of orientation of the liquid crystal molecules can be controlled by controlling the position of the formed convex portion 10c.

The height of the convex portion 10c is preferably a half or less of the cell gap and smaller than the height of an insulator 10 formed on the periphery of each pixel so as to surround the liquid crystal region 3. If the convex portion 10c is too high, a polymer pillar is formed on the convex portion 10c. Also, it sometimes disturbs the orientation state of the liquid crystal molecules.

The convex portion 10c should have a size appropriate to serve as the nucleus for the separation of the liquid crystal. The size is preferably as small as possible. For example, it is about 30 μm or less. If the convex portion 10c is too large, a polymer pillar is formed on the convex portion 10c. This results in voltage drop which causes the reduction of the contrast.

The convex portion 10c can be made of organic materials such as a resist and inorganic materials such as $SiO_2$, $Al_2O_3$, and ITO, though not specified in the present invention. When a resist material is used, the convex portion 10c can be easily formed. When an ITO film which is a transparent conductive film is used, the convex portion 10c can be formed by forming a pixel electrode made of an ITO film over the substrate 101a on which the convex portion 10c has already been formed. Alternatively, an alignment film can be formed over the substrate 101a on which the convex portion 10c has already been formed. In order to place such a convex portion (the convex portion 10c, or that covered with the pixel electrode or the alignment film) at the center of the orientation axis of the liquid crystal molecules, it is preferable to use a material having a vertical orientation property. A resist material with F-based or Si-based additives added thereto, for example, can be used as such a material. In particular, a material having a surface free energy of 35 mN/m or less is preferable. Furthermore, in some cases, the orientation stability can be increased when the insulator 10 formed surrounding the pixel and the convex portion 10c are made of different materials.

The convex portion 10c can have a shape of a circle, a square, a rectangle, an oval, a star, a cross, and the like, though not specified in the present invention. The convex portions 10c do not necessarily have the same size in the vertical direction and can be tilted.

(2) Case where cell gaps of regions serving as symmetry axes in pixels during phase separation are large (case where concave portions are formed):

When the liquid crystal material and the polymerizable material are phase-separated by polymerization or temperature drop (especially, by temperature drop), if a concave portion is present on a substrate, the liquid crystal material phase-separated from the polymerizable material forms a sphere having the minimum surface tension at the concave portion and is stabilized. As a result, the liquid crystal deposits at the concave portion to develop a liquid crystal region so as to surround the periphery of the concave portion. Accordingly, the symmetry axis of the liquid crystal molecules can be aligned with the concave portion. Thus, the position of the symmetry axis of orientation of the liquid crystal molecules can be controlled by controlling the position of the formed concave portion.

The depth of the concave portion is not specified in the present invention. However, when an organic material is used, the depth is preferably as small as possible. This is because smaller depth causes less voltage drop which leads to the decrease in contrast.

The size of the concave portion is preferably large to some extent though it depends on the size of the pixel. Preferably, it is approximately 40% of the area of the pixel.

The concave portion can have a shape of a circle, a square, a rectangle, an oval, a star, a cross, and the like, though not specified in the present invention. The concave portions do not necessarily have the same size in the vertical direction and can be tilted.

The above-mentioned insulator provided on the periphery of each pixel can be provided on one of the substrates and the concave and convex portions can be provided on the other substrate or on both the substrates.

(Method for forming polymer walls)

The liquid crystal regions surrounded by the polymer walls are formed in the following manners:

(1) A mixture containing at least a liquid crystal material, a polymerizable material and a polymerization initiator is injected into a cell. The polymerizable material is allowed to be polymerized at a temperature equal to or greater than the homogeneously miscible temperature (Tiso) of the mixture so that the liquid crystal material is phase-separated from the polymerizable material. The homogeneously miscible temperature is a temperature at which the liquid crystal material and the polymerizable material become mutually miscible. The cell is then cooled, whereby liquid crystal regions surrounded by polymer walls are formed.

(2) A mixture containing at least a liquid crystal material, a polymerizable material, and a polymerization initiator is injected into a cell. The mixture is heated to or above the Tiso and then gradually cooled, so as to phase-separate the liquid crystal material from the polymerizable material. Thereafter, the polymerizable material is polymerized, whereby liquid crystal regions surrounded by polymer walls are formed.

In the above methods (1) and (2), when a photocurable resin is used, the resin can be cured by the irradiation of UV-rays (or visible light). When a thermosetting resin is used, the resin can be polymerized and phase-separated from the liquid crystal material by the method (1).

(Method for controlling orientation of polymer in polymer walls)

(1) Addition of polymerizable liquid crystalline compound:

In order to effectively align a polymer in polymer walls with the orientation direction of liquid crystal molecules under the application of a voltage, it is preferable to add a polymerizable liquid crystalline compound having functional groups exhibiting liquid crystallinity or similar functional groups in its molecules to a mixture of a liquid crystal material, a polymerizable material, and a polymerization initiator.

(2) Method for applying voltage or magnetic field during phase separation

Figure 9:
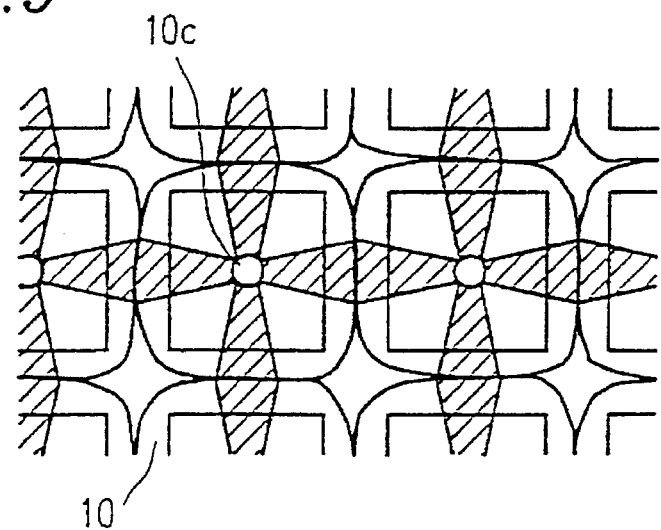
FIG. 9 is a view of a liquid crystal device provided with a convex portion at the center of each pixel in another example according to the present invention.

It is important that the axis-symmetrical orientation of liquid crystal molecules is formed in each pixel, and the orientation axis of liquid crystal molecules should not be displaced so widely with respect to the substrate. According to the study by the inventors of the present invention, when a voltage and/or a magnetic field are applied to a mixture containing at least a liquid crystal material, a polymerizable material, and a polymerization initiator while the liquid crystal material is phase-separated from the polymerizable material, it is possible to align the axis of axis-symmetrical orientation of the liquid crystal molecules in the liquid crystal regions with the vertical direction of the substrates. The application of a voltage and/or a magnetic field is especially effective when the liquid crystal is in a small droplet state appearing from an isotropic phase. Therefore, the voltage and/or the magnetic field can be weakened before the liquid crystal regions expand to cover the entire pixel. The magnitude of the voltage and the magnetic field should be greater than a threshold of the liquid crystal (a value evaluated by the TN cell) and can be periodically changed. FIG. 9 is a view of a liquid crystal device observed with a polarizing microscope, the device being provided with convex portions 10c at the center of each pixel and produced by being applied with a voltage (or a magnetic field) while a liquid crystal material is phase-separated from a polymerizable material.

(Polymerizable material)

As the polymerizable material in the present invention, curable resins such as a photocurable resin and a thermosetting resin, which may include a monomer, an oligomer, and a polymer, can be used.

Examples of the photocurable resin include acrylic acids and acrylates having a long-chain alkyl group with three or more carbon atoms or having a benzene ring: More specifically, examples include isobutyl acrylate, stearyl acrylate, lauryl acrylate, isoamyl acrylate, n-butylmethacrylate, n-laurylmethacrylate, tridecylmethacrylate, 2-ethylhexylacrylate, n-stearylmethacrylate, cyclohexylmethacrylate, benzylmethacrylate, 2-phenoxyethylmethacrylate, isobornylacrylate, and isobornylmethacrylate. Furthermore, in order to increase the physical strength of the polymer, a multi-functional resin having two or more functional groups is preferable. Examples of such a resin include bisphenol A dimethacrylate, bisphenol A diacrylate, 1,4-butanedioldimethacrylate, 1,6-hexanedioldimethacrylate, trimethylolpropanetrimethacrylate, trimethylolpropanetriacrylate, tetramethylolmethanetetraacrylate, neopentyldiacrylate, and R-684. Furthermore, in order to clearly phase-separate the liquid crystal material from the polymerizable material, resins obtained by halogenating, especially chlorinating or fluorinating the above monomers are more preferable. Examples of such resins include 2,2,3,4,4,4-hexafluorobutylmethacrylate, 2,2,3,4,4,4-hexachlorobutylmethacrylate, 2,2,3,3-tetrafluoropropylmethacrylate, 2,2,3,3-tetrafluoropropylmethacrylate, perfluorooctylethylmethacrylate, perchlorooctylethylmethacrylate, perfluorooctylethylacrylate, and perchlorooctylethylacrylate.

Examples of the thermosetting resin include bisphenol A diglycidyl ether, isobornylacrylate, and perfluorooctylethylacrylate.

(Photopolymerization retarder)

In order to enlarge the size of liquid crystal droplets, i.e., the liquid crystal regions, it is preferred to add a compound such as a photopolymerization retarder suppressing polymerization to the above-mentioned mixture besides the polymerizable material. For example, monomers and compounds capable of stabilizing a radial by a resonance effect after the production of the radical can be used. More specifically, styrene, and derivatives of styrene such as p-chlorostyrene and p-phenylstyrene can be used.

(Polymerization initiator)

The mixture can also contain a photopolymerization initiator or a thermal polymerization initiator. Examples of the photopolymerization initiator include Irgacure 184, 651, 907 (manufactured by CIBA-GEIGY Corporation), and Darocure 1173, 1116, 2956 (manufactured by Merck & Co., Inc.). A polymerization initiator or a sensitizer which allows for polymerization with visible light of low energy can also be added to the mixture to improve the voltage retention. As the thermal polymerization initiator, t-butyl peroxide can be used.

The amount of the polymerization initiator added to the mixture is not specified in the present invention because it varies depending on the reactivity of each compound. It is preferable, however, in the range of about 0.01% to about 5% of the mixture of the liquid crystal material and the polymerizable material (including the polymerizable liquid crystalline compound described later). If the amount is less than about 0.01%, polymerization is not sufficiently effected. If it is more than about 5%, the phase separation of the liquid crystal material from the polymerizable material is effected too fast to be controlled. The resultant liquid crystal droplets are small, which increases the drive voltage and decreases the alignment control force of the liquid crystal on the substrate. Furthermore, the liquid crystal region becomes smaller in each pixel, and, when the irradiation intensity distribution is produced by the use of a photomask, liquid crystal droplets are formed in light shielded portions (i.e., outside the pixels). This lowers the contrast of the display.

(Liquid crystal material)

An organic mixture exhibiting a liquid crystalline state at around room temperature is used as the liquid crystal material of the present invention. This includes nematic liquid crystal (liquid crystal for 2-frequency driving; including liquid crystal of $\Delta\epsilon<0$), cholesteric liquid crystal (in particular, exhibiting a selective reflection characteristic against visible light), smectic liquid crystal, ferroelectric liquid crystal, and discotic liquid crystal. These types of liquid crystal can be used in combination. Especially, the nematic liquid crystal with the cholesteric liquid crystal (a chiral agent) added thereto is preferable from the characteristic point of view.

Furthermore, a liquid crystal material having excellent chemical reaction resistivity is preferable because the processing includes the photopolymerization. Examples of such a liquid crystal material include those containing halogen atoms such as fluorine atoms and having functional groups including halogen atoms (e.g., ZLI-4801-000, ZLI-4801-001, ZLI-4792, and ZLI-4427 (manufactured by Merck & Co., Inc.).

In the case where a dichroic dye is added to the liquid crystal material so as to change the orientation direction of dye molecules, the device can be used in a guest-host type display mode utilizing the change in absorbance of light passing through a liquid crystal layer. Japanese Laid-Open Patent Publication No. 5-224191 discloses a technology in which a guest-host type display mode is applied to a polymer dispersed liquid crystal display device composed of liquid crystal and a polymer. When a guest-host type display device is produced in accordance with the present invention, the number of polarizing plates can be reduced, so that it is expected that light transmittance of a panel is enhanced. Thus, the guest-host type display device in accordance with the present invention can be applied to a reflection type liquid crystal device. It is important that the dichroic dye which can be used for this purpose satisfies the following items:

(1) The dichroic dye should be dissolved in the host liquid crystal material to such a degree that sufficient optical density is obtained;

(2) The dichroic dye should have a large dichroic ratio contributing to the contrast of the display; and (3) The dichroic dye should be excellent in stability of a compound including light resistance.

In general, anthraquinone type dyes are widely applied, which have high light resistance and outstanding solubility with respect to liquid crystal, and are not likely to prevent polymerization of a number of polymerizable materials. In addition, azo type and benzoquinone type dichroic dyes can be used, though not specified in the present invention. The adding ratio of the dichroic dye is preferably about 0.05% to about 10% by weight, more preferably about 0.1% to about 5% by weight based on the weight of the host liquid crystal material. When the adding ratio exceeds about 10% by weight, the dichroic dye is not dissolved in the host liquid crystal material and the amount of light passing through the liquid crystal layer decreases, resulting in the decrease in light transmittance of the panel. When the adding amount is less than about 0.05% by weight, it becomes difficult to sufficiently change light absorbance by controlling the orientation direction of dye molecules.

(Polymerizable liquid crystalline compound)

A liquid crystalline compound having a polymerizable functional group (hereinafter, referred to as a polymerizable liquid crystalline compound; this material itself does not need to exhibit liquid crystallinity) can be added to the mixture of the liquid crystal material and the polymerizable material. The addition of the polymerizable liquid crystalline compound serves to suppress disclination lines arising on the periphery of the liquid crystal regions.

Preferably, the selected liquid crystal material and polymerizable liquid crystalline compound resemble each other in portions exhibiting liquid crystallinity. In particular, when the liquid crystal material is an F or Cl based material which shows a peculiar chemical property, the polymerizable liquid crystalline compound is preferably an F or Cl based material.

A compound represented by the following Formula (1) which is not likely to disturb liquid crystallinity of the host liquid crystal molecules as a host, is usable as the polymerizable liquid crystalline compound.

$$A\text{-}B\text{-}LC \qquad (1)$$

where

A denotes a polymerizable functional group, for example, a functional group having an unsaturated bond such as an alkenyl containing group such as $CH_2=CH-$, $CH_2=CH-COO-$, and $CH_2=C(CH_3)-COO-$, or a hetero ring structure with a distortion such as

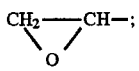

B denotes a linking group linking the polymerizable functional group with the polymerizable liquid crystalline compound, for example, bonding groups such as an alkyl chain (—$(CH_2)_n$—), an ester bond (—COO—), an ether bond (—O—), and a polyethyleneglycol chain (—$CH_2CH_2O$—), and a combination thereof; and LC denotes the polymerizable liquid crystalline compound. The linking group B preferably exhibits liquid crystallinity when the polymerizable liquid crystalline compound is mixed with the liquid crystal material. Accordingly, the linking group B having six or more bonds from the polymerizable functional group A to the rigid portion of the polymerizable liquid crystalline compound LC is particularly preferred. The polymerizable liquid crystalline compound LC is a liquid crystalline compound represented by the following Formula (2), a cholesterol ring, a derivative thereof, or the like.

$$D-E-G \qquad (2)$$

where G denotes a polar group which exhibits dielectric constant anisotropy and the like of liquid crystal, for example, a benzene ring having a functional group such as —CN, —$OCH_3$, —Cl, —$OCF_3$, —$OCCl_3$, —H, and —R (R denotes an alkyl group), a cyclohexane ring, a paradiphenyl ring, and phenylcyclohexane ring; E denotes a functional group linking D with G, for example, a single bond, —$CH_2$—, —$CH_2CH_2$—, —O—, —C≡C—, and —CH=CH—; and D denotes a functional group binding to B, which influences the magnitude of dielectric constant anisotropy and refractive index anisotropy of the liquid crystal molecules, for example, a paraphenyl ring, a 1,10-diphenyl ring, 1,4-cyclohexane ring, and 1,10-phenylcyclohexane ring.

(Mixing ratio of liquid crystal material to polymerizable material)

The mixing ratio by weight of the liquid crystal material to the polymerizable material (including the curable resin and the polymerizable liquid crystalline compound) is preferably about 50:50 to about 97:3, more preferably about 70:30 to about 95:5, though it depends on the size of the pixel. When the liquid crystal material is less than about 50%, the effect of the polymer walls increases, which rises the drive voltage of the cell so greatly as to make the cell impractical. If the liquid crystal material is more than about 97%, the physical strength of the polymer walls lowers, and thus stable performance is not obtainable. The ratio by weight of the polymerizable liquid crystalline compound to the curable resin can be 0.5% or more by weight within the above range of the weight ratio.

(Method for driving cell)

The fabricated cell can be driven by a simple matrix driving method or an active matrix driving method by the use of TFTs or MIMs. The driving method is not specified in the present invention.

(Substrate material)

Any transparent solid body allowing visible light to transmit therethrough can be used as the substrate material. Specifically, glass, quartz, plastic, a polymer film or the like can be used. Especially, a plastic substrate is suitable because a rough surface can be formed by embossing and the like. Also, substrates made of different materials can be used to form a cell. Furthermore, a pair of substrates made of the same material or different materials can have different thicknesses.

(Beads formed at center of pixel)

In the case where beads for spacers are present at boundaries between the pixels and the insulating film (for example, polymer walls), the orientation axis is sometimes formed at a position where the beads are present (for example, polymer wall portions). In order to solve this problem, by fixing the beads for spacers at a position where the orientation axis is desired to be formed, the orientation axis can be fixed at the center of each pixel, for example. More specifically, by allowing the liquid crystal molecules in the liquid crystal regions in the pixels to be aligned axis-symmetrically and the beads for spacers to be present at the symmetry axis of the liquid crystal regions and in the vicinity thereof, the beads for spacers will not be present at the boundaries between the pixels and the insulating film (for example, the polymer wall portions), and the orientation axis of the liquid crystal molecules will be present at the symmetry axis of the liquid crystal regions or only in the vicinity thereof. Thus, a liquid crystal display device of outstanding uniform display quality without any roughness can be obtained.

(Position of spacers and insulator as gap keeping member)

It is proposed in the present application that spacers and an insulating film as a gap keeping member are positioned in various embodiments as follows:

(1) Gap keeping members (including spacers, an insulator, a light shielding layer, etc.) are positioned only outside pixels.

(2) Gap keeping members are positioned outside and inside pixels; specifically, a gap keeping member is positioned outside pixels and island-shaped insulators are formed in the vicinity of each center of liquid crystal regions in pixels so as to control orientation axes.

(3) A gap keeping member such as beads for spacers is positioned only at portions where orientation axes of centers of liquid crystal regions in pixels are stipulated.

In the case where a gap keeping member is provided outside pixels, it is formed so as to be covered with a light-shielding layer described later or polymer regions. Furthermore, when the gap keeping member cannot be sufficiently covered with the light-shielding layer or polymer regions, the outside of a pattern of the member can be fixed being surrounded by an insulator as a gap keeping member, polymer regions formed by polymerization and phase separation, or the like.

In the case where a gap keeping member such as spacers is provided in pixels, it is effective that the outside of the member is covered with an insulator as a gap keeping member, polymer regions formed by polymerization and phase separation, or the like.

Figure 10A:
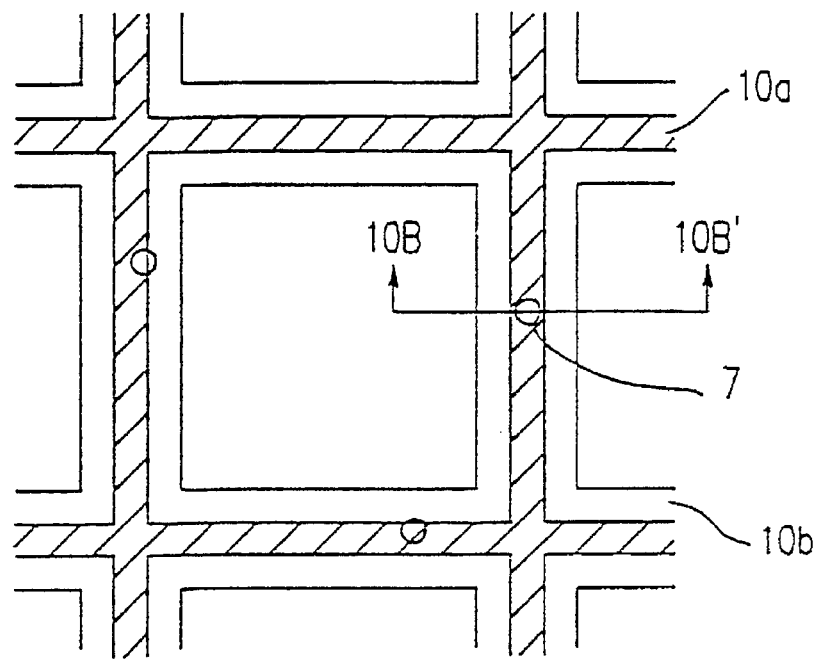
FIG. 10A is a plan view schematically showing a substrate provided with spacers, a layer including the spacers, and an insulating layer covering the spacers and the layer including the spacers according to an example of the present invention (e.g., Example 19)
Figure 10B:
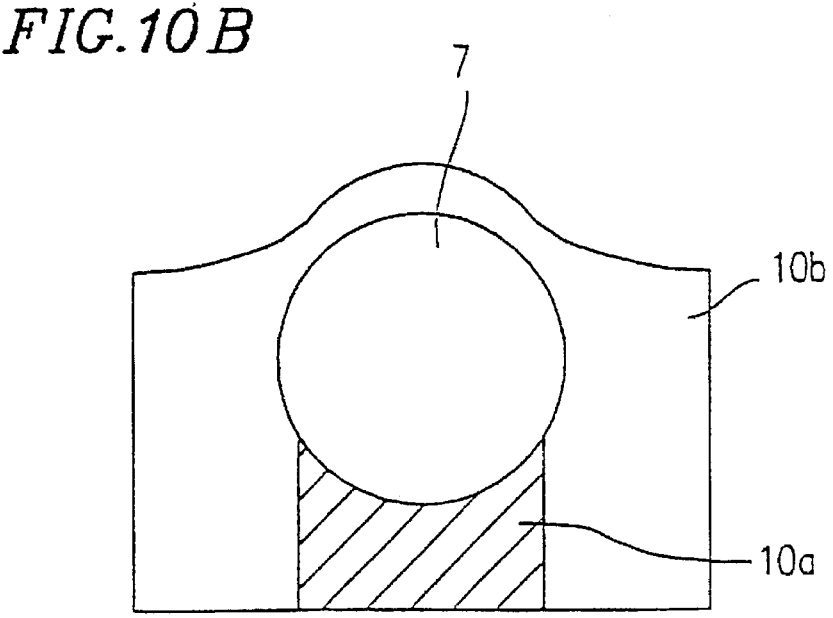
FIG. 10B is a cross-sectional view taken along a line 10B–10B' of FIG. 10A.

Gap keeping members (beads spacers, etc.) as shown in FIGS. 10A and 10B (showing a schematic view of a pattern outside pixels) are positioned as described above so as to keep a cell gap uniform, whereby the objective of the present invention can be achieved.

(Light shielding layer)

As the light shielding layer, a metallic thin film such as a metal wiring, as well as a BM can be used. Particularly in the case of an active matrix substrate, metal wirings such as gate signal lines, source signal lines, interlevel insulators, and storage capacitance wirings can also work as the light shielding layer. As a material for the light shielding layer, metallic thin films, alloy thin films, organic films containing a colored pigment such as a black pigment, having light shielding ability are preferable.

Example 1

Figure 11:
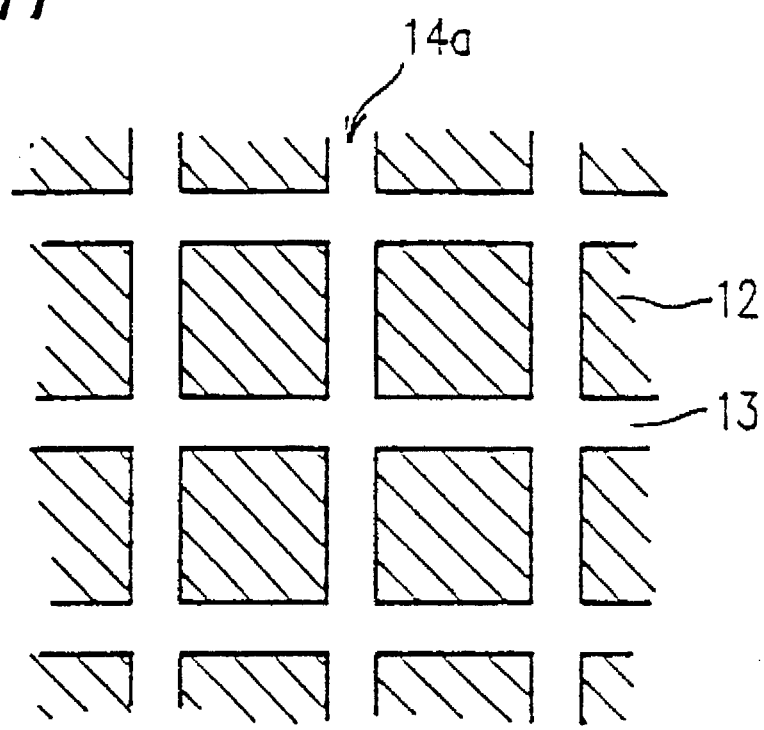
FIG. 11 is a plan view of a photomask 14a used for producing a liquid crystal device in Example 1 according to the present invention.
Figure 13:
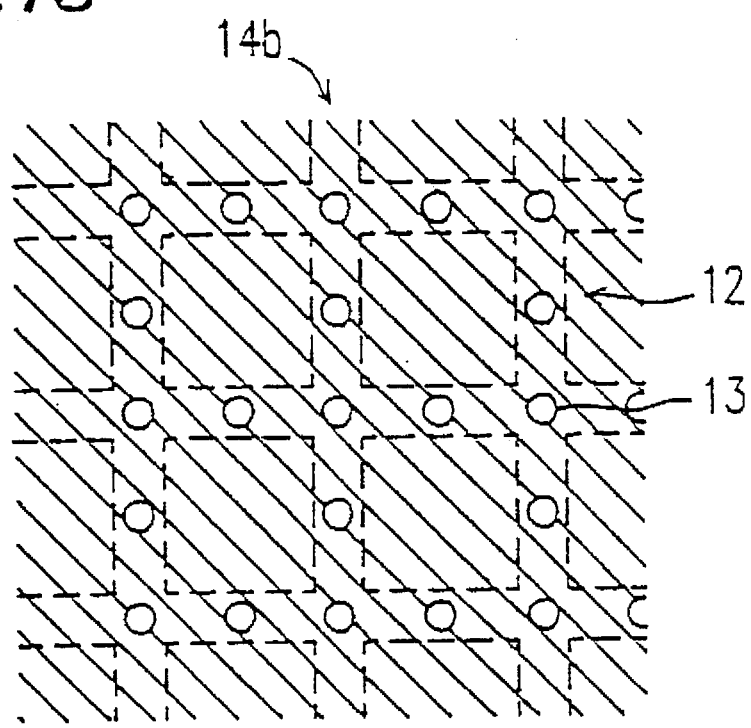
FIG. 13 is a plan view showing a photomask 14b used for producing the liquid crystal device in Example 1 according to the present invention.
Figure 16:
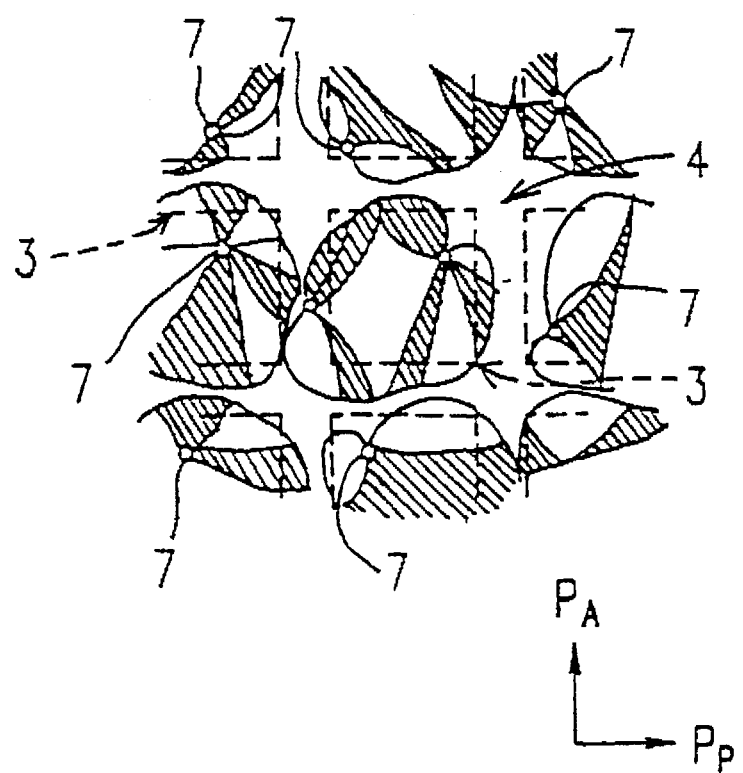
FIG. 16 is a view of a liquid crystal device in Comparative Example 2 observed with a polarizing microscope.

A pair of glass substrates 1a and 1b (thickness: 1.1 mm) respectively having transparent electrodes 2a and 2b made of ITO (thickness: 50 nm; mixture of indium oxide and tin oxide) were prepared. A negative black resist CFPR-BK510S (produced by Tokyo Ohka-sha) with a black pigment dispersed therein was uniformly coated onto one of the substrates 101a by spin coating at 500 rpm for 20 seconds. The substrate 101a was baked, exposed to light (200 mJ/cm$^2$) with a predetermined intensity through a photomask 14a, as shown in FIG. 11, provided with light shielding portions 12 and light transmitting portions 13, developed, rinsed, and baked again. As a result, a first insulating layer 10a made of a black resin layer (thickness: 2.4 µm) was patterned outside pixels as shown in FIGS. 12A and 12B. Then, an insulating material, i.e., a negative photoresist OMR83 (produced by Tokyo Ohka-sha) with 0.1% by weight of plastic beads (Micropearl; produced by Sekisui Fine Chemical Co., Ltd.) having an average particle size of 3.4 µm uniformly dispersed therein was uniformly coated onto the resultant substrate 101a by spin coating. The substrate 101a was baked, exposed to light (240 mJ/cm$^2$) with a predetermined intensity through a photomask 14b, as shown in FIG. 13, provided with light shielding portions 12 and light transmitting portions 13, developed, rinsed, and baked again. As a result, a second insulating layer 10b made of a wall-shaped insulating layer (thickness: 2.8 µm) was patterned outside pixels as shown in FIGS. 12B and 12C. In FIG. 13, a broken line represents the positional relationship between the photomasks 14a and 14b. The polymer regions 4 is observed as black regions under a crossed-Nicols state.

A sealant (Structbond XN-21S; baking temperature: 170° C./2 hours) was patterned on the other substrate 101b by printing. This substrate 101b was attached to the above-mentioned substrate 101a to construct a liquid crystal cell with a cell gap of 5.0 µm.

Next, 0.15 g of perfluorooctylethylacrylate, 0.26 g of lauryl acrylate and 0.1 g of R-684 (produced by Nippon Kayaku Co., Ltd.) as a polymerizable material; 0.19 g of p-phenylstyrene as a photopolymerization retarder; 4.25 g of ZLI-4792 (produced by Merck & Co., Inc.; containing 0.3% by weight of S-811) as a liquid crystal material; 0.025 g of Irgacure 651 as a photopolymerization initiator were mixed. The mixture was injected into the cell by a vacuum injection method under a reduced pressure.

The cell was kept at a temperature allowing the mixture to be homogeneous (i.e., 110° C.) and a voltage with 60 Hz having an effective voltage of 2.5 volts was applied across transparent electrodes 2a and 2b. Under this condition, UV-rays were irradiated to the cell through the substrate 101a with the insulating layers 10a and 10b formed thereon for 5 minutes with a high-pressure mercury lamp at 10 mW/cm$^2$, whereby the polymerizable material was cured. Thereafter, the cell was cooled to 40° C. over 5 hours under the application of a voltage and further cooled to room temperature (25° C.). Thereafter, the cell was exposed to UV-rays, whereby the polymerizable material was completely polymerized. UV-rays can be irradiated to the cell either through the substrate 101a or the substrate 101b.

Table 1 shows the surface free energy of the ITO electrodes 2a and 2b on one of the substrates 1a and 1b and that of the patterned insulating layers 10a and 10b. Table 2 shows the surface free energy of the liquid crystal material and that of the polymerizable material.

TABLE 1

Surface free energy of substrate surface

|  | ITO electrode | Patterned insulating layers |
|---|---|---|
| Surface free energy γc (mN/m) | 92.8 | 34.0 |

TABLE 2

Surface free energy of liquid crystal material and polymerizable material

|  | ZLI-4792 (containing 0.3% by weight of S-811) | Polymerizable material (Example 1) |
|---|---|---|
| Surface free energy γc (mN/m) | 32 | 28 |

It is understood from Tables 1 and 2 that the polymerizable material was preferentially separated from the mixture to form polymer regions outside the pixels on the insulating layers 10a and 10b.

The cell was observed with a polarizing microscope, as shown in FIG. 12C, indicating that liquid crystal regions 3 surrounded by polymer regions 4 were respectively in a mono-domain state per pixel and aligned in a relatively uniform axis-symmetrical shape without their orientations being disturbed by spacers in the pixels. Furthermore, under the condition that a polarizer and an analyzer of the microscope were fixed in a crossed-Nicols state, the cell was rotated. It seemed that only the polymer walls 4 were rotated while the extinction patterns of the liquid crystal regions 3 remained in regular positions. This showed that almost all of the liquid crystal regions 3 obtained uniform axis-symmetrical orientations. In FIG. 12C, the arrows $P_P$ and $P_A$ indicate the polarization directions of the polarizing plates. $P_P$ corresponds to a polarizer and $P_A$ correspond to an analyzer of the polarizing microscope.

Two polarizing plates were attached to the cell so that polarizing axes were orthogonal to each other to produce a liquid crystal device.

The device was observed with a polarizing microscope under the application of a voltage, confirming that disclination lines were not formed and the cell was entirely black.

The electro-optic characteristics and the evaluation of roughness of the liquid crystal device thus produced are shown in Table 3 and FIGS. 14A through 14F. The electro-optic characteristics are shown, assuming that two polarizing plates positioned so that polarizing axes are in parallel with each other allow light to transmit therethrough by 100%. In the inversion phenomenon in gray scales of Table 3, represents a state where the inversion phenomenon did not occur; x a state where the inversion phenomenon was easily observed; and a state where the inversion phenomenon was barely observed.

TABLE 3

Display characteristics of liquid crystal device

| | Example 1 | Comparative example 1 | Comparative example 2 | Example 4 | Example 11 |
|---|---|---|---|---|---|
| Light transmittance under application of voltage (%) | 71 | 94 | 67 | 76 | 66 |
| Light transmittance under application of voltage of 10 volts (%) | 0.5 | 0.1 or less | 0.8 | 0.4 | 0.5 |
| Saturated voltage $V_{90}$ (V) | 5.3 | 4.3 | 5.4 | 5.3 | 5.4 |
| Inversion phenomenon in gray scales | ○ | X | ○ | ○ | ○ |
| Disclination lines in pixels | None | None | Many | None | None |

As shown in FIGS. 14A through 14F, in the liquid crystal device of Example 1, the inversion phenomenon as seen in a TN cell of Comparative Example 1 described later did not occur, and the light transmittance did not increase in a large viewing angle direction under the condition that a voltage was saturated. Furthermore, as shown in Table 3, roughness was not observed in gray scales in the liquid crystal device of Example 1.

Since the insulating layers 10a and 10b were provided outside pixels, the cell gap was able to be kept uniform even without spacers in the pixels. Furthermore, the polymer regions 4 were provided outside the pixels so as to combine with the insulating layers 10a and 10b and the insulating layer 10a included spacers; therefore, the liquid crystal device had outstanding shock resistance and strength.

Example 2

In Example 2, a liquid crystal alignment film was formed by a non-rubbing process to control the orientation of liquid crystal molecules in a liquid crystal layer.

An m-cresol solution containing 1% by weight of a linear crystalline polymer (Nylon 6;6) was coated onto one of substrates each having an ITO electrode similar to the one used in Example 1 by spin coating. The resultant substrate was allowed to stand at 140° C. for 2 hours. Then, the substrate was cooled to room temperature at a cooling speed of 6° C./minute in a nitrogen atmosphere, whereby a liquid crystal alignment film having a spherulite size of 30 μm was formed by a non-rubbing process.

Next, a negative black resist CFPR-505S (produced by Tokyo Ohka-sha) with a black pigment dispersed therein was uniformly coated onto one of the substrates by spin coating at 500 rpm for 20 seconds. The substrate was baked, exposed to light (200 mJ/cm²) with a predetermined intensity through a photomask provided with light shielding portions for pixel regions and light transmitting portions for regions other than the pixel regions, developed, rinsed, and baked again. As a result, a first insulating layer made of a black resin layer (thickness: 2.4 μm) was patterned outside pixels. Then, an insulating material, i.e., a transparent and heat-resistant negative resist V-259PA (produced by Nippon Steel Chemical Co., Ltd.) with 0.1% by weight of plastic beads (Micropearl; produced by Sekisui Fine Chemical Co., Ltd.) having an average particle size of 3.2 μm uniformly dispersed therein was uniformly coated onto the resultant substrate by spin coating. The substrate was baked, exposed to light with a predetermined intensity through a photomask provided with light transmitting portions, only the corner of each portion being used for light transmission, developed, rinsed, and baked again. As a result, a second insulating layer was patterned outside pixels.

A sealant was patterned on the other substrate by printing. This substrate was attached to the above-mentioned substrate to construct a liquid crystal cell with a cell gap of 5.2 μm.

A liquid crystal material ZLI-4792 (produced by Merck & Co., Inc.; containing 0.3% by weight of S-811) was injected into the liquid crystal cell thus obtained by a vacuum injection method.

The cell was observed under crossed-Nicols with a polarizing microscope so as to obtain the electro-optic characteristics thereof as follows: A large viewing angle liquid crystal panel was obtained, in which the light shielding and the disturbance of the orientation of liquid crystal molecules did not occur due to the absence of spacers in the pixels and the black and white inversion was not caused even when the cell was seen at a viewing angle of ±40°. Furthermore, the liquid crystal device of Example 2 was provided with the first and second insulating layers, so that the cell gap was able to be kept uniform even without spacers in the pixels.

Comparative Example 1

An alignment film (AL4552, manufactured by Nippon Synthetic Rubber Co., Ltd.) was formed on a pair of substrates each having an ITO electrode similar to the one used in Example 1. The alignment films were subjected to rubbing treatment with a nylon cloth. Plastic beads (Micropearl; produced by Sekisui Fine Chemical Co., Ltd.) having an average particle size of 5 μm were uniformly dispersed on both of the substrates. A sealant (Structbond XN-21S; baking temperature: 170° C./2 hours) was patterned on one of the substrates by printing. The substrates were attached to each other so that the rubbing directions of the alignment films were orthogonal to each other to construct a liquid crystal cell with a cell gap of 5.0 μm.

A liquid crystal material ZLI-4792 (produced by Merck & Co., Inc.; containing 0.3% by weight of S-811) was injected into the liquid crystal cell thus obtained, and two polarizing plates were attached to the cell so that the polarizing axes were orthogonal to each other to construct a conventional TN liquid crystal display device.

The electro-optic characteristics of the liquid crystal device and the evaluation of roughness are shown in Table 3 and FIGS. 15A through 15F. As shown in FIGS. 15A through 15F, in the liquid crystal device of Comparative Example 1, the inversion phenomenon occurred in gray scales, and the light transmittance increased in a large viewing angle direction at a time when a voltage was saturated. Furthermore, roughness was observed in gray scales as shown in Table 3.

Comparative Example 2

A negative photoresist OMR83 (manufactured by Tokyo Ohka-sha) was patterned over the entire region outside pixels on one of a pair of substrates similar to those in Example 1. Then, a sealant (Structbond XN-21S; baking temperature: 150° C./2 hours) was patterned on the substrate by printing.

Plastic beads (Micropearl; produced by Sekisui Fine Chemical Co., Ltd.) having an average particle size of 5.3 μm were uniformly dispersed on the other substrate, and both of the substrates were attached to each other to construct a liquid crystal cell with a cell gap of 5.0 μm.

A mixture containing a liquid crystal material and a polymerizable material similar to those in Example 1 were injected into the liquid crystal cell thus constructed to produce a liquid crystal device in the same way as in Example 1.

Observation with a polarizing microscope of the liquid crystal device revealed that spacers 7 present in the pixels partially disturbed the orientation of axis-symmetrically aligned liquid crystal molecules in the liquid crystal regions 3. Furthermore, this disturbance of the orientation caused disclination lines to be formed.

The electro-optic characteristics of the liquid crystal device and the evaluation of roughness are shown in Table 3. As shown in Table 3, a number of disclination lines were formed in the liquid crystal device of Comparative Example 2.

Example 3

In Example 3, a completely beadless liquid crystal device was produced by using one insulating layer.

A photosensitive polyimide ("Photoneece" UR-3140; produced by Toray Industries, Inc.) was uniformly coated onto one of a pair of substrates similar to those in Example 1 by spin coating at 3000 rpm for 20 seconds. The polyimide film (thickness: 9.1 μm) was baked and exposed to light (150 mJ/cm$^2$) having a predetermined intensity through a photomask 14b shown in FIG. 13, developed, rinsed, and baked again. As a result, an insulating layer (final thickness: 5.3 μm) was patterned outside pixels.

A sealant (Structbond XN-21S; baking temperature: 170° C./2 hours) was patterned on the other substrate by printing. Both of the substrates were attached to each other, using only the insulating layer provided outside the pixels as spacers to construct a liquid crystal cell with a cell gap of 5.1 μm.

A mixture containing a liquid crystal material and a polymerizable material similar to those in Example 1 was injected into the liquid crystal cell thus constructed. The mixture was phase-separated and the polymerizable material was polymerized in the same way as in Example 1 to produce a liquid crystal device.

Observation with a polarizing microscope of the liquid crystal cell thus produced revealed that liquid crystal molecules in each liquid crystal region were axis-symmetrically aligned in the same way as in Example 1, and polymer regions generated during the phase separation and polymerization step were formed so as to cover the insulating layer patterned outside the pixels. Thus, the cell gap was kept uniform by the insulating layer and shock resistance was improved.

Example 4

In Example 4, a liquid crystal device was produced by combining thermal phase separation and phase separation by photopolymerization.

Heat-resistant negative black resist V-259-BK (manufactured by Nippon Steel Chemical Co., Ltd.) with carbon black dispersed therein was uniformly coated on one of a pair of substrates similar to those in Example 1 by spin coating at 500 rpm for 20 seconds. The substrate was baked, exposed to light (300 mJ/cm$^2$) having a predetermined intensity through a photomask 14a shown in FIG. 11, developed, rinsed, and baked again. As a result, a first insulating layer made of a black resin layer with a thickness of 2.1 μm was patterned outside pixels. Then, an insulating material, i.e., a negative photoresist OMR83 (produced by Tokyo Ohka-sha) with 0.1 by weight of plastic beads (Micropearl; produced by Sekisui Fine Chemical Co., Ltd.) having an average particle size of 3.4 μm uniformly dispersed therein was uniformly coated onto the resultant substrate by spin coating. The substrate was baked, exposed to light (240 mJ/cm$^2$) with a predetermined intensity through a photomask 14b as shown in FIG. 13, developed, rinsed, and baked again. As a result, a second insulating layer made of a wall-shaped insulating layer (thickness: 2.8 μm) was patterned outside pixels.

A sealant (Structbond XN-21S; baking temperature: 170° C./2 hours) was patterned on the other substrate by printing. Both of the substrates were attached to each other to construct a liquid crystal cell with a cell gap of 5.0 μm.

A mixture containing a liquid crystal material and a polymerizable material similar to those in Example 1 was injected into the liquid crystal cell thus constructed by a vacuum injection method under a reduced pressure.

Then, the mixture was cooled in 5 to 10 cycles from 110° C. at which the mixture is in an isotropic phase, to 55° C. at which the mixture is in a liquid crystal phase and isotropic phase. The mixture was thermally phase-separated into a liquid crystal material and a polymerizable material at 53° C. Thereafter, the mixture was irradiated with UV-rays for 5 minutes with a high-pressure mercury lamp at 10 mW/cm$^2$ while a voltage with 60 Hz having an effective voltage of 2.5 volts was applied across the transparent electrodes, whereby the polymerizable material was cured. Thereafter, the mixture was cooled to room temperature (25° C.) while being applied with a voltage and was further exposed to UV-rays, whereby the polymerizable material was completely polymerized.

Observation with a polarizing microscope of the cell thus obtained revealed that liquid crystal regions surrounded by polymer regions were in a mono-domain state with respect to each pixel and aligned in a relatively uniform axis-symmetrical shape without their orientations being disturbed by spacers in the pixels.

Then, two polarizing plates were attached to the cell in the same way as in Example 1 to produce a liquid crystal device.

The liquid crystal device thus produced was observed with a polarizing microscope under the application of a voltage, confirming that disclination lines were not formed and the cell was entirely black.

The electro-optic characteristics of the liquid crystal device thus produced and the evaluation of roughness are shown in Table 3. As shown in Table 3, the inversion phenomenon as seen in the TN cell of Comparative Example 1 did not occur in the liquid crystal device of Example 4 and the light transmittance did not increase in a large viewing angle direction under the condition that a voltage was saturated. Furthermore, roughness was not observed in gray scales in the liquid crystal device of Example 4.

Since the insulating layers were provided outside pixels, the cell gap was able to remain uniform even without spacers in the pixels. Furthermore, the polymer regions were provided outside the pixels so as to combine with the insulating layers and the insulating layers included spacers; therefore, the liquid crystal device had outstanding shock resistance.

Example 5

In Example 5, an insulating layer made of a non-photosensitive resin layer was patterned.

Polyimide ("Semicofine" SP-910; produced by Toray Industries, Inc.) was uniformly coated onto one of a pair of substrates similar to those in Example 1 by spin coating at 3000 rpm for 20 seconds. The substrate was baked, coated with a positive photoresist OFPR800 (produced by Tokyo Ohka-sha), baked, exposed to light (240 mJ/cm$^2$) with a predetermined intensity through a photomask 14b shown in FIG. 13, developed, and rinsed. The polyimide film was etched using the photoresist as a mask, the photoresist was peeled off, and the remaining polyimide was cured. As a result, an insulating layer made of a non-photosensitive resin layer with a thickness of 5.1 μm was patterned outside pixels.

A sealant (Structbond XN-21S; baking temperature: 170° C./2 hours) was patterned on the other substrate by printing. Both of the substrates were attached to each other to construct a liquid crystal cell with a cell gap of 4.9 μm.

A mixture containing a liquid crystal material and a polymerizable material similar to those in Example 1 was injected into the liquid crystal cell thus constructed. The mixture was phase-separated and polymerized in the same way as in Example 1, whereby a liquid crystal device was produced.

Observation with a polarizing microscope of the liquid crystal device revealed that liquid crystal regions surrounded by polymer regions were axis-symmetrically aligned and spacers did not disturb the orientation of liquid crystal molecules in the pixels. Furthermore, since the polymer regions were provided outside the pixels to combine with the insulating layer, the liquid crystal device had outstanding shock resistance.

Example 6

In Example 6, a thermosetting resin was used as a polymerizable material.

A mixture containing 0.25 g of bisphenol A diglycidyl ether, 0.2 g of isobornylacrylate, and 0.1 g of perfluorooctylethylacrylate as a polymerizable material; ZLI-4792 (produced by Merck & Co., Inc.; containing 0.3% by weight of S-811) as a liquid crystal material; and 0.05 g of t-butylperoxide as a thermal polymerization initiator was injected into the liquid crystal cell produced in the same way as in Example 1.

Thereafter, the cell was heated at 150° C. for 2 hours under the application of a voltage having a frequency of 60 Hz and an effective voltage of 2.5 volts across transparent electrodes, whereby the phase separation by polymerization of the system is promoted. In addition, the cell was cooled from 150° C. to 30° C. over 12 hours, whereby the alignment state of the liquid crystal regions was fixed.

Observation with a polarizing microscope of the cell thus constructed revealed that the orientation state similar to that of Example 1 was formed and the electrooptic characteristics with polarizing plates under crossed-Nicols were satisfactory. Furthermore, since the polymer regions were provided outside pixels so as to combine with the insulating layer, a liquid crystal device having outstanding shock resistance was obtained.

Example 7

In Example 7, a polymerizable liquid crystalline compound was added to a mixture of a liquid crystal material and a polymerizable material.

A mixture containing 0.1 g of R-684 (produced by Nippon Kayaku Co., Ltd.) as a polymerizable material; 0.19 g of p-phenylstyrene as a photopolymerization retarder; 0.06 g of the following compound 1 as a polymerizable liquid crystalline compound; 3.74 g of ZLI-4792 (produced by Merck & Co., Inc.; containing 0.3% by weight of S-811) as a liquid crystal material; and 0.02 g of Irgacure 651 as a photopolymerization initiator was injected into the liquid crystal cell constructed in the same way as in Example 1. The mixture was phase-separated and the polymerizable material was polymerized in the same way as in Example 1, whereby a liquid crystal device was produced.

(Compound 1)

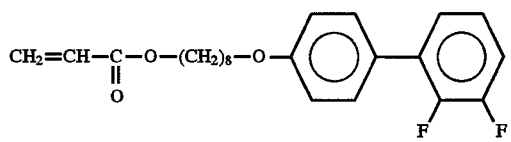

Observation with a polarizing microscope under crossed-Nicols of the cell thus constructed revealed that the axis-symmetrical orientation state similar to that of Example 1 was formed and disclination lines were not formed even under the application of a voltage. Furthermore, even in a black state of the cell under the application of a voltage, the amount of light leakage was small and viewing angle characteristics were satisfactory. Additionally, since polymer regions were formed outside pixels so as to combine with the insulating layer, a liquid crystal device having outstanding shock resistance was obtained.

Example 8

In Example 8, a liquid crystal device was produced by patterning an insulating material by printing.

Figure 17:
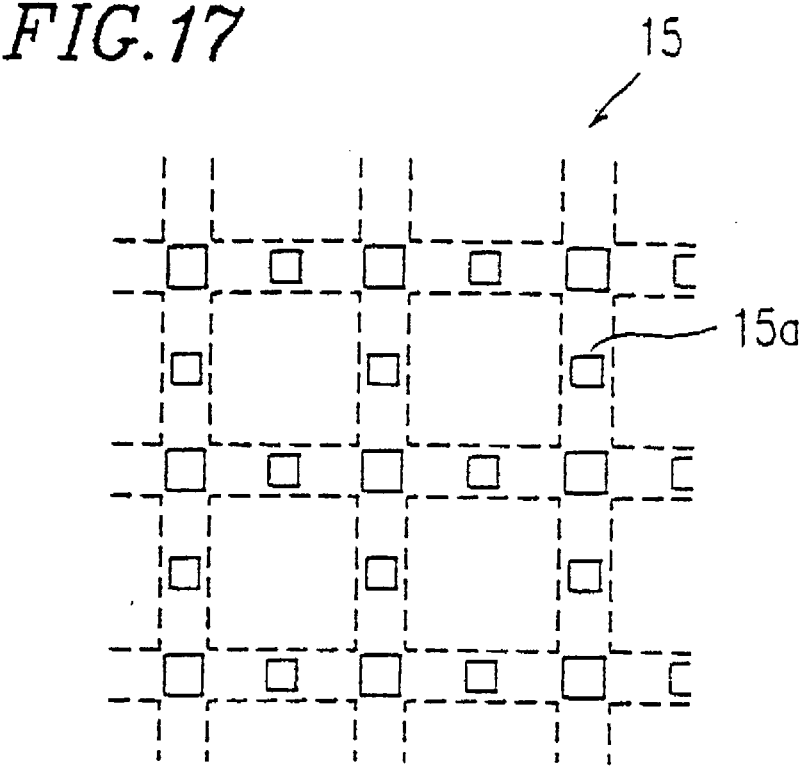
FIG. 17 is a plan view of a screen printing plate used for producing a liquid crystal device in Example 8 according to the present invention.

A heat-resistant negative black resist V-259-BK (produced by Nippon Steel Chemical Co., Ltd.) with carbon black dispersed therein was uniformly coated on one of a pair of substrates similar to those in Example 1 by spin coating at 1000 rpm for 20 seconds. The substrate was baked, exposed to light (300 mJ/cm$^2$) with a predetermined intensity through a photomask 14a shown in FIG. 11, developed, rinsed, and baked again. As a result, a first insulating layer made of a black resin layer with a thickness of 1.2 μm was patterned outside pixels. Then, an insulating material with 1.2% by weight of plastic beads (Micropearl; produced by Sekisui Fine Chemical Co., Ltd.) having an average particle size of 4.0 μm uniformly dispersed in black ink was patterned into rectangular portions 15a represented by a solid line in FIG. 17, using a screen plate 15 and fixed onto the substrate by printing. The substrate was baked at 150° C. for 2 hours, and a second insulating layer was formed outside pixels in a pattern with the rectangular portions 15a of the screen plate 15 positioned therein.

A sealant (Structbond XN-21S; baking temperature: 170° C./2 hours) was patterned on the other substrate by printing. Both of the substrates were attached to each other to construct a liquid crystal cell with a cell gap of 5.0 μm.

A mixture containing a liquid crystal material and a polymerizable material similar to those in Example 1 was injected into the liquid crystal cell thus constructed. The mixture was phase-separated and the polymerizable material was polymerized in the same way as in Example 1, whereby a liquid crystal device was produced.

Observation with a polarizing microscope of the cell thus constructed revealed that the axis-symmetrical orientation similar to that of Example 1 was formed and polymer regions generated during the phase separation and polymerization step were formed only outside pixels so as to combine with the insulating layers. The liquid crystal device of Example 8 in which the insulating layers are formed by printing has a slightly less precise pattern pitch of the insulating layers, compared with the case using a photosensitive resin; however, the device can be easily applied to patterning of a large substrate using an easy process.

Example 9

The liquid crystal device of Example 9 has a structure in which a pixel electrode made of ITO is patterned on one of a pair of substrates made of glass or the like and an insulating layer made of a polymer film including spacers is formed so as to surround each pixel. A liquid crystal layer, or a display medium made of liquid crystal regions surrounded by polymer regions is interposed between the substrates (see FIG. 12).

In such a liquid crystal device, an external field such as an electrical field or a magnetic field is applied so as to cool the device from the isotropic phase state temperature to the liquid crystal phase state temperature to control the orientation of liquid crystal regions. This allows the liquid crystal molecules in the liquid crystal layer to be aligned in an axis-symmetrical shape, such as a radial shape, a tangential (concentric) shape, and a spiral-like shape; in at least two directions; or at random.

In order to thermally press the polymer film onto the substrate on which the pixel electrodes are to be formed and pattern it on signal lines outside pixels, a cell is exposed to UV-rays through a mask and subjected to development. Because of the polymer film provided outside the pixels, the liquid crystal molecules in the liquid crystal regions surrounded by the polymer film are stably aligned, the cell gap can be kept uniform, and spacers are prevented from mixing into the liquid crystal regions or the liquid crystal layer not surrounded by the polymer regions.

Hereinafter, Example 9 will be described in detail.

Figure 18:
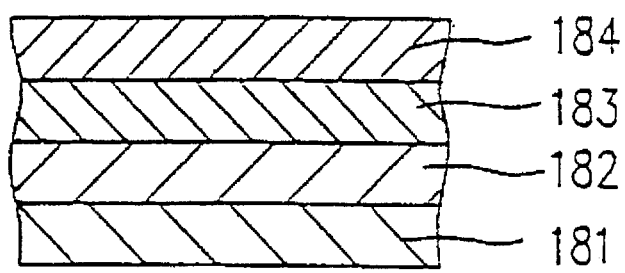
FIG. 18 is a cross-sectional view of a dry film used in Example 9 according to the present invention.

First, a dry film 180 used in Example 9 will be described with reference to FIG. 18. The dry film 180 is a polymer film in which a support film 181, an intermediate layer 182, a photoresist layer 183, and a protective film 184 are successively formed. The support film 181 is a base film, made of polyester or polyimide, for forming the photoresist layer 183. The intermediate layer 182 is made of a hydrophilic polymer, such as polyvinylalcohol, celluloses, polyvinyl pyrrollidone, and polyacrylamide, for enhancing adhesion with respect to the substrate to which the dry film is attached. The photoresist layer 183 is made of a commonly used photocurable composition, which includes a photopolymerizable monomer, a binder resin, a photo-polymerization initiator, an assistant, and a thermoplastic resin containing carboxylic acid. The protective film 184 is formed on the photoresist layer 183 for the purpose of preventing the photoresist layer 184 having adhesion from being rolled to adhere to the support film 181 in the case where the dry film is being formed into a roll shape. If required, the dry film can be drawn after being heated so as to be made thin.

Next, a production process of the liquid crystal device of this example will be described.

A glass substrate 1a (thickness: 1.1 mm) having a transparent electrode 2a of ITO (thickness: 50 nm) were used. A dry film 180 with plastic beads 7 (Micropearl; produced by Sekisui Fine Chemical Co., Ltd.) having an average particle size of 4.5 μm mixed therein was heated to 80° C. and was thermally pressed onto one of the substrates under a pressure of 4 kg/cm² at a speed of 1.5 m/minute.

Figure 19:
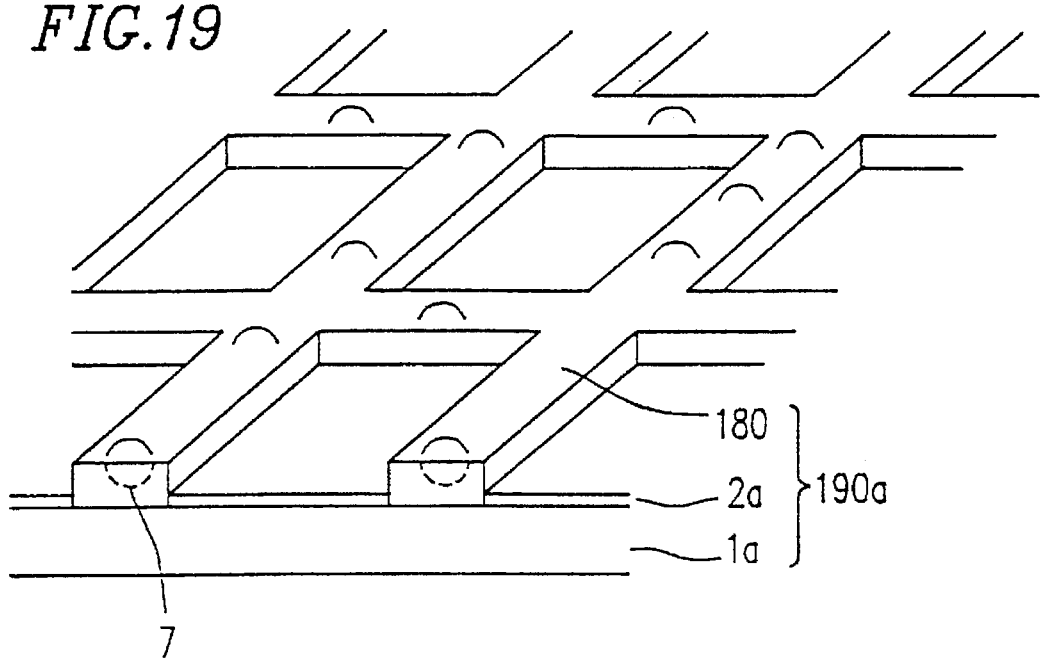
FIG. 19 is a perspective view of a polymer wall film on a substrate produced in Example 9 according to the present invention.

The dry film 180 was provided with a light irradiation intensity distribution, using a photomask. Then, the dry film 180 was exposed to UV-rays and developed. As a result, as shown in FIG. 19, the substrate 190a on which an insulating layer composed of a wall-shaped polymer film 180 (thickness: 3.0 μm) was formed so as to surround pixel electrodes was obtained. The amount of UV-rays can be 80 to 160 mJ/cm². The development was conducted using 1% solution of sodium carbonate.

A sealant (Structbond XN-21S; baking temperature: 170° C./2 hours) was patterned on the other substrate by printing. Both of the substrates were attached to each other to construct a liquid crystal cell with a cell gap of 4.5 μm.

A mixture was injected into the liquid crystal cell thus produced, by a vacuum injection method under a reduced pressure. The mixture contained 0.1 g of perfluorooctylethylacrylate, 0.26 g of lauryl acrylate and 0.1 g of R-684 (produced by Nippon Kayaku Co., Ltd.) as a polymerizable material; 0.19 g of p-phenylstyrene as a photopolymerization retarder; 4.25 g of ZLI-4792 (produced by Merck & Co., Inc.; containing 0.3% by weight of S-811) as a liquid crystal material; and 0.025 g of Irgacure 651S as a photopolymerization initiator.

The cell was kept at a temperature allowing the mixture to be homogeneous (i.e., 110° C.) and a voltage having a frequency of 60 Hz and an effective voltage of 2.5 volts was applied across transparent electrodes. Under this condition, UV-rays were irradiated to the cell through the substrate with the dry film formed thereon for 5 minutes with a high-pressure mercury lamp at 10 mW/cm², whereby the polymerizable material was cured. Thereafter, the cell was cooled to 40° C. over 5 hours under the application of a voltage and further cooled to room temperature. Thereafter, the cell was exposed to UV-rays, whereby the polymerizable material was completely polymerized (see FIG. 12B).

Observation with a polarizing microscope under crossed-Nicols of the cell thus constructed so as to obtain electro-optic characteristics revealed that liquid crystal regions were in a mono-domain state with respect to each pixel and liquid crystal molecules were aligned axis-symmetrically with respect to the center of each pixel, as shown in FIG. 12C. Furthermore, since the pixels did not include spacers, the light shielding and the disturbance of the orientation of the liquid crystal molecules did not occur.

The electro-optic characteristics and the evaluation of roughness are shown in Table 4.

TABLE 4

|  | Example 9 | Example 10 |
| --- | --- | --- |
| Light transmittance under application of no voltage (%) | 78 | 79 |
| Inversion phenomenon in gray scales | ◯ | ◯ |
| Roughness | None | None |

In the inversion phenomenon in gray scales in Table 4, ◯ represents a state where the inversion phenomenon did not occur; X a state where the inversion phenomenon was easily observed; and Δ a state where the inversion phenomenon was barely observed.

As is understood from Table 4, in the liquid crystal cell of the present invention, the ±40 inversion phenomenon as seen in a TN cell did not occur, and the light transmittance did not increase in a large viewing angle direction under the condition that a voltage was saturated. This measurement was conducted assuming that two polarizing plates positioned so that polarizing axes are in parallel with each other allow light to transmit therethrough by 100%. Furthermore, roughness was not observed even in gray scales.

Figure 20:
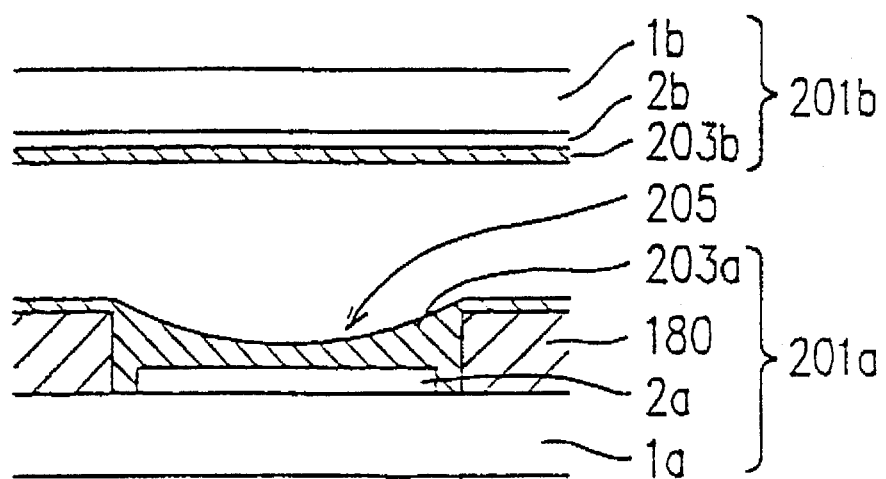
FIG. 20 is a cross-sectional view showing a structure of a concave face in an earthenware mortar shape obtained in Example 9 according to the present invention.

Separately, when an alignment film 203a (AL4552: manufactured by Nippon Synthetic Rubber Co., Ltd.) was formed on the polymer film 180 patterned in a matrix on the substrate so as to have a thickness of 50 nm, a concave structure 205 in an earthenware mortar shape was formed, as shown in FIG. 20. This substrate 201a was attached to the other substrate 201b having an alignment film 203b with the sealant patterned thereon, as described above. A liquid crystal material was injected into the cell thus constructed. As a result, orientation axes of the liquid crystal molecules were stable in each pixel, the orientation axes in each pixel were aligned, and roughness seen in a different viewing angle direction decreased.

In this example, the dry film 180 with the plastic beads dispersed therein was used; however, the dry film works as a gap keeping member even without plastic beads.

Example 10

In Example 10, a negative photosensitive film is used as a polymer film. The negative photosensitive film is composed of a mixture containing at least a photo-curable polymer, a photocurable monomer, and a photopolymerization initiator.

As the photocurable polymer, materials having photosensitivity in which a photopolymerizable monomer is introduced into a polymer having a reactive residue such as a hydroxyl group, e.g., completely saponificated polyvinyl alcohol and partially saponificated polyvinyl alcohol, can be used. Specifically, (meth)acrylic acid is allowed to react with a polymer having a reactive residue, whereby the resultant polymer is provided with photocurability. If required, a compound having two functional groups such as a diisocyanate group can be used a cross-linker. In the case of using a compound having two functional groups such as a diisocyanate group, a (meth)acrylic monomer is allowed to react with a polymer.

As the photopolymerizable monomer, compounds having a photopolymerizable group such as a (meth)acryl group, e.g., isobornylmethacrylate and hexamethylenedioldiacrylate can be used.

Hereinafter, a method for preparing a photosensitive polymer film will be described.

First, m-xylylendiisocyanate was added to polyvinyl alcohol (weight average molecular weight: 100000) in an equal amount thereto. The mixture was stirred at a temperature in the range of 60° C. to 90° C. The reaction was terminated at a time when 0.4% by weight of isocyanate groups remained.

Then, 10% by weight of hexamethylenediolacrylate as a photosensitive monomer and 0.5% by weight of Irgacure 651S (produced by CIBA-GEIGY Corporation) as a photopolymerization initiator were added to the obtained reaction product, and the resultant reaction product was stirred at 230° C. for 2 hours. Thereafter, 2% by weight of spacers having a particle size of 4.5 μm were mixed into the product, and the mixed solution thus obtained was heated to 230° C. A raw film was produced using this mixed solution by a T-die-cast molding method. If required, the film can be drawn so as to be made thin.

In the case where the photosensitive polymer film has adhesion so as to be attached to a glass substrate or the like, the polymer film is covered with a protective film, paper, or the like so as to be rolled up. When the polymer film is rolled up, it can be attached to the substrate repeatedly, increasing convenience.

A liquid crystal cell was produced as follows using the photosensitive polymer film thus produced.

One of substrates was preheated at 60° C. In the case where the photosensitive polymer film was covered with a protective film, while the protective film was being peeled off, the substrate and the photosensitive polymer film were heated to 80° C., whereby the film was thermally pressed against the substrate under a pressure of 4 kg/cm² at a speed of 1.5 m/minute.

Next, the photosensitive polymer film was provided with a light irradiation distribution, using a photomask. The photosensitive polymer film was exposed to UV-rays and developed. As a result, as shown in FIG. 19, the substrate was obtained, on which an insulating layer composed of a wall-shaped polymer film 180 (thickness: 3.0 μm) was formed in accordance with a photomask pattern so as to surround pixel electrodes. The amount of UV-rays can be 120 mJ/cm². The development was conducted using 1% solution of sodium carbonate. The electro-optic characteristics and the evaluation of roughness of the liquid crystal cell produced in the same way as in Example 9 are shown in Table 4.

In this example, a negative photosensitive film was used; however, positive films composed of a photodissociable polymer or a composition containing a photosensitive material and a resinous binder can be used.

Examples of the photodissociable polymer include polymer compositions which are changed into lower molecules by photodissociation, such as polymers having a ketone structure, e.g., an ethylene/carbon monoxide copolymer (weight average molecular weight: 150000) and a vinyl chloride/carbon monoxide copolymer and those having an unsaturated bond.

Examples of the composition containing a photo-sensitive material and a resinous binder include those of a photosensitive material such as naphthoquinoneazido type compounds and onium salts and polymers such as a novolak resin, a styrene-maleimide copolymer, and a polymethyl methacrylate-methacrylic acid copolymer. When such a composition is exposed to light through a photomask, the polymer irradiated with light becomes soluble in a solvent, whereby patterning is conducted.

Example 11

Figure 21A:
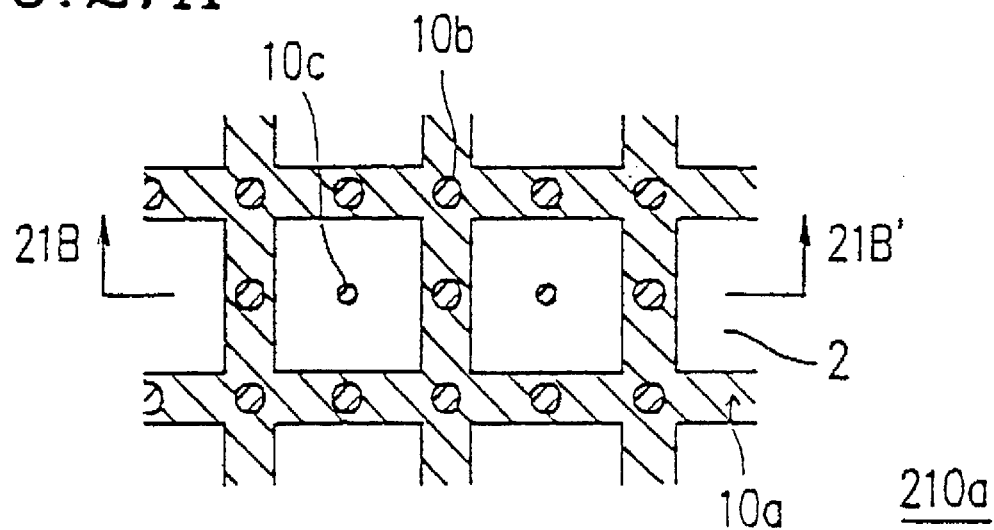
FIG. 21A is a plan view of one of substrates of a liquid crystal device in Example 11 according to the present invention.
Figure 21B:
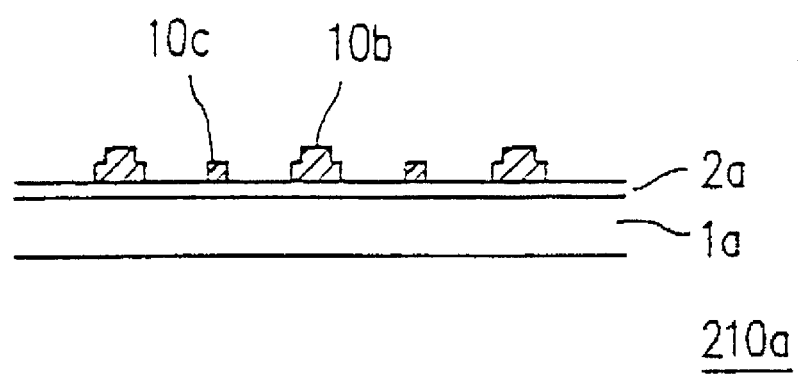
FIG. 21B is a cross-sectional view taken along a line 21B–21B' of FIG. 21A.

In example 11, as shown in FIGS. 21A and 21B, a liquid crystal device in which convex portions 10c are regularly patterned in each pixel was produced. FIG. 21A is a plan view of a substrate 210a having the convex portion 10c and FIG. 21B is a cross-sectional view taken along a line 21B–21B' of FIG. 21A.

A heat-resistant negative black resist V-259-BK (produced by Nippon Steel Chemical Co., Ltd.) with carbon black dispersed therein was uniformly coated onto one of a pair of substrates similar to those in Example 1 by spin coating at 1000 rpm for 20 seconds. The substrate was baked and exposed to light (400 mJ/cm$^2$) with a predetermined intensity through a negative photomask having light-transmitting portions corresponding to portions other than pixels and island-shaped light-transmitting portions (each having a size of 15 µm) corresponding to the center of each pixel, developed, rinsed, and baked again. Thus, a first insulating layer 10a made of a black resin layer (thickness: 1.3 µm) was patterned outside pixels and island convex portions 10c were formed at the center of each pixel. Then, an insulating material with 0.3% by weight of plastic beads (Micropearl; produced by Sekisui Fine Chemical Co., Ltd.) having an average particle size of 4.0 µm uniformly dispersed in a heat-resistant negative photoresist V259PA (produced by Nippon Steel Chemical Co., Ltd.) was uniformly coated onto the substrate by spin coating. The resultant substrate was baked, exposed to light (300 mJ/cm$^2$) with a predetermined intensity through a photomask 14b shown in FIG. 13, developed, rinsed, and baked again, whereby a second insulating layer 10b was formed outside pixels.

A sealant (Structbond XN-21S; baking temperature: 170° C./2 hours) was patterned on the other substrate by printing. Both of the substrates were attached to each other to construct a liquid crystal cell with a cell gap of 5.1 µm.

A mixture containing a liquid crystal material and a polymerizable material similar to those in Example 1 was injected into the liquid crystal cell thus constructed. The mixture was phase-separated and the polymerizable material was polymerized in the same way as in Example 1, whereby a liquid crystal device was produced.

Observation with a polarizing microscope of the cell thus constructed revealed that liquid crystal regions surrounded by polymer regions were in a monodomain state with respect to each pixel and liquid crystal molecules were uniformly aligned axis-symmetrically with respect to each island-shaped convex portion 10c formed at the center of the pixel. Furthermore, spacers did not disturb the orientation of the liquid crystal molecules in the pixels.

Thereafter, two polarizing plates were attached to the cell thus constructed so that polarizing axes were orthogonal to each other to produce a liquid crystal device.

Observation with a polarizing microscope of the liquid crystal device under the application of a voltage revealed that disclination lines were not formed and the cell was entirely black.

The electro-optic characteristics and the evaluation of roughness of the liquid crystal device thus produced are shown in Table 3. As is understood from Table 3, in the liquid crystal device of Example 11, the inversion phenomenon as seen in the TN cell of Comparative Example 1 did not occur and the light transmittance in a large viewing angle direction under the condition that a voltage was saturated did not increase. Furthermore, roughness was not observed in gray scales.

Since the insulating layers 10a and 10b were provided, the cell was able to remain uniform without spacers in the pixels. Furthermore, the polymer regions were formed outside the pixels so as to combine with the insulating layers 10a and 10b and the insulating layer 10b included spacers, so that a liquid crystal device had outstanding shock-resistance.

Example 12

In Example 12, as shown in FIG. 22, an active matrix substrate 101 having TFT elements and pixel electrodes formed thereon was used. As shown in FIG. 22, a liquid crystal device of this example includes an active matrix substrate 101, a glass substrate 101a, a semiconductor layer 102, a gate insulating film 103, gate electrodes 104, a contact layer 105, an interlevel insulator 106, pixel electrodes 107, source electrodes 108, drain electrodes 109, a BM layer 110, counter substrate 114, a color filter 112, a counter electrode 113, a counter glass substrate 111, insulating layers 115 provided outside pixels, beads spacers 116, liquid crystal regions 117, polymer regions 118, gate signal lines 202, source signal lines 203, and TFTs 205.

Figure 22A:
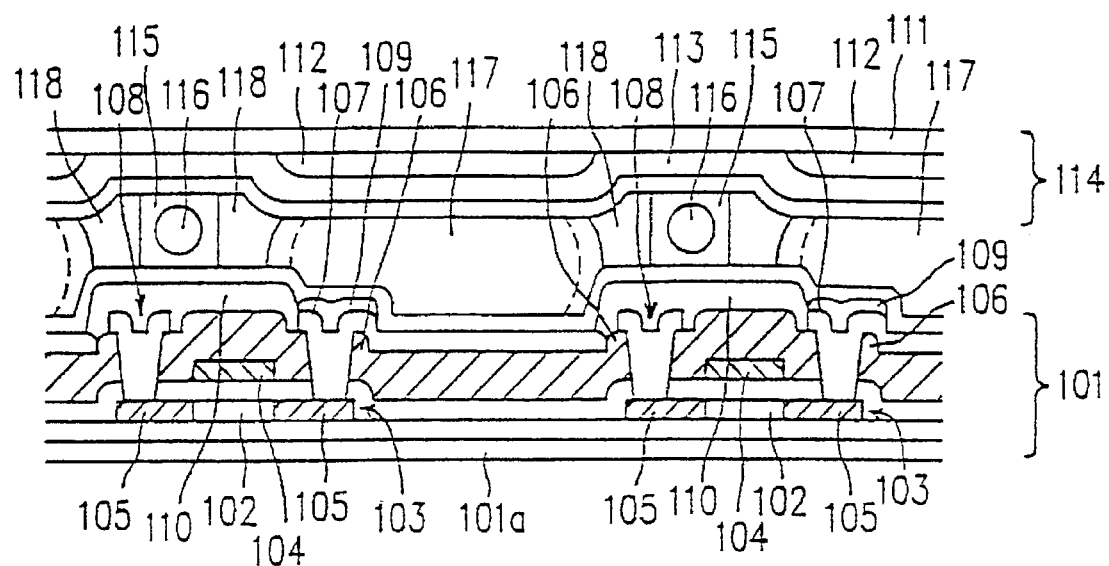
FIG. 22A is a cross-sectional view of a liquid crystal device in Example 12 according to the present invention.
Figure 22B:
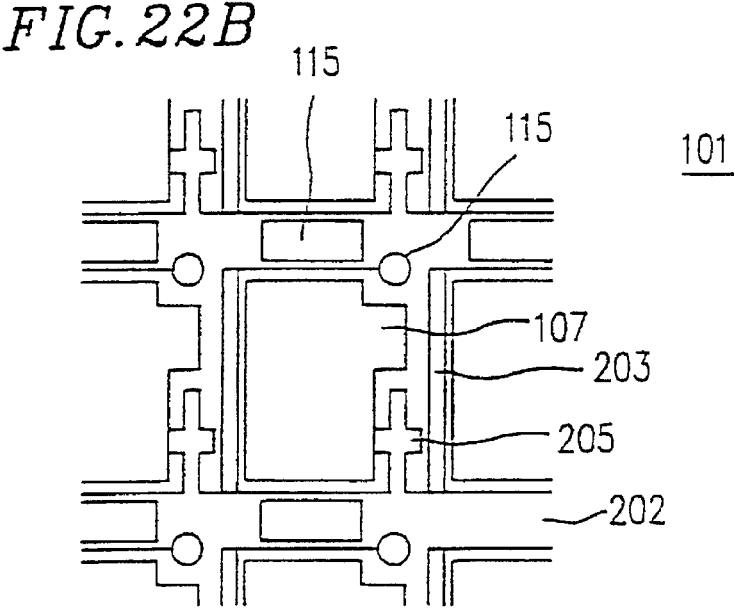
FIG. 22B is a plan view thereof.
Figure 23:
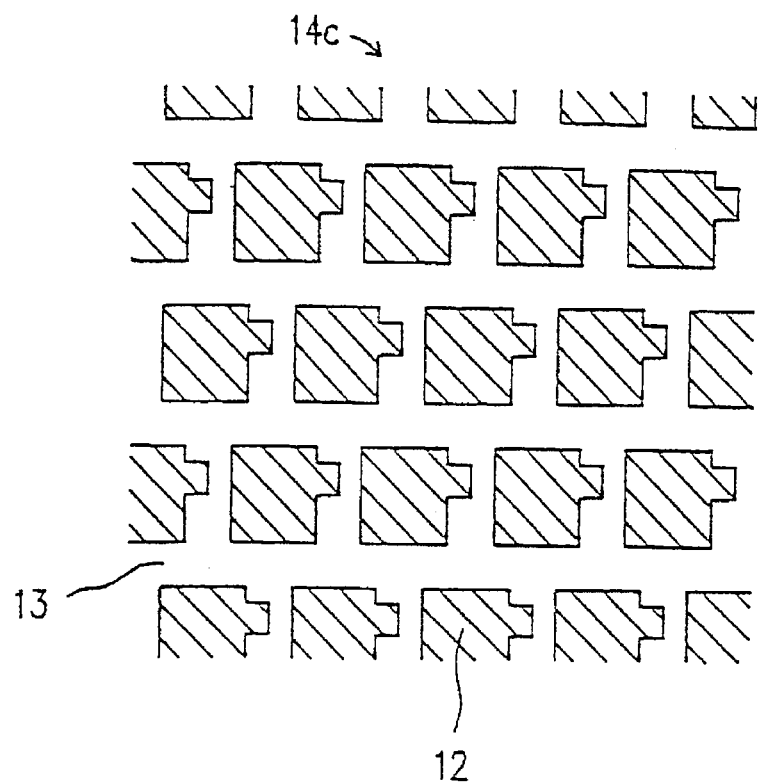
FIG. 23 is a plan view of a negative pattern photomask 14c used for producing the liquid crystal device in Example 12 according to the present invention.
Figure 24:
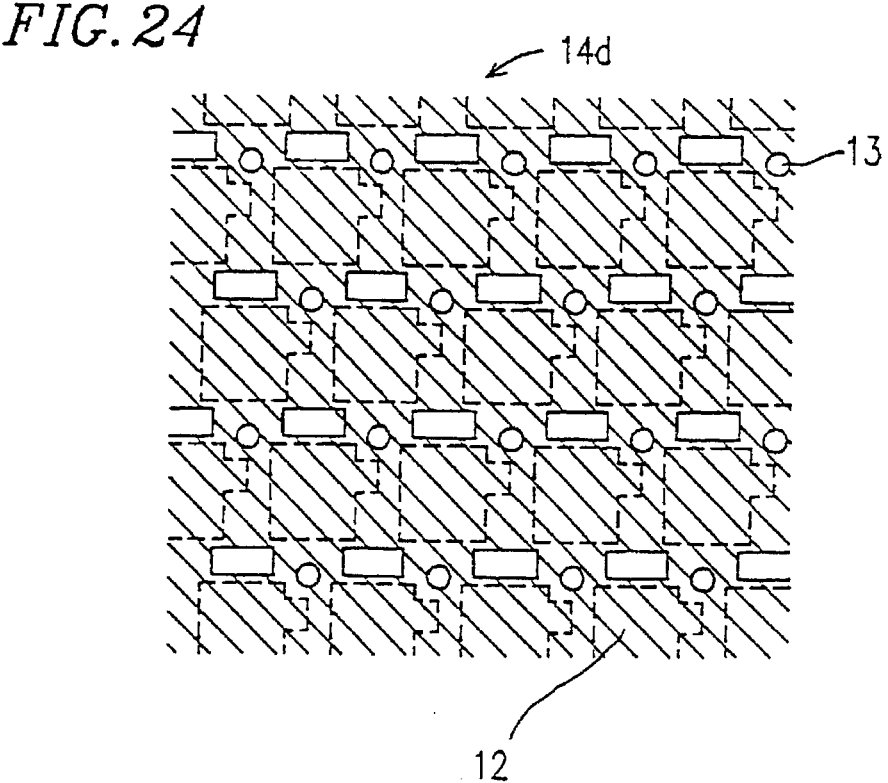
FIG. 24 is a plan view of a negative pattern photomask 14d used for producing the liquid crystal device in Example 12 according to the present invention.

As shown in FIGS. 22A and 22B, a heat-resistant negative black resist V-259-BK (produced by Nippon Steel Chemical Co., Ltd.) was uniformly coated onto the active matrix substrate 101 in which the TFTs 205 and the pixel electrodes 107 were provided in a matrix on the transparent glass substrate 101a by spin coating at 1000 rpm for 20 seconds. The active matrix substrate 101 was baked, exposed to light (400 mJ/cm$^2$) with a predetermined intensity through a negative pattern photomask 14c shown in FIG. 23, developed, rinsed, and baked again. The negative pattern photomask 14c was designed for forming the BM layer 110 and provided with light transmitting portions 13 corresponding to metal wirings formed outside pixels, such as the gate signal lines 202 and the source signal lines 203 and light shielding portions 12 corresponding to pixel portions. As a result, a first insulating layer was patterned to form the BM layer 110 which was a light shielding layer. The thickness of the first insulating layer was analyzed to be 1.0 µm with a non-contact surface shape analyzer. Then, an insulating material with 1.2% by weight of plastic beads (Micropearl; produced by Sekisui Fine Chemical Co., Ltd.) having an average particle size of 3.5 µm mixed in a heat-resistant negative photoresist V-259PA (produced by Nippon Steel Chemical Co., Ltd.) was uniformly coated onto the resultant substrate by spin coating. The substrate was baked, exposed to light (400 mJ/cm$^2$) with a predetermined intensity through a negative pattern photomask 14d shown in FIG. 24, developed, rinsed, and baked again. The negative pattern photomask 14d was provided with light transmitting portions 13 and the light shielding portions 12 so as to pattern wall-shaped insulating layers 115 at a predetermined position on the gate signal lines 202 and the source signal lines 203 on the light shielding layer. As a result, wall-shaped second insulating layers 115 was formed outside pixels. In FIG. 24, a broken line represents the relationship with respect to the photomask 14c.

Next, a pigment dispersion type color filter 112 was formed on the counter glass substrate 111 having a electrical insulating surface by printing, electrodeposition, or spin coating. The color filter 112 was patterned to a predetermined shape. A transparent electrode film made of ITO was deposited on the color filter 112 so as to have a thickness of 50 to 100 nm by sputtering, thereby forming the counter electrode 113 to obtain the counter substrate 114.

Thereafter, a sealant (Structbond XN-21S; baking temperature: 170° C./2 hours) was patterned on the counter substrate 114 by printing. The active matrix substrate 101 was attached to the counter substrate 114 under pressure to construct an active matrix liquid crystal cell with a cell gap of 5.0 μm.

A mixture containing a liquid crystal material and a polymerizable material similar to those in Example 1 was injected into the active matrix liquid crystal cell thus constructed by a vacuum injection method under a reduced pressure. Then, while the liquid crystal cell was kept at 100° C. and a rectangular wave of 60 Hz and ±5 volts was applied to the electrodes on both sides of the cell through the TFTs, the cell was exposed to UV-rays at a surface illuminance of 7 mW/cm$^2$ (365 nm) with a high-pressure mercury lamp for 10 minutes. Thus, the mixture was subjected to phase separation by photopolymerization to produce a liquid crystal cell in which liquid crystal regions and polymer regions were regularly formed.

Figure 25:
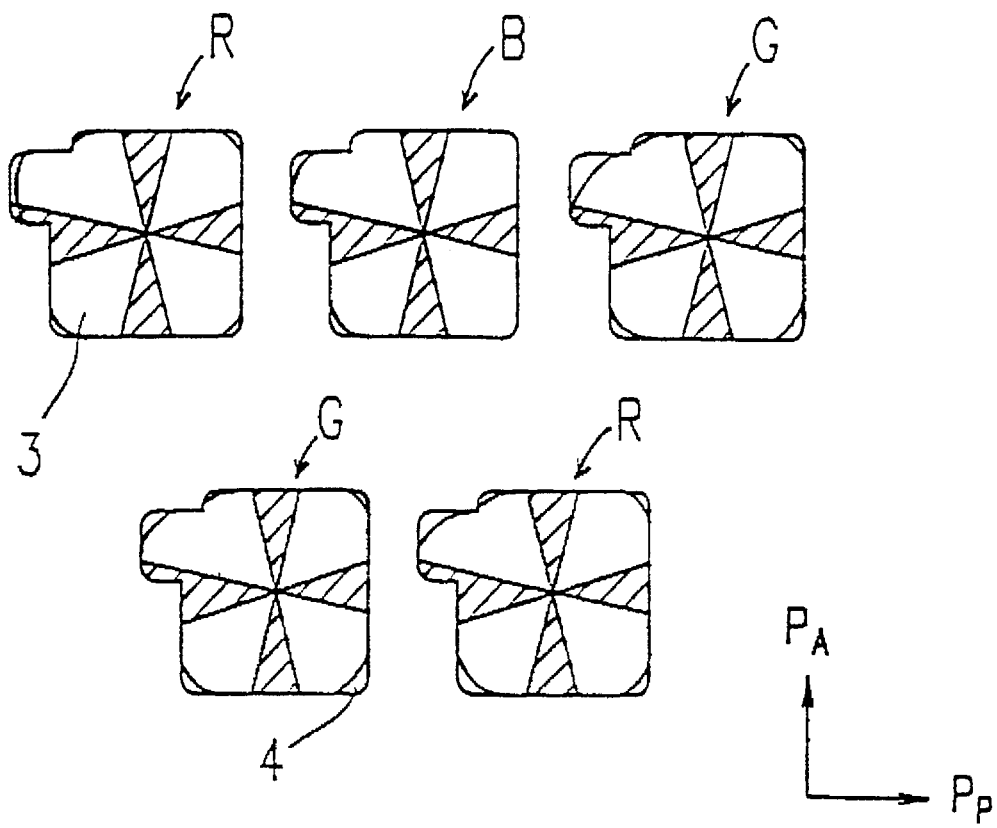
FIG. 25 is a view of the liquid crystal device in Example 12 according to the present invention observed with a polarizing microscope.

Observation with a polarizing microscope of the cell thus produced revealed that the liquid crystal regions 3 were formed at the positions of pixels and in the configuration thereof and the orientation of the liquid crystal regions were not disturbed by the spacers mixed into the pixels. In the TFT substrate produced in Example 12, the metal wiring films formed outside pixels such as the gate signal lines 202 and the source signal lines 203, as well as the BM layer 110 have a light shielding effect to work as a light shielding layer. In FIG. 25, R represents a red pixel, G a green pixel, and B a blue pixel.

Then, two polarizing plates were attached to both sides of the cell thus produced so that transmitting axes were orthogonal to each other, thereby producing a liquid crystal device.

In the liquid crystal device thus produced, the inversion phenomenon as seen in the conventional TN-mode liquid crystal device was not recognized, and a satisfactory display was obtained. Furthermore, irregularity of transmittance was not recognized by visual observation, and roughness was not recognized when the cell was seen at a distance of 10 cm.

Furthermore, since the insulating layers 110 and 115 were provided, the cell gap was able to be kept uniform without spacers in the pixels. Still furthermore, the polymer regions were formed outside the pixels to combine with the insulating layers 110 and 115, so that the liquid crystal device had outstanding shock resistance.

Example 13

In Example 13, a material whose surface free energy of a polymerizable material was higher than that of a liquid crystal material was used. In this example, since OMR83 (surface tension: about 34 mN/m) is provided outside pixels and a photosensitive PI (Photoneece) film (surface tension: about 100 mN/m) is formed in the pixels, liquid crystal concentrates on a low surface energy layer in the pixels under the condition of $\gamma_{LC} < \gamma_M$.

A photosensitive polyimide ("Photoneece" UR-3140; produced by Toray Industries, Inc.) was uniformly coated onto one of substrates similar to those in Example 1 by spin coating at 3000 rpm for 20 seconds. The polyimide film (thickness: 9.1 μm) was baked and exposed to light (150 mJ/cm$^2$) having a predetermined intensity through a photomask 14b shown in FIG. 13, developed, rinsed, and baked again. As a result, a wall-shaped insulating layer (final thickness: 5.3 μm) was patterned outside pixels. Thereafter, a negative photoresist OMR83 (produced by Tokyo Ohka-sha) was uniformly coated onto the substrate by spin coating. The substrate was baked, exposed to light with a predetermined intensity through a photomask (not shown), developed, rinsed, and baked again. As a result, the insulating layer was patterned in the pixels. The photomask used in this example had a reversed pattern of the photomask 14a with transparent portion 13 and light-shielding portion 12 shown in FIG. 11, i.e., the photomask in this example was provided with light-transmitting portions corresponding to pixel regions and light shielding portions corresponding to portions other than the pixel regions.

A sealant (Structbond XN-21S; baking temperature: 170° C./2 hours) was patterned on the other substrate by printing. Both of the substrates were attached to each other, using only the insulating layer provided outside the pixels as spacers to construct a liquid crystal cell with a cell gap of 5.1 μm.

A mixture containing 0.4 g of R-684 (produced by Nippon Kayaku Co., Ltd.) and 0.2 g of p-t-butoxystyrene as a polymerizable material; 4.4 g of ZLI-4792 (produced by Merck & Co., Inc.; containing 0.3% by weight of S-811) as a liquid crystal material; and 0.025 g of Irgacure 651 as a photopolymerization initiator was injected into the cell thus constructed. The mixture was phase-separated and the polymerizable material was polymerized in the same way as in Example 1 to produce a liquid crystal device. The surface free energy of the polymerizable material was 39.5 mN/m, which was higher than that of the liquid crystal material (i.e., 32.2 mN/m).

Observation with a polarizing microscope of the liquid crystal cell thus produced revealed that polymer regions were formed on ITO electrodes outside pixels, liquid crystal regions were formed on the insulating layer made of a resist in the pixels, and liquid crystal molecules were axissymmetrically aligned in the liquid crystal regions. The polymer regions were formed so as to combine with the insulating layer outside the pixels. By forming the insulating layer to control the surface free energy on the substrate, the phase separation between the liquid crystal material and the polymer material was controlled and the liquid crystal regions and the polymer regions were selectively positioned.

Example 14

Figure 26A:
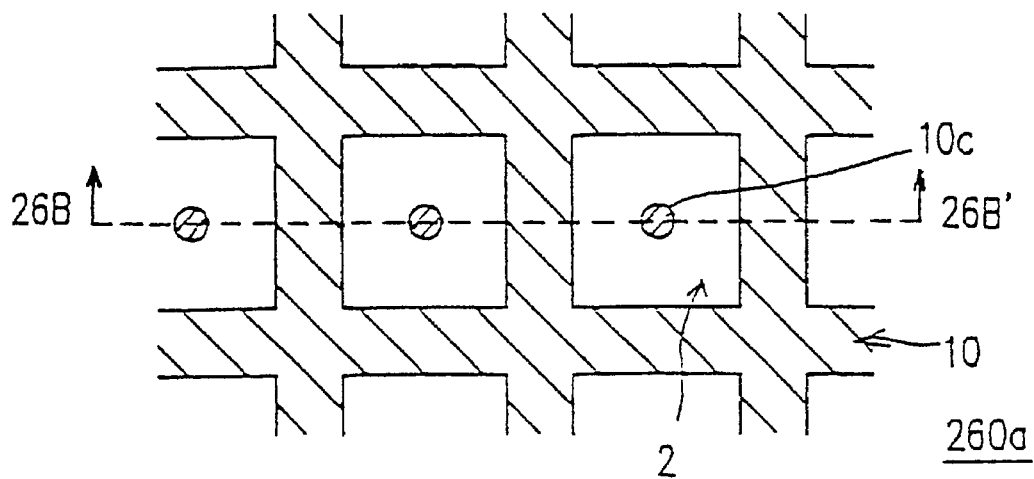
FIG. 26A is a plan view of one of substrates of a liquid crystal device in Example 14 according to the present invention.
Figure 26B:
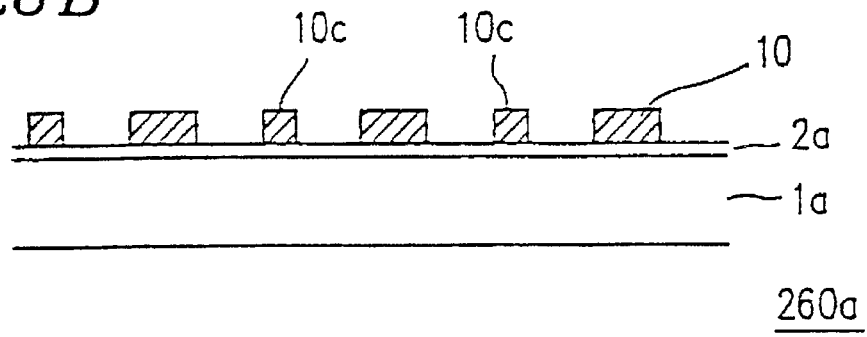
FIG. 26B is a cross-sectional view taken along a line 26B–26B' of FIG. 26A.

In Example 14, as shown in FIGS. 26A and 26B, a liquid crystal device in which convex portions 10c were regularly patterned in pixels was produced. FIG. 26A is top view of a substrate 260a having the convex portions 10c, FIG. 26B is a cross-sectional view taken along a line 26B–26B' of FIG. 26A.

An insulating layer 10 outside pixels and island-shaped convex portions 10c at the center of each pixel were patterned as shown in FIGS. 26A and 26B by coating a negative photoresist OMR83 (produced by Tokyo Ohka-sha) with 0.05% by weight of spacers (plastic beads) having a particle size of 5.5 μm mixed therein onto one of substrates similar to those in Example 1. A light shielding layer (not shown) made of an Mo thin film was provided under the insulating layer 10 and the island-shaped convex portions 10c.

An alignment film AL4552 (produced by Nippon Synthetic Rubber Co., Ltd.) was coated onto the other substrate, which was not subjected to rubbing treatment. Both of the substrates were attached to each other using a sealant with 2% by weight of spacers (glass beads) having a particle size of 5.3 μm mixed therein, whereby a liquid crystal cell was constructed.

A mixture containing 0.1 g of R-684 (produced by Nippon Kayaku Co., Ltd.) as a polymerizable material; 0.06 g of p-phenylstyrene as a photopolymerization retarder; 3.74 g of ZLI-4792 (produced by Merck & Co., Inc.; containing 0.4% by weight of S-811) as a liquid crystal material; and 0.02 g of Irgacure 651 as a photopolymerization initiator was injected into the cell thus constructed. The mixture was phase-separated and the polymerizable material was polymerized in the same way as in Example 1 to produce a liquid crystal device.

Observation with a polarizing microscope of the liquid crystal device thus produced revealed that liquid crystal regions 3 surrounded by polymer regions 4 were in a mono-domain state per pixel and liquid crystal molecules were uniformly aligned axis-symmetrically with respect to island-shaped convex portions 10c positioned at the center of each pixel. Furthermore, it was not recognized that the orientation of the liquid crystal molecules was disturbed by spacers in the pixels. Furthermore, under the condition that a polarizer and an analyzer of the microscope were fixed in a crossed-Nicols state, the cell was rotated. It seemed that only the polymer regions 4 were rotated while the extinction patterns of the liquid crystal regions 3 remained in regular positions. This showed that almost all of the liquid crystal regions 3 obtained uniform axis-symmetrical orientations.

Two polarizing plates were attached to the cell so that polarizing axes were orthogonal to each other to produce a liquid crystal device.

The liquid crystal device thus produced was observed with a polarizing microscope under the application of a voltage, indicating that disclination lines were not formed, and the cell was entirely black.

The electro-optic characteristics and the evaluation of roughness of the liquid crystal device thus produced are shown in Table 5 and FIGS. 28A through 28F.

TABLE 5

|  | Example 14 | Comparative Example 3 |
| --- | --- | --- |
| Light transmittance under application of no voltage (%) | 77 | 87 |
| Inversion phenomenon in gray scales | O | X |
| Roughness | None | None |

*observed in gray scales in a large viewing angle direction

As shown in Table 5 and FIGS. 28A through 28F, in the liquid crystal device of Example 14, the inversion phenomenon as seen in the TN cell of Comparative Example 1 did not occur and the light transmittance in a large viewing angle direction under the condition that a voltage was saturated did not increase. Furthermore, in the liquid crystal device of Example 14, roughness was not observed in gray scales.

In this example, since the insulating layer 10 shown in FIG. 26 included plastic beads spacers to work as a gap keeping member, a liquid crystal device excellent in shock resistance was obtained even without spacers in the pixels.

Comparative Example 3

An insulating layer 10 and island-shaped convex portions 10c as shown in FIGS. 26A and 26B were patterned on one of substrates similar to those in Example 1 in the same way as in Example 14 except that a resist containing no spacers was used. In order to keep a cell gap uniform, spacers made of plastic beads having a particle size of 5.35 μm were dispersed on the substrate. This substrate was attached to a counter substrate to construct a cell in the same way as in Example 14.

A liquid crystal material ZLI-4792 (produced by Merck & Co., Inc.; containing 0.4% by weight of S-811) similar to that of Example 14 was injected into the cell to produce a liquid crystal device.

Figure 60:
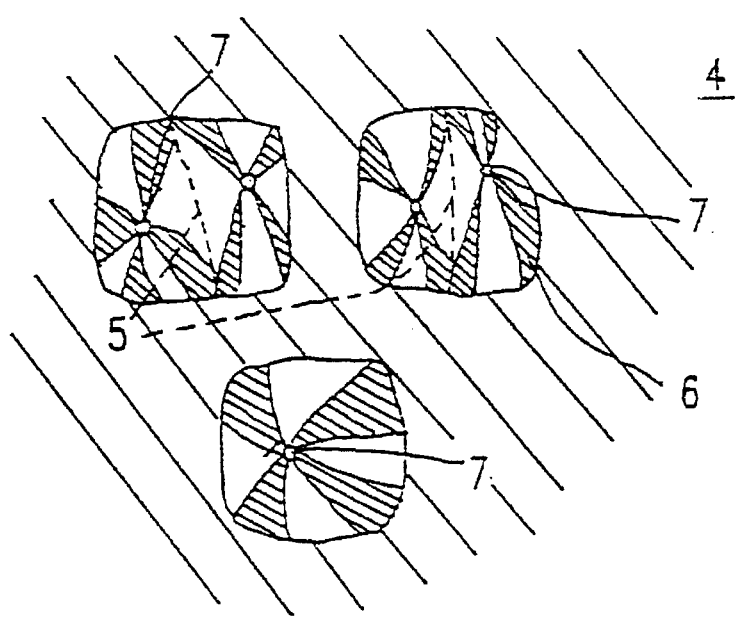
FIG. 60 is a view observed with a polarizing microscope, showing a state in which particulate spacers (beads) present in pixels disturb the orientation state of liquid crystal regions (without application of an electric field).
Figure 62A:
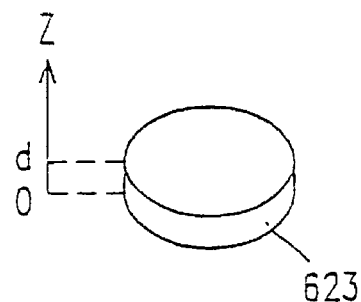
FIGS. 62A through 62D show the case where the orientation of liquid crystal molecules is not twisted.
Figure 62B:
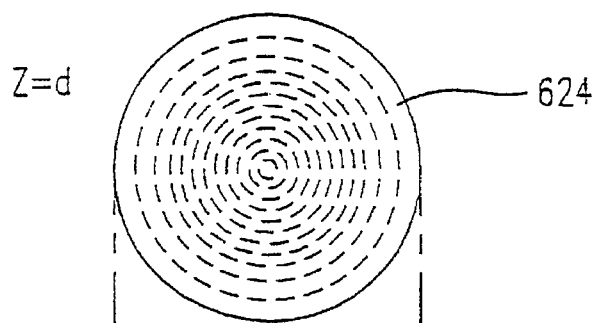
Figure 62C:
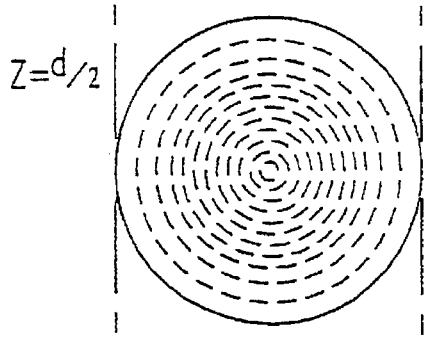
Figure 62D:
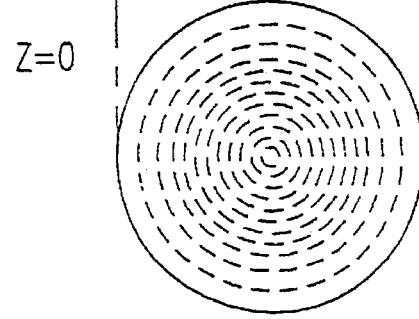

Observation with a polarizing microscope of the liquid crystal device thus produced revealed that liquid crystal molecules were axis-symmetrically aligned. However, as shown in FIG. 60, there were a number of liquid crystal regions where the center of orientation was largely shifted from the center of the pixel due to the spacers 7 present in the pixel. Furthermore, remarkable roughness was visually observed.

Example 15

Figure 29A:
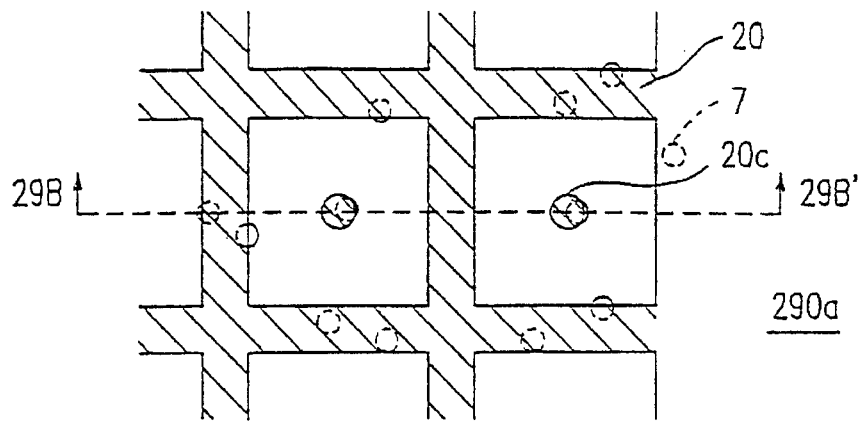
FIG. 29A is a plan view of a first insulator formed on one of substrates of a liquid crystal device in Examples 15 and 17 according to the present invention.
Figure 29B:
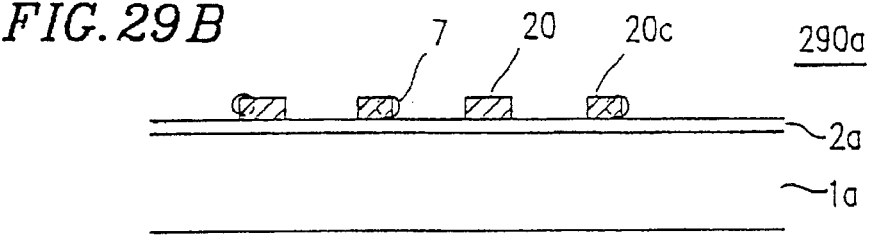
FIG. 29 is a cross-sectional view taken along a line 29B–29B' of FIG. 29A.
Figure 30A:
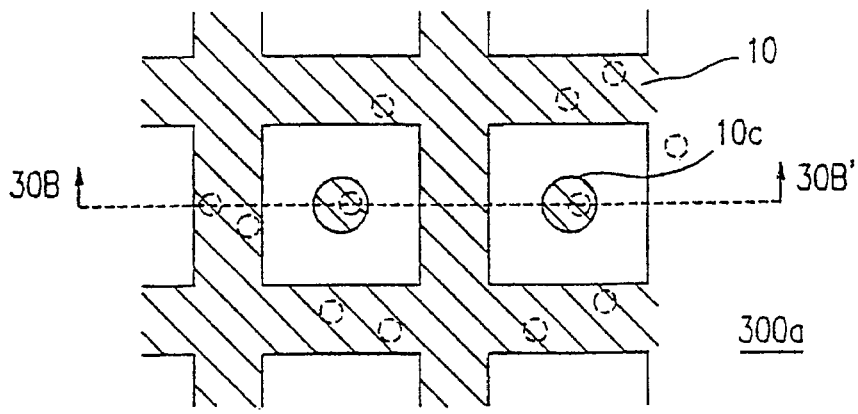
FIG. 30A is a plan view of a second insulator formed on one of substrates of the liquid crystal device in Examples 15 and 17 according to the present invention.
Figure 30B:
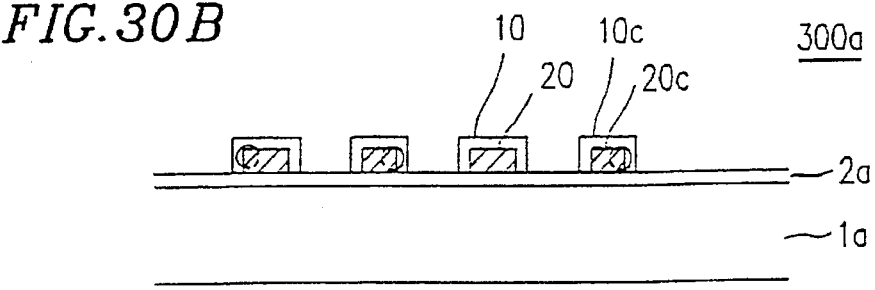
FIG. 30B is a cross-sectional view taken along a line 30B–30B' of FIG. 30A.

An insulating layer 20 and island-shaped convex portions 20c were patterned onto one of substrates similar to those in Example 1 so as to be respectively positioned outside pixels and at the center of each pixel by using a negative photoresist OMR83 (Produced by Tokyo Ohka-sha) with 0.1% by weight of spacers (plastic beads) having a particle size of 5.75 μm mixed therein, so as to obtain a substrate 290a as shown in FIGS. 29A and 29B. The insulating layer 20 and the island-shaped convex portions 20c had width smaller than that shown in FIGS. 26A and 26B. A shielding layer (not shown) made of an Mo thin film was provided under the insulating layer 20 and the island-shaped convex portions 20c. Observation with a microscope of the surface of the substrate 290a under this condition revealed that spacers 7 were present in the insulating layer 20, and at boundary faces between the island-shaped convex portions 20c and the pixels (liquid crystal regions). Next, an insulating layer 10 and island-shaped convex portions 10c were patterned using a resist without the spacers 7 mixed therein so as to cover the insulating layer 20 and the island-shaped convex portions 20c, respectively, so as to obtain a substrate 300a as shown in FIGS. 30A and 30B. Observation with a microscope of the substrate surface under this condition revealed that the spacers were not present in the insulating layer 10 and at the boundary faces between the island-shaped convex portions 10c and the pixels (liquid crystal regions).

An alignment film AL4552 (produced by Nippon Synthetic Rubber Co., Ltd.) was coated onto the other substrate, which was not subjected to rubbing treatment. Both of the substrates were attached to each other using a sealant with 2% by weight of spacers (glass beads) having a particle size of 5.3 μm mixed therein, whereby a liquid crystal cell was constructed.

A mixture similar to that of Example 14 was injected into the cell thus constructed. While a voltage having a frequency of 60 Hz and an effective voltage of 2.5 volts was applied across cell electrodes, the mixture was once heated to a temperature allowing the mixture to be uniform and cooled down to deposit a liquid crystal phase. Thereafter, the application of a voltage was terminated, and when the liquid crystal phase spread almost over regions corresponding to pixels, the cell was exposed to UV-rays, whereby the polymerizable material was cured.

In the liquid crystal device thus produced, liquid crystal molecules were uniform and axis-symmetrically aligned in the liquid crystal regions and no spacers were present in the liquid crystal regions; therefore, roughness was not observed even in gray scales. Furthermore, since the spacers were mixed in the insulating layer 20, a liquid crystal device was excellent in shock resistance even without the spacers in the pixels.

Example 16

Figure 31A:
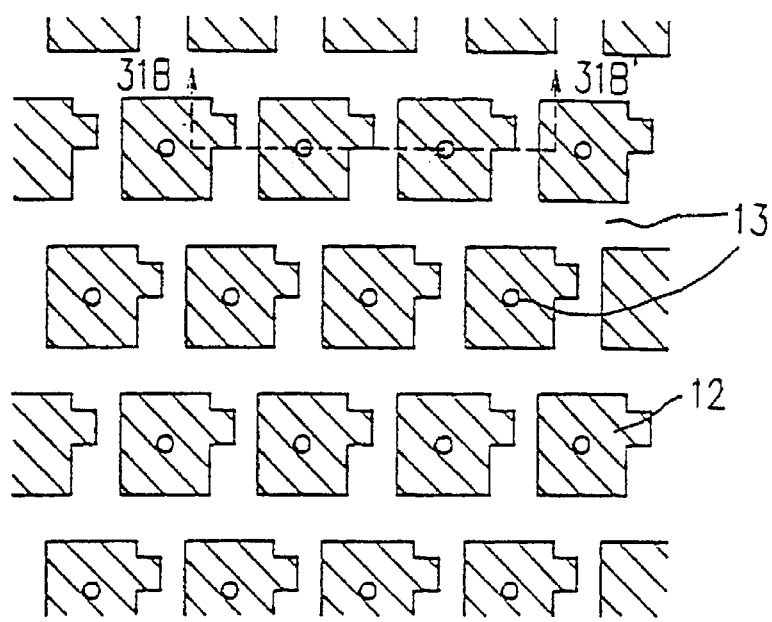
FIG. 31A is a plan view of a mask used for producing a liquid crystal device in Example 16 according to the present invention.
Figure 31B:
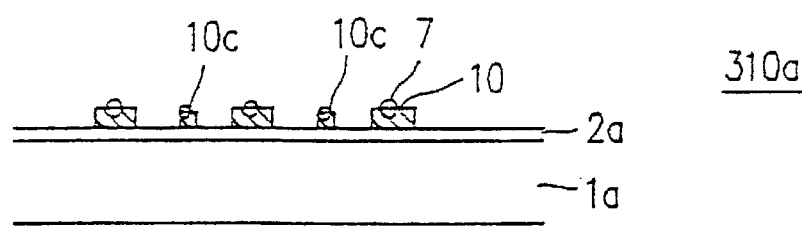
FIG. 31B is a cross-sectional view of an insulator formed at a position corresponding to a line 31B–31B' of FIG. 31A.

By using a photomask as shown in FIG. 31A, insulating layer 10 and island-shaped convex portions 10c were patterned onto a glass substrate 1a with TFTs and pixel electrodes 2a formed in a matrix thereon so as to be positioned outside pixels and at the center of each pixel, respectively, by using a material with 0.75% by weight of spacers 7 (plastic beads) having a particle size of 5.5 µm mixed in a negative photoresist OMR83 (produced by Tokyo Ohka-sha) as shown in FIG. 31B. FIG. 31B is a cross-sectional view of the substrate 310a with the insulators formed at a position corresponding to a line 31B–31B' of FIG. 31A. A light shielding layer (not shown) made of an Mo thin film was provided under the insulating layer 10 and the island-shaped convex portions 10c.

An alignment film AL4552 (produced by Nippon Synthetic Rubber Co., Ltd.) was coated onto the other substrate with a common electrode formed thereon, which was not subjected to rubbing treatment. Both of the substrates were attached to each other, using a sealant with 2% by weight of spacers (glass beads) having a particle size of 5.3 µm mixed therein, whereby a liquid crystal cell with a cell gap of 5.1 µm was obtained.

A mixture similar to that of Example 14 was injected into the cell thus constructed. The cell was heated to 120° C. Then, the cell was exposed to UV-rays under a high-pressure mercury lamp of 10 mW/cm² (365 nm) through the substrate with the common electrode formed thereon for 8 minutes, while a rectangular wave of ±2.5 volts having a frequency of 60 Hz was applied to a source electrode, a voltage of 10 volts was applied to a gate electrode, and a voltage of −1.5 volts was applied to a common electrode. As a result, the polymerizable material was cured. Then, the cell was cooled to room temperature (25° C.) over 6 hours under the application of a voltage to produce a liquid crystal device.

Observation with a polarizing microscope of the liquid crystal device thus produced revealed that bead-shaped spacers were not present in liquid crystal regions and liquid crystal molecules were uniformly aligned axissymmetrically with respect to the center of each pixel. Under the application of a voltage, roughness was not observed in gray scales. Furthermore, since the insulating layer included spacers, a liquid crystal device excellent in shock resistance was obtained without spacers in the pixels. In this example, a metal wiring film formed on the TFT substrate as well as a BM layer made of an Mo thin film worked as light shielding layers; because of these light shielding layers, a clear image with a high contrast was obtained.

Example 17

Bead-shaped spacers were dispersed on one of a pair of substrates similar to that of Example 1 and a negative photoresist OMR83 (produced by Tokyo Ohka-sha) was coated thereon, whereby an insulating layer 20 and island-shaped convex portions 20c were patterned outside pixels and at the center of each pixel, respectively, whereby a substrate 290a as shown in FIG. 29A and 29B was obtained. A light shielding layer (not shown) made of an Mo thin film was provided under the insulating layer 20 and the island-shaped convex portions 20c. Then, an insulating layer 10 and island-shaped convex portions 10c were patterned on the resultant substrate outside pixels and at the center of each pixel, respectively, using the above-mentioned photoresist without spacers mixed therein, as shown in FIG. 30.

An alignment film AL4552 (produced by Nippon Synthetic Rubber Co., Ltd.) was coated onto the other substrate, which was not subjected to rubbing treatment. Both of the substrates were attached to each other using a sealant with 2% by weight of spacers (glass beads) having a particle size of 5.3 Nm, whereby a liquid crystal cell was produced.

A mixture similar to that of Example 14 was injected into the cell thus constructed. While a voltage having a frequency of 60 Hz and an effective voltage of 2.5 volts was applied across cell electrodes, the mixture was once heated to a temperature allowing the mixture to be homogeneous and cooled down to deposit a liquid crystal phase. Thereafter, the application of a voltage was terminated, and when the liquid crystal phase spread almost over regions corresponding to pixels, the cell was exposed to UV-rays, whereby the polymerizable material was cured.

Observation with a polarizing microscope of the liquid crystal device thus produced revealed that spacers 7 were uniformly dispersed in the insulating layer 20 and spacers were not deposited at the interfaces between the insulating layer 10 and the pixel regions. Thus, liquid crystal molecules in liquid crystal regions were uniformly aligned axissymmetrically without being affected by the spacers and roughness was not observed in gray scaled under the application of a voltage. Furthermore, since the insulating layer 20 formed outside the pixels included spacers, a liquid crystal device excellent in shock resistance was obtained without spacers in the pixels.

Example 18

Beads formed at the center of each pixel will be described.

Figure 32:
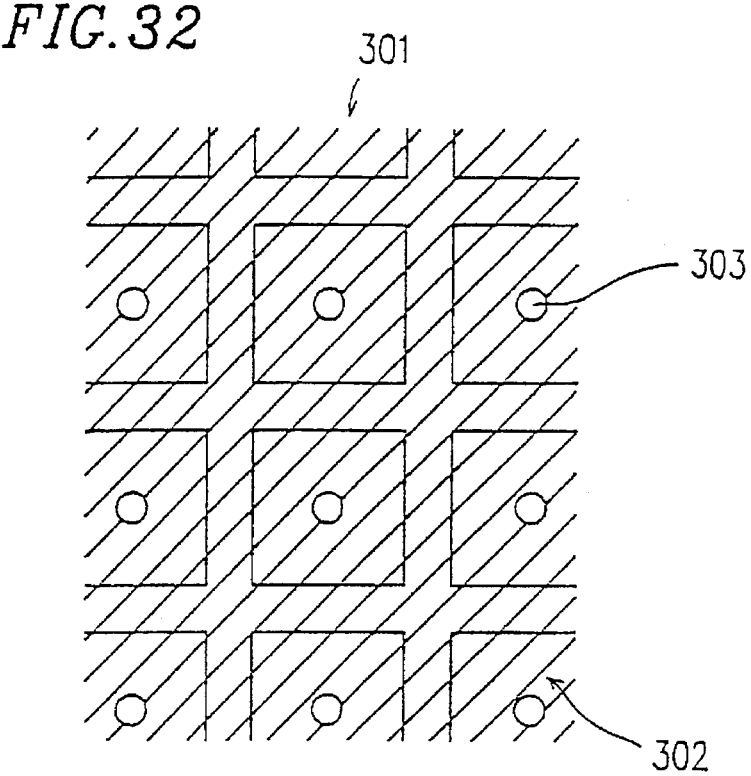
FIG. 32 is a plan view of a mask 302 used for producing a liquid crystal device in Example 18 according to the present invention.

Glass substrates (thickness: 1.1 mm) with transparent electrodes made of ITO (thickness: 50 nm) formed thereon were used. As shown in FIG. 32, on a first substrate 301, uneven islands 303 were formed with a resist material (OMR83; produced by Tokyo Ohka-sha) with 5% by weight of beads for spacers having a particle size of 5.0 µm mixed therein, using a mask 302. The uneven islands 303 formed an insulator composed of a resist in an island shape at the center of each pixel. A light shielding layer made of an Mo thin film was provided under the insulator. Furthermore, on the resultant substrate, the resist material similar to the above without beads for spacers was patterned so as to be in the shape of the uneven islands 303 using a mask 304 having light-shielding portions represented by shaded portions in FIG. 33. As a result, a resist pattern 305 as shown in FIG. 34 was formed, and beads for spacers 306 were present only in the islands 303 of the resist pattern 305. An alignment film (AL4552; produced by Nippon Synthetic Rubber Co., Ltd.) was formed on a second substrate, which was not subjected to rubbing treatment. The first substrate 301 was attached to the second substrate to construct a cell. A mixture containing 0.1 g of R-684 (produced by Nippon Kayaku Co., Ltd.), 0.1 g of p-phenylstyrene, and 0.06 g of the following compound 2 as a polymerizable material; 3.74 g of ZLI4792 (produced by Merck & Co., Inc.; containing 0.4% by weight of S-811) as a liquid crystal material; and 0.02 g of Irgacure 651 as a photopolymerization initiator was injected into the cell thus constructed.

(Compound 2)

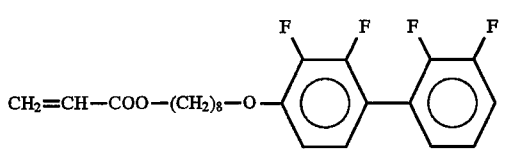

While the liquid crystal cell with the mixture injected therein was kept at 110° C. and a voltage with 60 Hz having an effective voltage of 2.5 volts was applied across transparent electrodes of the substrates, the cell was exposed to UV-rays with a high-pressure mercury lamp at 10 mW/cm² for 5 minutes through the first substrate 301, whereby the polymerizable material was cured. Under the application of a voltage, the cell was cooled to 40° C. over 5 hours and cooled to room temperature (i.e., 25° C.). Then, the polymerizable material was cured with UV-rays in the same way as the above.

Figure 35:
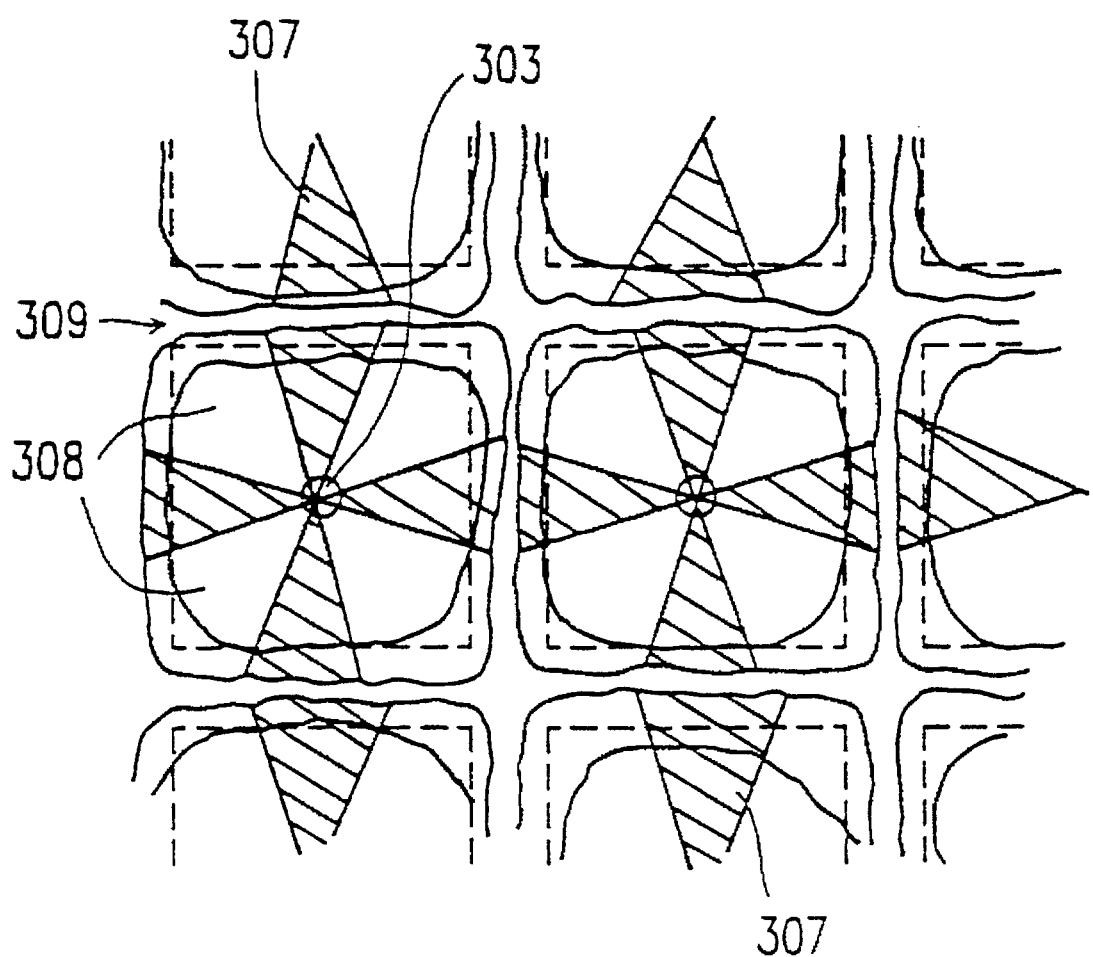
FIG. 35 is a view of the liquid crystal device in Example 18 according to the present invention observed with a polarizing microscope.
Figure 37B:
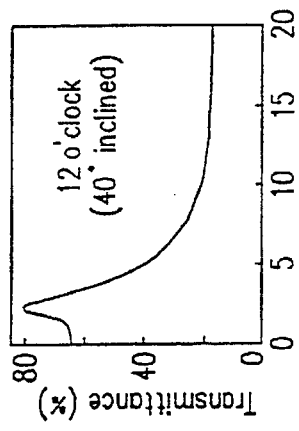
FIGS. 37A through 37E show electro-optic characteristics of a conventional TN cell.
Figure 37A:
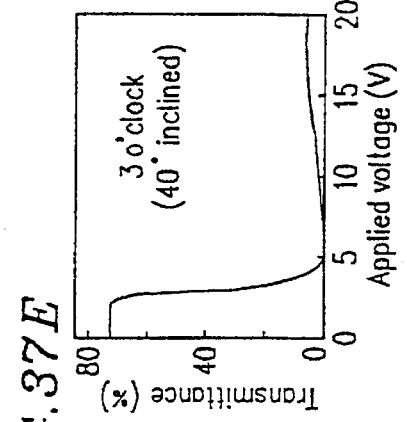
Figure 37E:
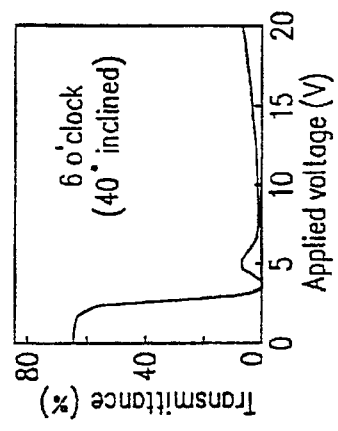
Figure 37F:
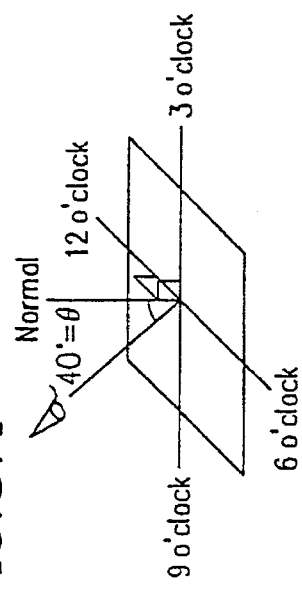
FIG. 37F shows directions in which the electro-optic characteristics are measured.
Figure 37C:
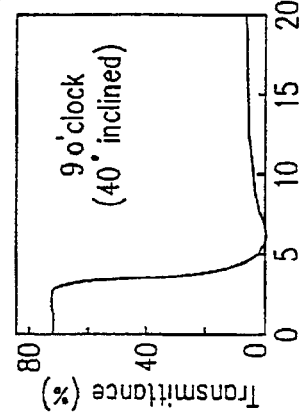
Figure 37D:
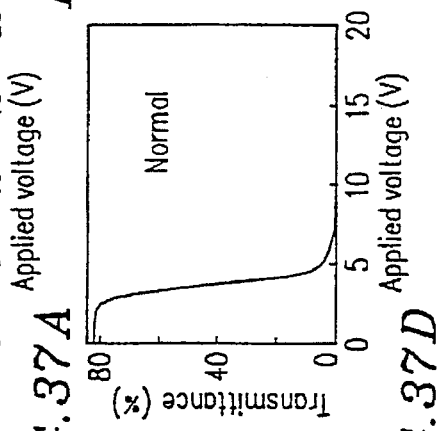

Observation with a polarizing microscope of the liquid crystal device thus produced revealed that liquid crystal regions were in a mono-domain state per pixel as shown in FIG. 35, extinction portions 307 were seen around the islands 303 of the resist pattern 305, and liquid crystal molecules were aligned axis-symmetrically with respect to each of the islands 303. Under the condition that a polarizer and an analyzer of the microscope were fixed in a crossed-Nicols state, the cell was rotated. As a result, it seemed that Schlieren patterns in the liquid crystal regions 308 were at regular positions and only polymer walls 309 surrounding the schlieren patterns were rotated. Because of this, it was understood that the liquid crystal molecules in almost all of the liquid crystal regions 308 obtained axis-symmetrical orientation.

Two polarizing plates were attached to the cell so as to be orthogonal to each other to produce a liquid crystal device having the liquid crystal regions 308 surrounded by the polymer walls 309.

Observation with a polarizing microscope of the liquid crystal device thus produced under the application of a voltage revealed that disclination lines were not formed and the cell was entirely black. The electrooptic characteristics of the liquid crystal device are shown in FIGS. 36A through 36F. This measurement was conducted, assuming that two polarizing plates positioned so that polarizing axes are in parallel with each other allow light to transmit therethrough by 100%. As is understood from FIGS. 36A through 36F, in the liquid crystal device of this example, inversion phenomenon as seen in the conventional TN cell in FIGS. 37A through 37F was not recognized. Furthermore, roughness was not observed even in gray scales.

Comparative Example 4

Figure 33:
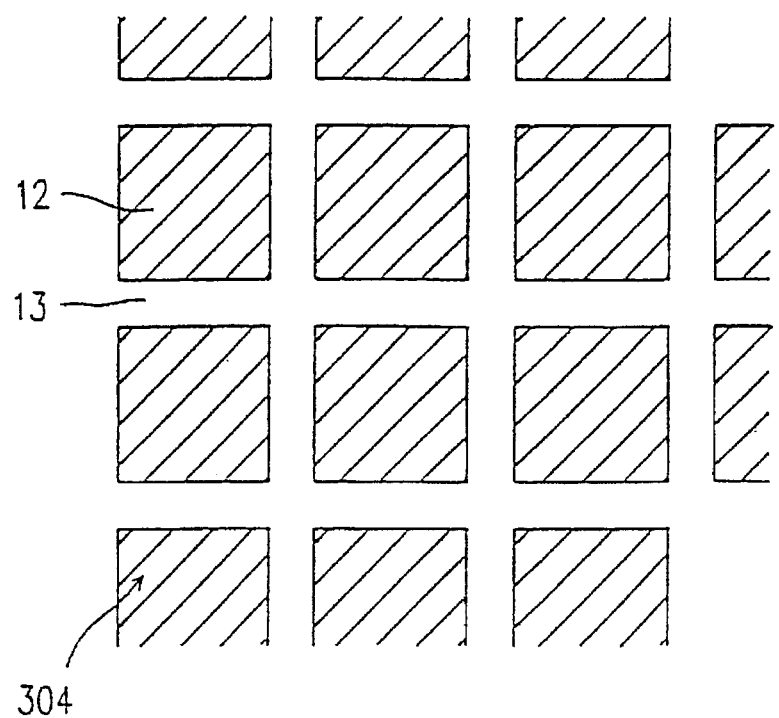
FIG. 33 is a plan view of a mask 304 used for producing the liquid crystal device in Example 18 according to the present invention.
Figure 34A:
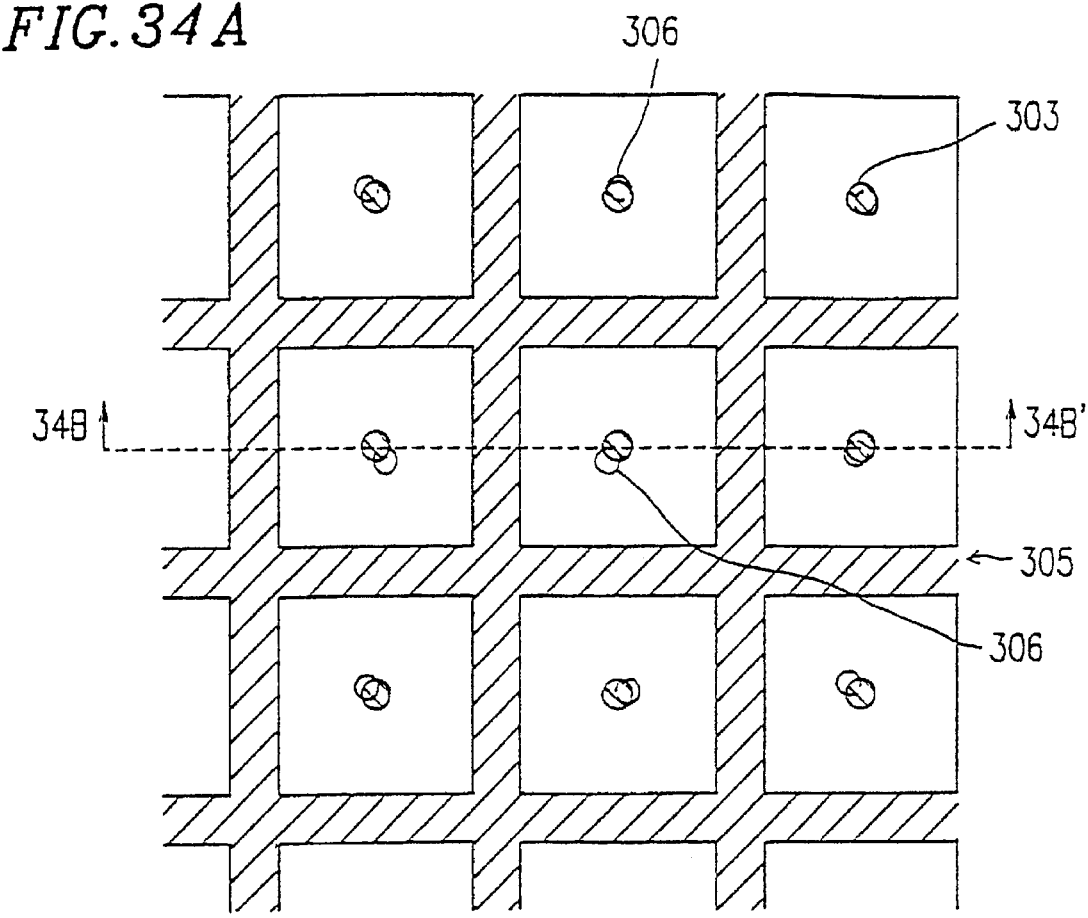
FIG. 34A is a plan view of a substrate 301 of the liquid crystal device in Example 18 according to the present invention.
Figure 34B:
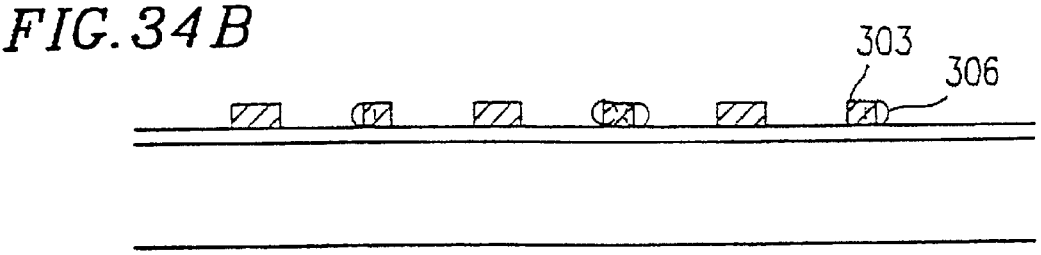
FIG. 34B is a cross-sectional view taken along a line 34B–34B' of FIG. 34A.
Figure 38:
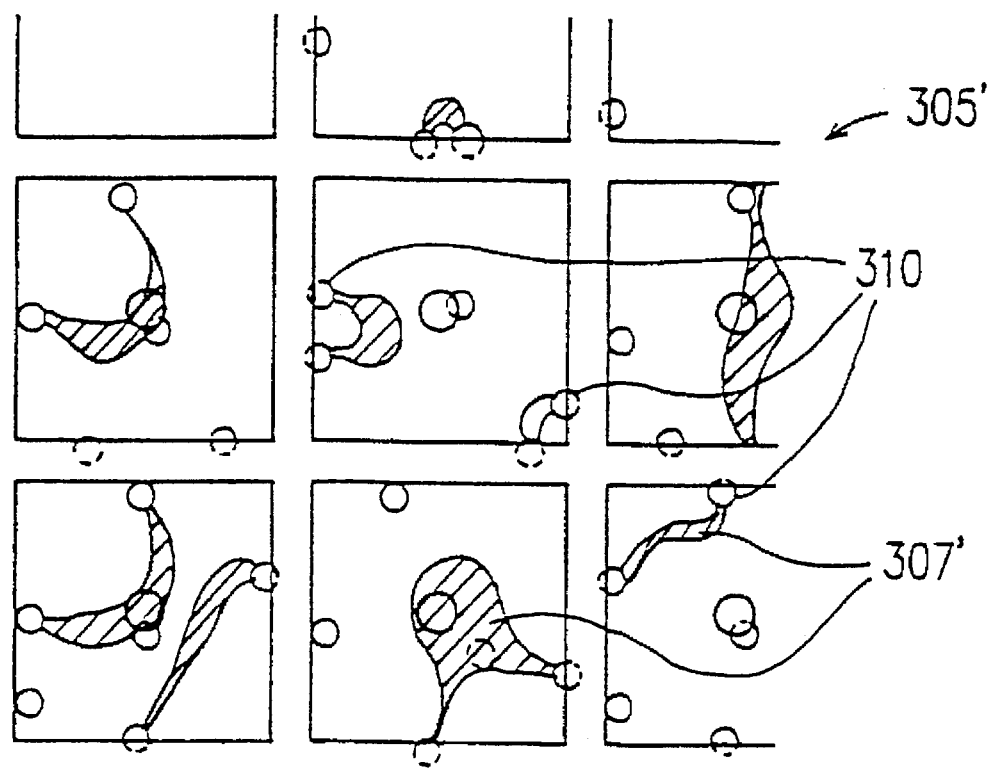
FIG. 38 is a view of a liquid crystal device in Comparative Example 4 observed with a polarizing microscope.

A resist material with 5% by weight of beads for spacers was patterned onto one of a pair of substrates with an ITO electrode thereon similar to that of Example 18, using masks 302 and 304 shown in FIGS. 32 and 33. In Comparative Example 4, beads for spacers were present in the islands 303 and polymer walls surrounding the islands 303, whereas in Example 18, beads for spacers were present only in the islands 303 of the resist pattern 305. An alignment film similar to that in example 18 was formed on the other substrate, and both of the substrates were attached to each other in the same way as in Example 18. A liquid crystal material ZLI-4792 (produced by Merck & Co., Inc.; containing 0.4% by weight of S-811) similar to that of Example 18 was injected into the cell to produce a liquid crystal device in the same way as in Example 18. Observation with a polarizing microscope of the liquid crystal device revealed that beads 310 were deposited at the end of the pixel of the boundary portion between the pixel and the resist, as shown in a resist pattern 305' in FIG. 38; therefore, the beads 310 affect the liquid crystal orientation to cause the orientation axes of the liquid crystal domains to shift from the center of each pixel to form extinction portions 307'. Thus, roughness was observed more remarkably as a whole.

In this example, the added amount of spacers is too large, so that the spacers cannot be sufficiently covered with an insulator. This disturbs the orientation of liquid crystal molecules to affect a display quality.

Example 19

A pair of substrates (thickness: 1.1 mm) with a transparent electrode made of ITO (thickness: 50 nm) were used. A negative photoresist OMR83 (produced by Tokyo Ohka-sha) with 2% by weight of plastic beads (Micropearl; produced by Sekisui Fine Chemical Co., Ltd.) having an average particle size of 5.5 μm mixed therein was uniformly coated onto one of the substrates by spin coating, and the substrate was baked.

Figure 39:
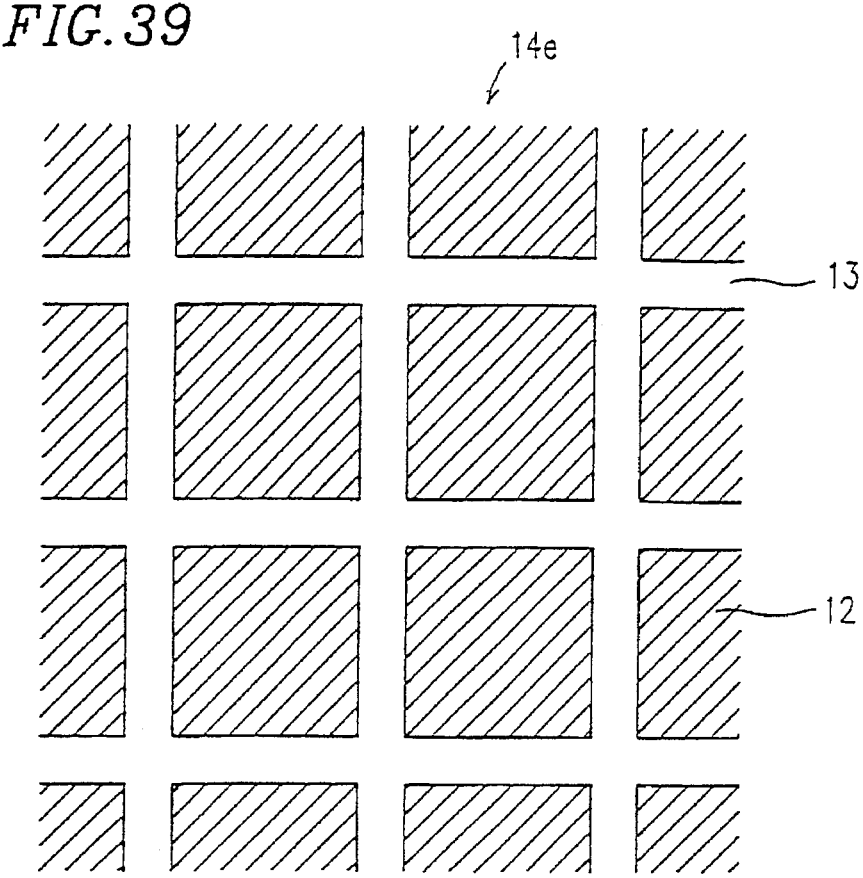
FIG. 39 is a view of a first photomask 14e used in Example 19 according to the present invention.
Figure 40A:
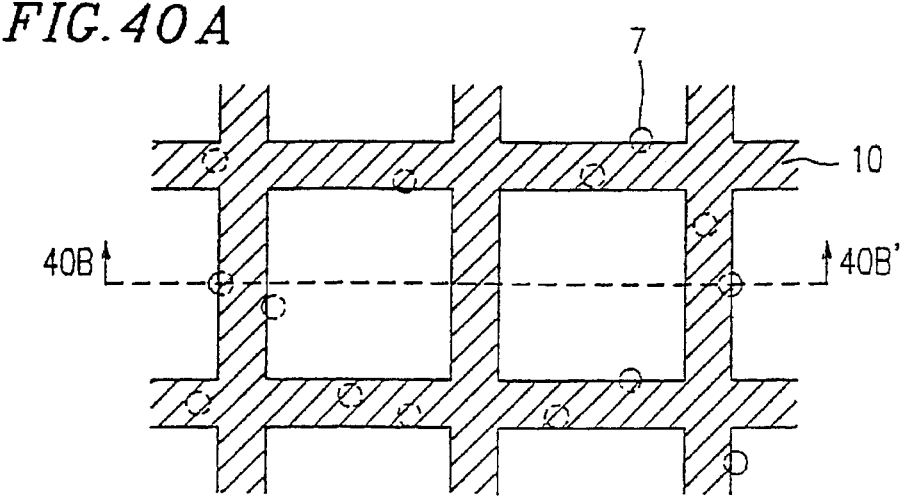
FIG. 40A is a plan view of an insulator including beads formed by the first patterning in Example 19 according to the present invention.
Figure 40B:
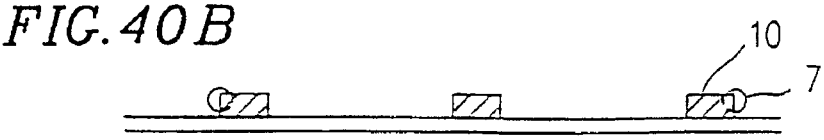
FIG. 40B is a cross-sectional view taken along a line 40B–40B' of FIG. 40A.

The substrate was exposed to light with a predetermined intensity through a photomask 14e shown in FIG. 39 and developed, whereby a first-stage resist wall was patterned. At this time, a number of beads were deposited from the wall faces of the resist wall, as shown in FIG. 40.

Figure 41:
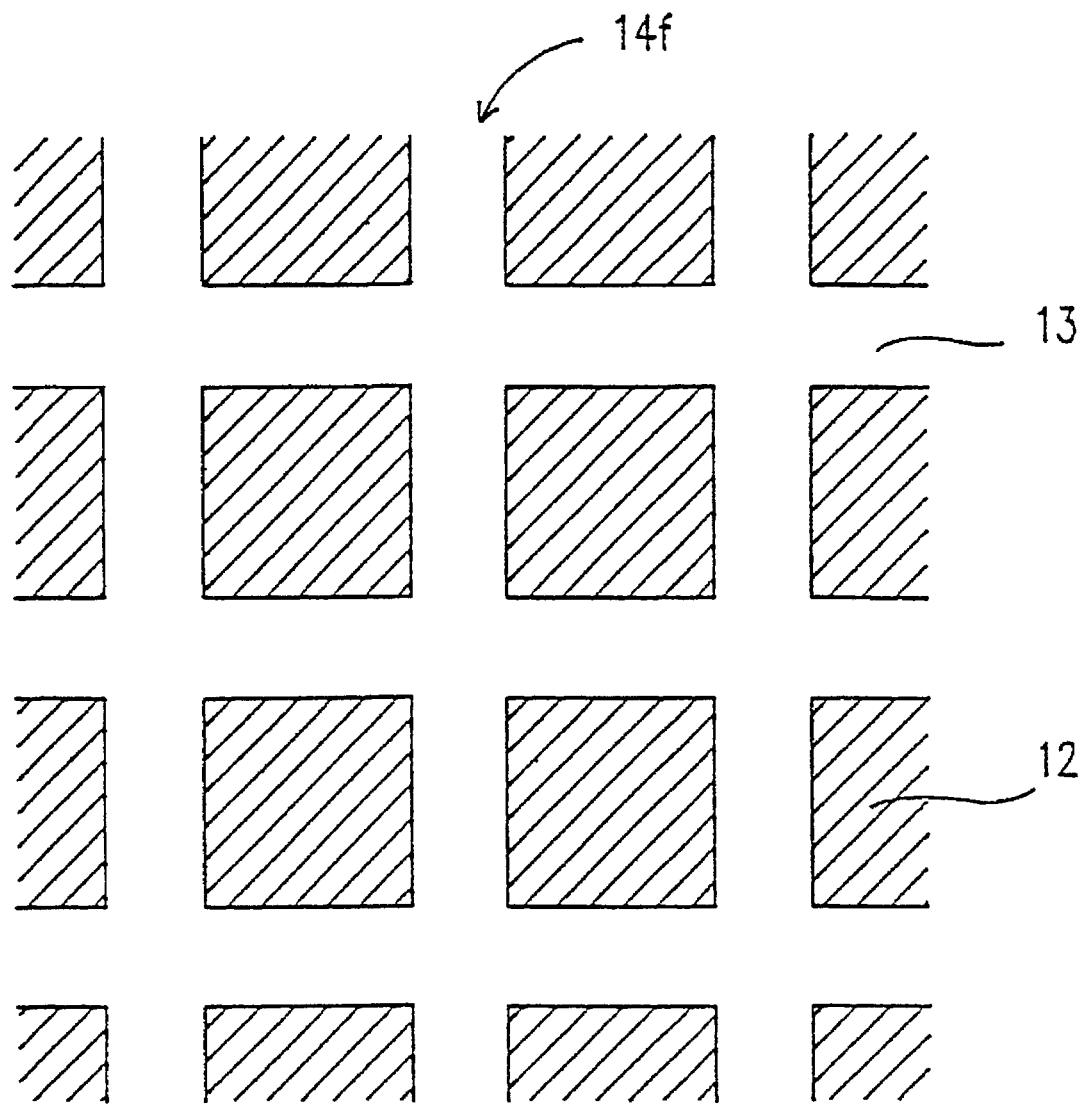
FIG. 41 is a view of a second photomask 14f used in Example 19 according to the present invention.

Next, the resist which was the same kind as the above was coated onto the substrate, and the resultant substrate was exposed to light through a photomask 14f shown in FIG. 41 having light-transmitting portions wider than those of the photomask 14e shown in FIG. 39 by 20 μm (i.e., wider by 10 μm in right and left directions). Thus, the beads deposited to the faces of the first-stage resist wall were completely shielded. FIG. 10A shows a plan view of the substrate produced by multi-stage patterning steps as observed with a microscope; FIG. 10B shows a schematic cross-sectional view of the insulating layers 10a and 10b including the beads for spacers 7. These states are similarly obtained in other examples in the case where spacers such as beads are shielded.

Next, a polyimide alignment film AL4552 (produced by Nippon Synthetic Rubber Co., Ltd.) was coated onto the other substrate, which was not subjected to rubbing treatment.

Then, a sealant (Structbond XN-21S) was patterned on the substrate with the alignment film formed thereon, and both of the substrates were attached to each other to construct a liquid crystal cell. The substrate with the alignment film formed thereon can be produced prior to the production of the other substrate.

Next, as in Example 7, a mixture containing 0.1 g of R-684 (produced by Nippon Kayaku Co., Ltd.), 0.1 g of p-phenylstyrene, and 0.06 g of the above-mentioned compound 1 as a polymerizable material; 3.74 g of ZLI-4792 (produced by Merck & Co., Inc.; containing 0.3% by weight of S-811) as a liquid crystal material; and 0.02 g of Irgacure 651 as a photopolymerization initiator was injected into the cell thus constructed.

While the cell with the mixture injected therein was kept at 110° C. and a voltage having a frequency of 60 Hz and an effective voltage of 2.5 volts was applied across transparent electrodes, the cell was exposed to UV-rays with a high-pressure mercury lamp at 10 mW/cm² for 5 minutes. Thus, the mixture was phase-separated and the polymerizable material was polymerized.

Thereafter, the cell was cooled to 25° C. over 5 hours, and the cell was exposed to UV-rays in the same way as the above, whereby the polymerizable material was completely cured.

Figure 27:
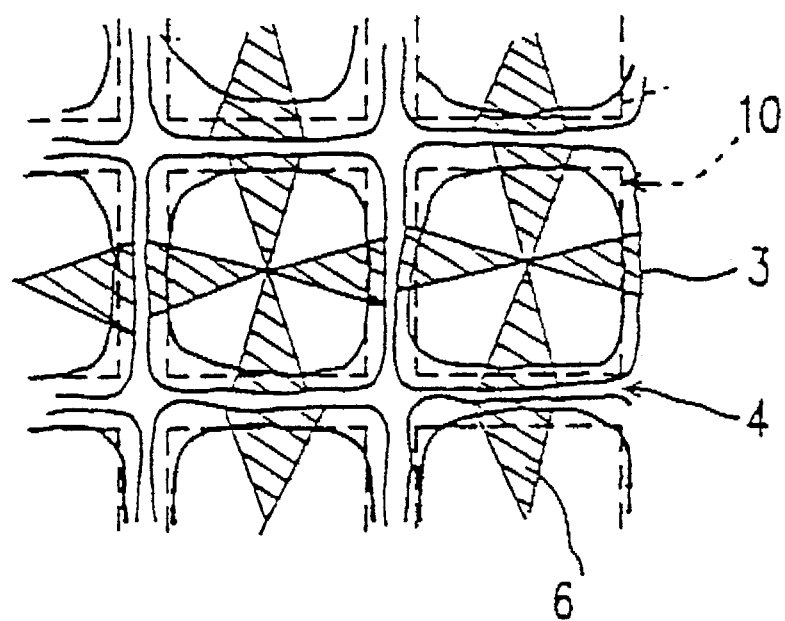
FIG. 27 is a view of a liquid crystal device in Example 14 according to the present invention observed with a polarizing microscope.
Figure 28A:
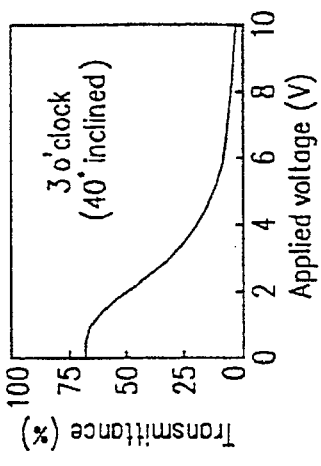
FIGS. 28A through 28E show electro-optic characteristics of the liquid crystal device in Example 14 according to the present invention.
Figure 28B:
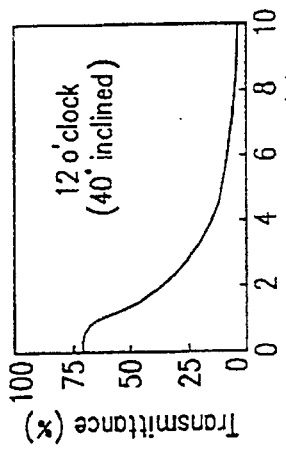
Figure 28E:
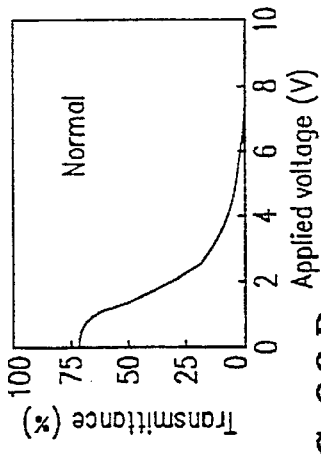
Figure 28D:
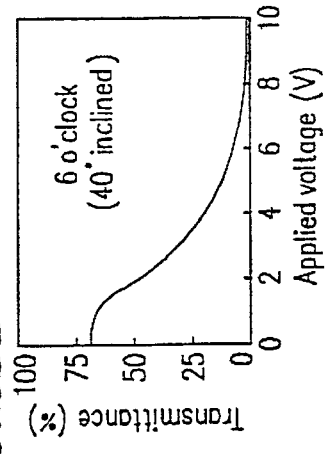
Figure 28C:
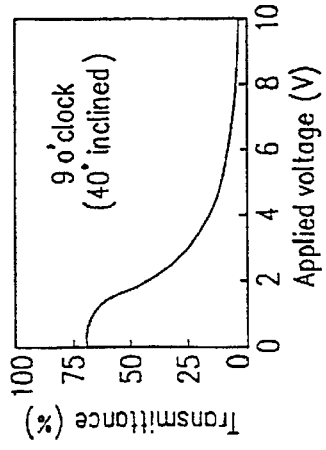
Figure 28F:
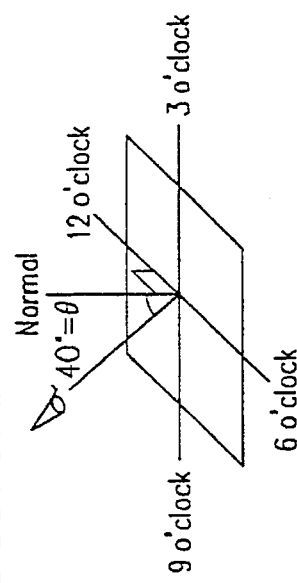
FIG. 28F shows directions in which the electro-optic characteristics are measured.

Observation with a polarizing microscope of the cell thus produced revealed that the liquid crystal regions 3 surrounded by the polymer regions 4 were in a mono-domain state with respect to each pixel and liquid crystal molecules were aligned axis-symmetrically with respect to the center of each pixel, as shown in FIG. 27. Almost all of the liquid crystal regions obtained this orientation state. This was confirmed as follows: The cell was rotated under a polarizer and an analyzer of the microscope in a crossed-Nicols state. As a result, it was observed that Schlieren patterns in the liquid crystal regions were at regular positions and only polymer walls surrounding the schlieren patterns were rotated.

Two polarizing plates were attached to the cell so as to be orthogonal to each other to produce a liquid crystal device in which the liquid crystal regions were surrounded by the polymer walls.

Observation with a polarizing microscope of the liquid crystal device under the application of a voltage revealed that disclination lines were not formed and the cell was entirely black. On the other hand, the electrooptic characteristics were evaluated, assuming that two polarizing plates positioned so that polarizing axes are in parallel with each other allow light to transmit therethrough by 100%. The inversion phenomenon did not occur in the same way as shown in FIGS. 36A through 36F of the voltage-transmittance characteristics obtained in Example 18, and the light transmittance in a large viewing angle direction under the condition that a voltage was saturated did not increase. Furthermore, roughness was not observed in gray scales.

Example 20

In Example 20, guest-host type liquid crystal was used. A mixture was injected into a liquid crystal cell produced in accordance with a production method similar to that of Example 19 by a vacuum injection method under a reduced pressure. The mixture contained 0.36 g of R-684 (produced by Nippon Kayaku Co., Ltd.) as a polymerizable material; a mixture containing 0.09 g of the compound 1 and 0.15 g of p-phenylstyrene; 0.03g of Irgacure 184 as a photo-polymerization initiator; and 4.4 g of a liquid crystal composition in which 1% anthraquinone type dichroic black dye LCD 465 (produced by Nippon Kayaku Co., Ltd.) was added to ZLI-4792 (produced by Merck & Co., Inc.; containing 0.3% by weight of S-811) as a liquid crystal material.

Then, the liquid crystal cell filled with the above mixture was kept at a temperature allowing an isotropic liquid phase and a liquid crystal phase to exist simultaneously, and a voltage having a frequency of 60 Hz and an effective voltage of 1.5 volts was applied across the electrodes in the cell, whereby the orientation of the liquid crystal regions was controlled. Then, the cell was cooled down so as to be set in a temperature range in which the mixture was in a liquid crystal phase. Under this condition, the cell was exposed to UV-rays with a high-pressure mercury lamp at 5 mW/cm$^2$ (365 nm) for 15 minutes, whereby phase separation by photopolymerization was effected. Furthermore, the mixture was exposed to UV-rays at room temperature (25° C.) in the same way as the above, whereby the polymerizable material was completely cured.

Observation with a polarizing microscope of the liquid crystal cell produced in this example revealed that liquid crystal regions surrounded by the polymer regions were in a mono-domain state with respect to each pixel in the same way as in the other examples, the orientation of the liquid crystal molecules were not disturbed by spacers in pixels, and liquid crystal molecules and dye molecules in the liquid crystal regions were axis-symmetrically aligned. Thus, this example was confirmed to be applicable to a guest-host display.

Example 21

A negative black resist CFPR-BK510S (produced by Tokyo Ohka-sha) with 2% by weight of plastic beads (Micropearl: produced by Sekisui Fine Chemical Co., Ltd.) having an average particle size of 5.5 µm was uniformly coated onto a first glass substrate by spin coating in accordance with the production method of Example 19, and the substrate was baked.

The substrate was exposed to light with a predetermined intensity through a photomask 14e in FIG. 39 and development steps and the like were conducted; as a result, first-stage resist walls were patterned on the substrate.

The negative photoresist OMR83 of Example 19 was coated onto the substrate and exposed to light through a photomask 14f shown in FIG. 41 having light-transmitting portions wider than those of the photomask 14e shown in FIG. 39 by 20 µm (i.e., wider by 10 µm in the right and left direction). Thus, the beads deposited on the interfaces of the first-stage resist walls were completely shielded.

A polyimide alignment film AL4552 was coated onto a second substrate, which was not subjected to rubbing treatment. The substrate with the alignment film formed thereon can be produced prior to the production of the other substrate.

Then, a mixture containing a liquid crystal material and a polymerizable material, similar to that of Example 19 was injected between the substrates to construct a liquid crystal cell by the same production method as that of Example 19.

Observation with a polarizing microscope of the liquid crystal cell revealed that each pixel was in a mono-domain state and liquid crystal molecules were axis-symmetrically aligned with respect to each pixel. Furthermore, two polarizing plates were attached to the cell so as to be orthogonal to each other, whereby a liquid crystal device was produced. The device was observed in a large viewing angle direction under the application of a voltage, indicating that roughness was not recognized. Since the black insulating layer was formed at the first stage, light shielding characteristics improved and a sharp image was obtained.

Example 22

Figure 42:
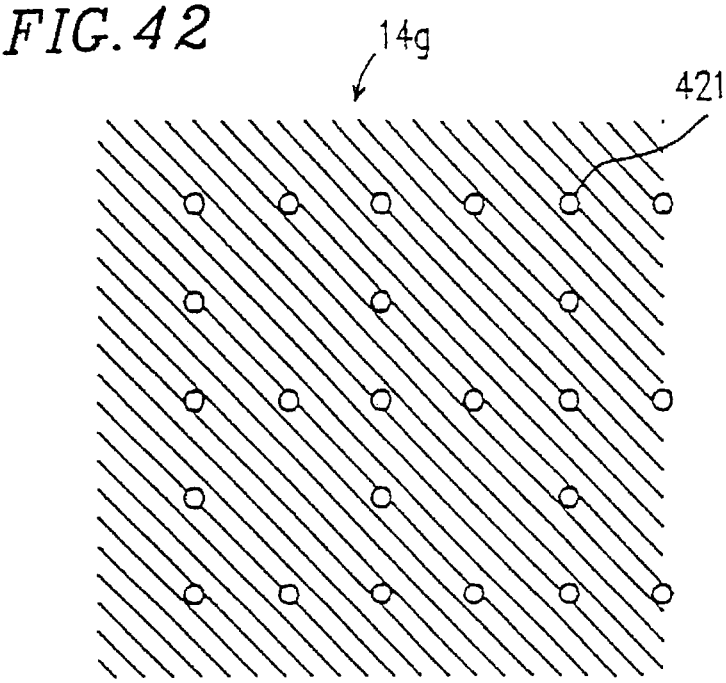
FIG. 42 is a view of a mask 14g for spacer printing used in Example 22 according to the present invention.

A binder material (UV-curable resin) with 10% by weight of spacers similar to those in Example 19 mixed therein was seal-printed on a glass substrate with ITO, and the substrate was exposed to UV-rays through a photomask 14g having holes 421 for printing spacers as shown in FIG. 42 so that beads contained in the material were fixed on the substrate. Observation with a microscope of the surface of the substrate revealed that the beads were regularly aligned on the surface of the substrate.

A negative photoresist OMR83 (produced by Tokyo Ohka-sha) was coated onto the substrate, and the resultant substrate was exposed to light through a photomask 14f shown in FIG. 41, developed, rinsed, and the like, whereby the photoresist was patterned. The surface of the substrate thus obtained was observed with a microscope, which showed that the beads were not deposited on the faces of the resist walls but completely buried therein.

An alignment film was formed on the other substrate in the same way as in Example 19, and both of the substrates were attached to each other to construct a liquid crystal cell.

A mixture containing a liquid crystal material and a polymerizable material, similar to that of Example 19 was injected into the cell in the same way as in Example 19.

The liquid crystal cell thus constructed was observed with a polarizing microscope, and it was found that each pixel was in a mono-domain state and liquid crystal molecules were axis-symmetrically aligned with respect to the center of each pixel. Furthermore, two polarizing plates were attached to the cell to produce a liquid crystal device. The device was observed in a large viewing angle direction under the application of a voltage, showing no sign of roughness.

Comparative Example 5

In Comparative Example 5, the difference in size of light-transmitting portions between a first-stage mask and a second-stage mask is smaller than the size of respective beads.

A negative photoresist OMR83 with 2% by weight of beads for spacers mixed therein was coated onto one of a pair of substrates similar to that of Example 19, and the resultant substrate was exposed to light through a photomask (not shown) with a line width larger by 10 μm than that of the light-shielding portions 12 in FIG. 39, developed, and the like, whereby the photoresist was patterned on the substrate.

The same type of resist material was coated onto the substrate obtained in the above. The resultant substrate was exposed to light through a photomask 14f shown in FIG. 41, developed, and the like, whereby resist walls at the second stage were patterned on the substrate. The vicinity of the resist walls thus formed was observed with a microscope, indicating that in places where the beads remarkably deposited from the resist walls patterned at the first stage were present, part of the beads were deposited at the second stage.

A substrate with an alignment film formed thereon was attached to the substrate on which the resist walls had been patterned in accordance with Example 19 to construct a liquid crystal cell. A mixture containing a liquid crystal material and a polymerizable material, similar to that of Example 19 was injected into the cell in the same way as in Example 19.

Two polarizing plates were attached to the cell so as to be orthogonal to each other to produce a liquid crystal device.

Figure 43:
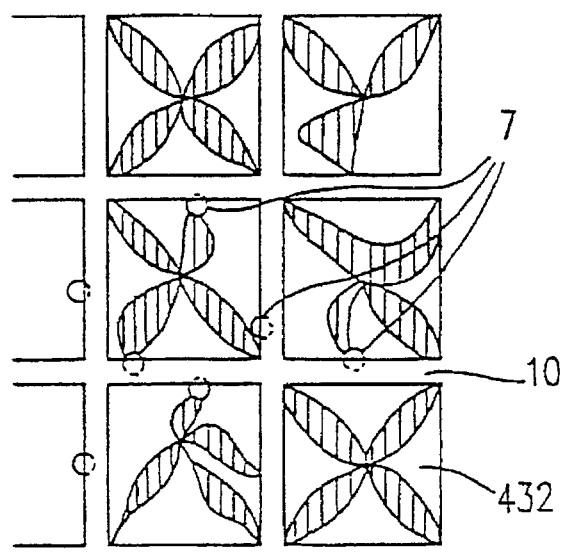
FIG. 43 is a view showing a state of liquid crystal device in Comparative Example 5 observed with a polarizing microscope.

Observation with a microscope of the liquid crystal device under the application of a voltage revealed that a part of the beads appeared on the interfaces between the pixels 432 and the resist walls as shown in FIG. 43 and a number of portions affected in the direction of liquid crystal molecules were observed. In the case where the orientation axes of the liquid crystal domains were shifted from the center of each pixel and viewing angle directions were different, the sizes of liquid crystal domains having an average tilt were different; therefore, remarkable roughness was observed in gray scales in the liquid crystal device produced in Comparative Example 5.

Example 23

A negative photoresist OMR83 (produced by Tokyo Ohka-sha) with 2% by weight of spacer beads mixed therein in the same way as in Example 19 was uniformly coated onto an active matrix substrate in which a TFT and a pixel electrode 2a were provided on a transparent glass substrate 1a per pixel, and the substrate was baked.

Figure 44:
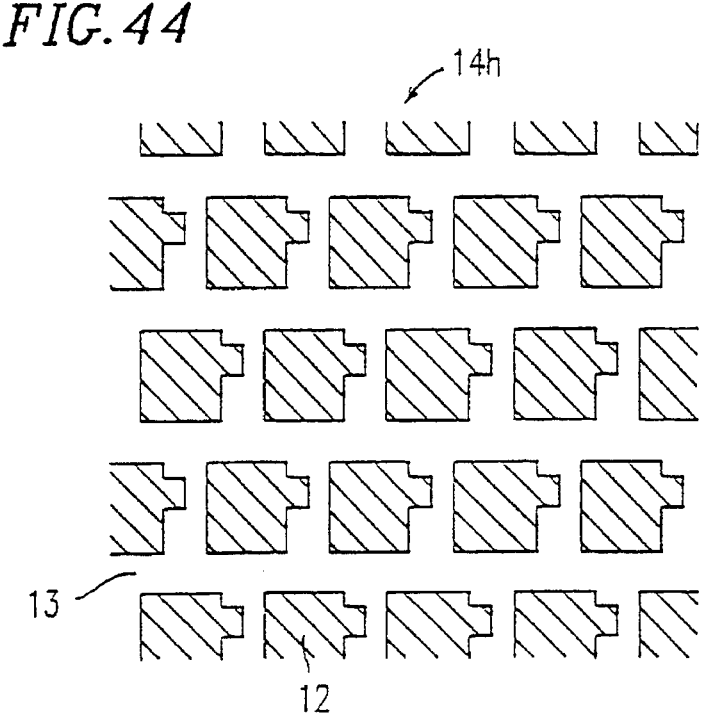
FIG. 44 is a view of the first photomask 14h for a TFT substrate used in Example 23 according to the present invention.

The substrate was exposed to light through a photomask 14h shown in FIG. 44 and developed, whereby first-stage resist walls 20 with beads 7 dispersed therein were patterned.

Figure 45A:
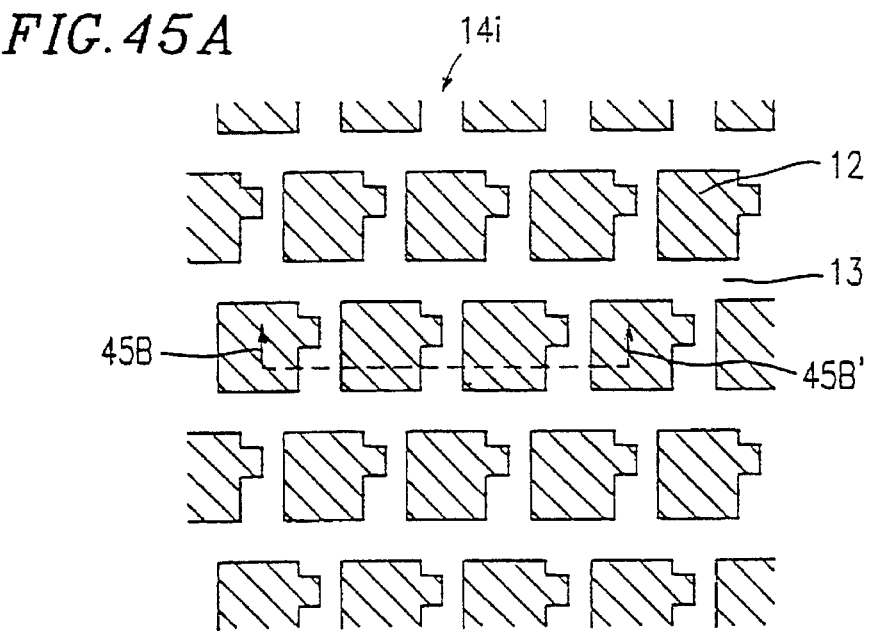
FIG. 45A is a plan view of the second photomask 14i for a TFT substrate used in Example 23 according to the present invention.

Then, a photoresist OMR83 without beads dispersed therein was coated onto the substrate obtained in the above, and the substrate was exposed to light through a photomask 14i shown in FIG. 45A having light-transmitting portions wider than those of the photomask 14h shown in FIG. 44 by 20 μm (i.e., wider by 10 μm in right and left directions) and developed. As a result, a second-stage resist 10 was patterned on the substrate 450a. Beads for spacers 7 were included in the patterned resist and were not deposited on the surface thereof.

A polyimide film was formed on a counter substrate provided with a color filter, and this substrate was attached to the TFT substrate 450a to construct a TFT liquid crystal cell.

A mixture containing a liquid crystal material and a polymerizable material, similar to that of Example 19 was injected into the TFT liquid crystal cell by a vacuum injection method. A voltage having a frequency of 60 Hz and an effective voltage of 2.5 volts was applied to a source electrode of the TFT liquid crystal cell and a DC voltage of 10 volts was applied to a gate electrode thereof, thereby heating the cell to a temperature allowing the mixture to be homogeneous. Then, the cell was gradually cooled to deposit a liquid crystal phase. Thereafter, the application of a voltage was terminated, and when the liquid crystal phase spread almost over regions corresponding to pixels, the cell was exposed to UV-rays, whereby phase separation was effected by polymerization. As a result, a TFT liquid crystal cell in which liquid crystal regions were surrounded by the polymer regions was obtained.

Two polarizing plates were attached to the TFT liquid crystal cell so as to be orthogonal to each other to produce a TFT liquid crystal display device. Observation with a microscope of the device revealed that liquid crystal molecules were axis-symmetrically aligned in the liquid crystal regions and roughness was not recognized in gray scales.

Example 24

In Example 24, spacers were provided only in TFT gate signal lines.

A negative photoresist OMR83 (produced by Tokyo Ohka-sha) with 2% by weight of beads for spacers mixed therein was uniformly coated onto an active matrix substrate in which a TFT and a pixel electrode were provided per pixel on transparent glass in accordance with a production method similar to that of Example 23, and the substrate was baked.

Figure 46:
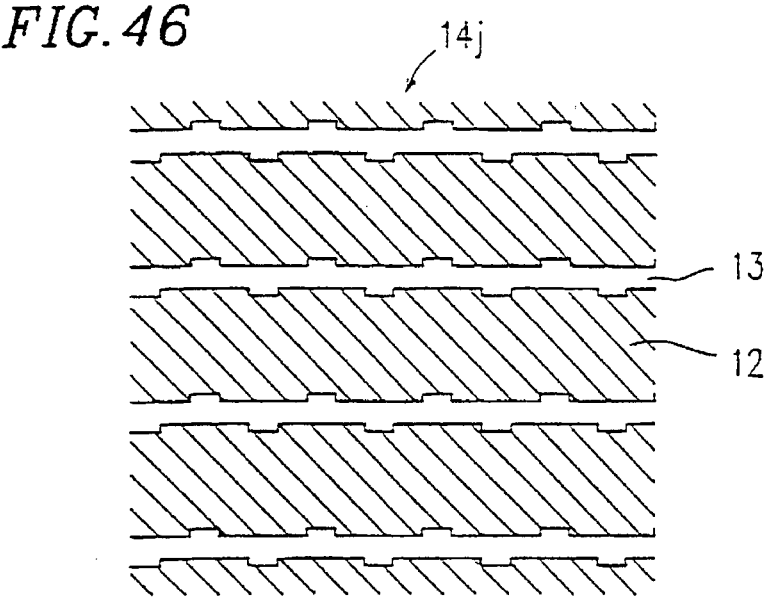
FIG. 46 is a view of the first photomask 14j for a TFT substrate, used for patterning only gate signal lines in Example 24 according to the present invention.

The substrate was exposed to light through a photomask 14j shown in FIG. 46 and developed, whereby first-stage resist walls 20 with beads dispersed therein were patterned. The photomask 14j was designed so that an insulator containing beads for spacers was patterned on a portion of TFT gate signal lines where difference in step was relatively uniform.

Figure 47A:
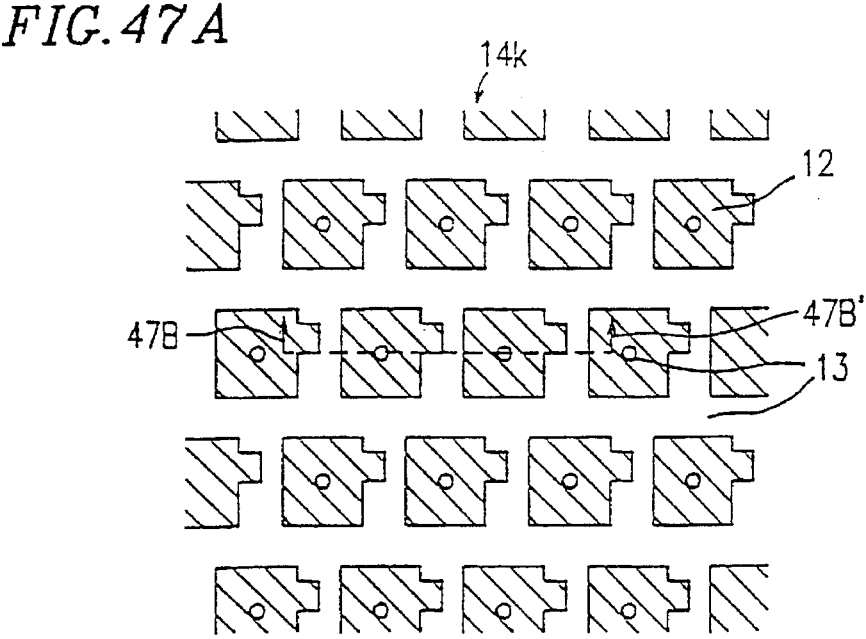
FIG. 47A is a plan view showing the second photomask 14k for TFTs used in Example 24 according to the present invention.
Figure 47B:
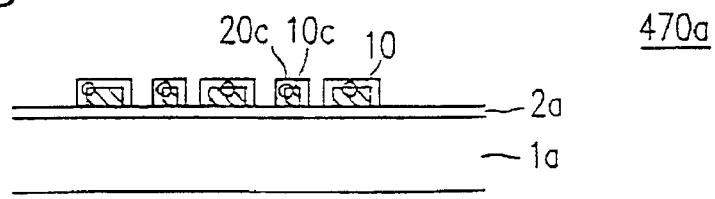
FIG. 47B is a cross-sectional view of an insulator formed at a position corresponding to a line 47B–47B' of FIG. 47A.

Then, a photoresist OMR83 without beads mixed therein was coated onto the substrate obtained above, and the substrate was exposed to light through a photomask 14k shown in FIG. 47 and developed, whereby a second-stage resist 10 was patterned. The photomask 14k had light-transmitting portions wider by about 5 μm in the orthogonal direction than transmitting portions 13 of a photomask 14j in FIG. 46, and portions corresponding to pixels respectively had island-shaped transmitting portions. Observation with a microscope of the state in which the beads were dispersed on the TFT substrate 470a produced by the above steps revealed that the beads were dispersed on gate signal lines and no beads were found on source signal lines. Furthermore, the beads were confirmed to be completely in the resist.

A polyimide film was formed on a counter substrate provided with a color filter, and this substrate was attached to the TFT substrate to construct a TFT liquid crystal cell.

A mixture containing a liquid crystal material and a polymerizable material, similar to that of Example 19 was injected into the TFT liquid crystal cell by a vacuum injection method. A voltage having a frequency of 60 Hz and an effective voltage of 2.5 volts was applied to a source electrode of the TFT liquid crystal cell and a DC voltage of 10 volts was applied to a gate electrode thereof, thereby keeping the cell at 110° C. Under this condition, the cell was exposed to UV-rays with a high-pressure mercury lamp at 10 mW/cm$^2$ for 5 minutes through the TFT substrate, allowing the mixture to be phase-separated by polymerization (the voltage was kept being applied while the cell was cooled).

Thereafter, the cell was cooled to 25° C. over 5 hours, and the application of a voltage was terminated. Furthermore, the cell was exposed to UV-rays in the same way as in the above, whereby the polymerizable material was completely cured.

Two polarizing plates were attached to the cell so as to be orthogonal to each other to produce a TFT liquid crystal device. Observation with a microscope of the liquid crystal device revealed that liquid crystal molecules were aligned axis-symmetrically with respect to the island-shaped insulator formed at the center of each liquid crystal region and roughness was not evidenced in gray scales.

Example 25

Figure 48:
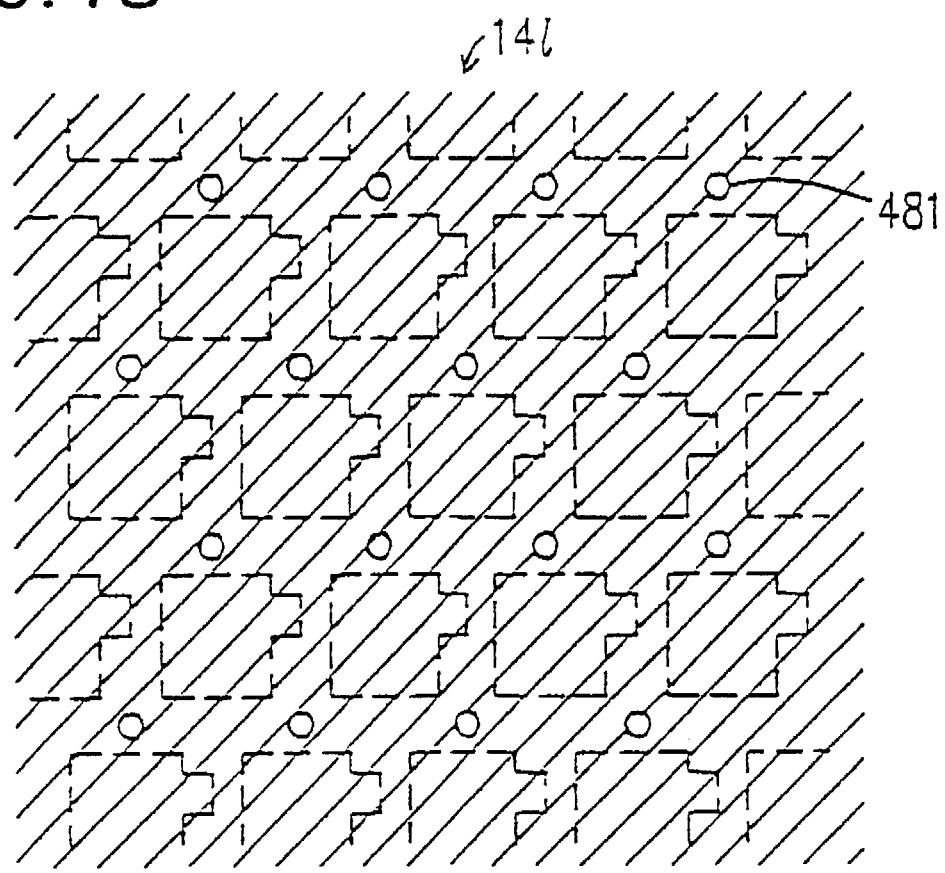
FIG. 48 is a view of a mask 141 for printing spacers on a TFT substrate used in Example 25 according to the present invention.

A photocurable resin with 10% by weight of beads for spacers mixed therein was printed onto an active matrix substrate in which a TFT and a pixel electrode were provided per pixel on transparent glass similar to that of Example 23. The substrate was exposed to light through a photomask 141 having holes 481 for printing spacers shown in FIG. 48, whereby the resin was cured and fixed on the substrate. Observation with a microscope of the surface of the substrate revealed that beads were fixed by the resin at intersections of source signal lines and gate signal lines.

Figure 45B:
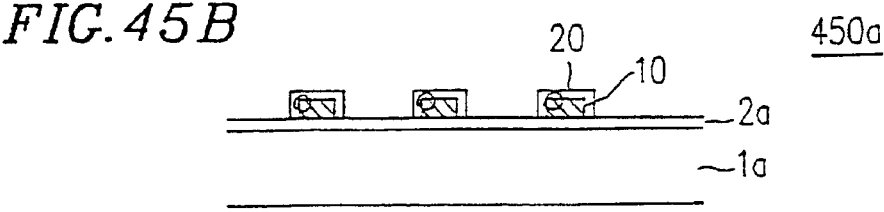
FIG. 45B is a cross-sectional view of an insulator formed at a position corresponding to a line 45B–45B' of FIG. 45A.

Thereafter, a photoresist OMR83 was coated onto the resultant substrate, and the substrate was exposed to light through a photomask 14i shown in FIG. 45 similar to that of Example 23 and developed, whereby the photoresist was patterned.

Then, the same steps as those in Example 23 were conducted, and the TFT substrate was attached to a substrate with a color filter to construct a TFT liquid crystal cell. A mixture containing a liquid crystal material and a polymerizable material, similar to that of Example 19 was injected into the cell, and a TFT liquid crystal device was produced by the same method as that of Example 23.

In the liquid crystal device produced in this example, liquid crystal molecules were axis-symmetrically aligned in liquid crystal regions and roughness was not evidenced in gray scales under the application of a voltage.

Example 26

Plastic beads for spacers (Micropearl, produced by Sekisui Fine Chemical Co., Ltd.) having an average particle size of 5.5 µm were dispersed on a substrate similar to that of Example 19 by a predetermined dry dispersion method. Then, a negative black resist CFPR-BK510S (produced by Tokyo Ohka-sha) was uniformly coated onto the substrate by spin coating and the substrate was baked.

The substrate was exposed to light with a predetermined intensity through a photomask 14e in FIG. 39 and developed, whereby first-stage insulating resist walls were patterned being fixed by the beads only on signal lines outside pixels.

Next, a negative photoresist OMR83 of Example 19 was coated onto the substrate, and the substrate was exposed to light through a photomask 141 shown in FIG. 41 whose line width was larger by 20 µm (i.e., larger by 10 µm in right and left direction) than that of a photomask 14e in FIG. 39, whereby the beads deposited on the interfaces between the first-stage resist walls and the pixels were completely shielded.

A polyimide alignment film AL4552 was coated onto a second substrate, which was not subjected to rubbing treatment.

A mixture containing a liquid crystal material and a polymerizable material, similar to that of Example 19 was injected between the substrates, whereby a liquid crystal cell was produced by the same production method as that of Example 19.

The liquid crystal cell produced in this example had characteristics similar to those of the liquid crystal cell produced in Example 21. Furthermore, in this example, since the beads were first dispersed, uniform dispersion and fixation of the beads were improved, compared with the method in which plastic beads were dispersed in a resist solution and coated onto a substrate by spin coating.

The beads can be dispersed by a dry dispersion method in which a volatile solution with beads dispersed therein is sprayed onto a substrate.

Example 27

Plastic beads (Micropearl, produced by Sekisui Fine Chemical Co., Ltd.) having an average particle size of 5.5 µm were dispersed on an active matrix substrate in which a TFT and a pixel electrode were provided per pixel on transparent glass similar to that of Example 23 by a predetermined dry dispersion method.

Then, a positive photoresist OFPR800 (produced by Tokyo Ohka-sha) was uniformly coated onto the substrate by spin coating, and the substrate was baked.

The substrate was exposed to light from a reverse side thereof by utilizing, as a photomask, TFT signal lines and metal wirings to be light-shielding films, developed, and the like, whereby first-stage resist walls with plastic beads dispersed therein were patterned on the substrate.

A negative photoresist OMR83 (produced by Tokyo Ohka-sha) was coated onto the substrate, and the substrate was exposed to light from the TFT substrate side through a photomask 14i in FIG. 45, developed, and the like, whereby a second-stage resist was patterned. In the insulator formed by the above-mentioned steps, the plastic beads were contained in the resist and were not deposited on the surface of the resist.

A polyimide film was formed on a counter substrate with a color filter, and both of the substrates were attached to each other to construct a TFT liquid crystal cell.

A mixture containing a liquid crystal material and a polymerizable material, similar to that of Example 19 was injected into the TFT liquid crystal cell by a vacuum injection method. A voltage having a frequency of 60 Hz and an effective voltage of 2.5 volts was applied to a source electrode of the TFT liquid crystal cell and a DC voltage of 10 volts was applied to a gate electrode thereof, whereby the cell was kept at 110° C. Under this condition, the cell was exposed to UV-rays with a high-pressure mercury lamp at 10 mW/cm$^2$ for 5 minutes from the TFT substrate side, allowing the mixture to be phase-separated by polymerization (the voltage remained applied while the cell was being cooled).

The cell was cooled to 25° C. over 5 hours, and the application of a voltage was terminated. Furthermore, the cell was exposed to UV-rays in the same as the above, whereby the polymerizable material was completely cured.

Two polarizing plates were attached to the cell so as to be orthogonal to each other to produce a liquid crystal device. Observation with a microscope of the device revealed that liquid crystal molecules were aligned axis-symmetrically with respect to island-shaped insulators formed at the center of each liquid crystal region and roughness was not recognized in gray scales.

In this example, by utilizing light-shielding layers such as metal wiring films of the TFT substrate in the photomask step at the first stage, a mask alignment step was simplified.

Example 28

An m-cresol solution containing 1% by weight of a linear crystalline polymer (Nylon 6,6) was coated onto one of a pair of substrates each having an ITO electrode similar to the one used in Example 19 by spin coating. The resultant substrate was allowed to stand at 140° C. for 2 hours. Then, the substrate was cooled to room temperature at a cooling speed of 3° C./minute in a nitrogen atmosphere, whereby a liquid crystal alignment film having a spherulite size of 30 µm was formed by a nonrubbing process.

Next, plastic beads for spacers (Micropearl; produced by Sekisui Fine Chemical Co., Ltd.) were dispersed on the substrate by a predetermined dry dispersion method, and a negative black resist CFPR-BK510S (produced by Tokyo Ohka-sha) was uniformly coated onto the substrate by spin coating and baked.

The substrate was exposed to light with a predetermined intensity through a photomask 14e in FIG. 39 and developed, whereby first-stage insulating resist walls were patterned being fixed by the beads on signal lines outside pixels.

The negative photoresist OMR83 in Example 19 was coated onto the resultant substrate, exposed to light through a photomask 14f in FIG. 41 whose line width was larger by 20 µm (i.e., larger by 10 µm in the right and left direction) than that of a photomask 14e in FIG. 39, whereby the beads deposited on the interfaces between the first-stage resist walls and the pixels were completely shielded.

Next, a liquid crystal alignment film having a spherulite size of 10 µm was formed on the other substrate by a non-rubbing process, and both of the substrates were attached to each other to construct a liquid crystal cell.

A liquid crystal composition ZLI-4801-001 (produced by Merck & Co., Inc.; containing 0.3% by weight of S-811) was injected into the liquid crystal cell by a vacuum injection method.

Through observation of the liquid crystal cell thus constructed under crossed-Nicols so as to obtain electro-optic characteristics thereof, it was shown that a large viewing angle liquid crystal panel was obtained in which display characteristics were not degraded because of the absence of spacers in pixels and black and white inversion did not occur even when the cell was seen at ±40°.

Example 29

A pair of glass substrates (thickness: 1.1 mm) with a transparent electrode made of ITO (thickness: 50 nm) formed thereon were used. A negative photoresist with 5% by weight of plastic beads (Micropearl; produced by Sekisui Fine-Chemical Co., Ltd.) having an average particle size of 4.5 µm mixed therein was uniformly coated onto one of the substrates by spin coating. Then, the substrate was pre-baked in accordance with the condition of the photoresist. The substrate was exposed to light with a predetermined intensity through a photomask 14f shown in FIG. 41, developed, rinsed, and post-baked, whereby resist walls were formed. The surface free energy of the photoresist after curing is shown in Table 6.

TABLE 6

Surface free energy of photoresist after curing

| Sample | $\gamma_s$ (mN/m) | $\gamma_s^d$ (mN/m) | $\gamma_s^p$ (mN/m) | $\gamma_s^h$ (mN/m) | Polar component (mN/m) |
|---|---|---|---|---|---|
| A | 68.5 | 26.6 | 32.6 | 9.3 | 41.9 |
| B | 50.4 | 26.3 | 18.6 | 5.5 | 24.1 |
| C | 38.4 | 31.9 | 4.3 | 2.2 | 6.5 |
| D | 35.9 | 18.7 | 14.0 | 3.2 | 17.2 |

The polar component of surface free energy in Table 6 refers to the sum of a hydrogen bond component ($\gamma_s^h$) and a dipole component ($\gamma_s^p$) of surface free energy. The total sum of the polar component and a dispersion force component ($\gamma_s^d$) of surface free energy becomes surface free energy ($\gamma_s$) of a solid.

As is understood from Table 6, the dispersion of the plastic beads in the resist walls was as follows: In Sample A, the plastic beads in the resist walls partially aggregated, and in Samples B to D, the plastic beads in the resist walls did not aggregate at all. Thus, the dispersion of the plastic beads in the resist walls in this example were satisfactory.

A sealant (Structbond XN-21S) with 2% by weight of glass fibers (4.5 µm) mixed therein was patterned on other substrates by printing.

Thereafter, the substrates with the sealant were respectively attached to substrates provided with Samples A to D to construct Cells A to D. The thickness of Cells A to D was measured at 10 points thereof and an average and a standard deviation of the measurement were obtained. The results are shown in Table 7.

TABLE 7

Average and standard deviation of cell thickness

| Cell | Average all thickness (µm) | Standard deviation σ | Inconsistencies in color upon injection of liquid crystal composition |
|---|---|---|---|
| A | 4.58 | 0.023 | Almost none |
| B | 4.53 | 0.003 | None |
| C | 4.55 | 0.009 | None |
| D | 4.56 | 0.007 | None |

A liquid crystal composition ZLI-4792 (produced by Merck & Co., Inc.; containing 0.33% by weight of S-811) was injected into the liquid crystal cell by a vacuum injection method. The inconsistencies in color of the resultant cell were observed. The results are shown in Table 7.

A mixture was injected into another cell produced in the same way as the above by a vacuum injection method. The mixture contained 0.15 g of β-(perfluorooctyl)ethyl acrylate, 0.25 g of lauryl acrylate, 0.1 g of R-684 (produced by Nippon Kayaku Co., Ltd.), and 0.2 g of p-phenyl styrene as a polymerizable material; 4.25 g of ZLI-4792 (produced by Merck & Co., Inc.; containing 0.33% by weight of S-811) as a liquid crystal material; and 0.025 g of a polymerization initiator (Irgacure 651).

While the cell was kept at a temperature allowing the mixture to be homogeneous (i.e., 110° C.) and a voltage having a frequency of 60 Hz and an effective voltage of 2.5 volts was applied across transparent electrodes, the cell was exposed to UV-rays with a high-pressure mercury lamp at 10 mW/cm$^2$ for 10 minutes from the substrate with a sealant formed thereon. Then, the cell was gradually cooled to 25° C. over 6 hours under the application of a voltage, and exposed to UV-rays for 10 minutes, whereby the polymerizable material was completely cured.

Observation with a polarizing microscope of the cell under this condition revealed that the orientation of liquid crystal molecules was disturbed by spacers present at the edge of the resist walls, liquid crystal regions surrounded by polymer regions were in a monodomain state and aligned relatively axis-symmetrically, as shown in FIG. 43. Furthermore, the cell was rotated under the condition that a polarizer and an analyzer of the microscope were fixed in a crossed-Nicols state. In the cell, it seemed that extinction patterns of the liquid crystal regions where the liquid crystal molecules were axis-symmetrically aligned seemed to be almost regularly positioned and only polymer walls surrounding the patterns seemed to be rotated. When a voltage was applied to the cell, disclination lines were not formed in regions other than those where the spacers disturbed the orientation and relatively uniform axis-symmetrical orientation was observed almost without any inversion phenomenon in gray scales.

Example 30

A cell was produced by using the same resist as that used in Example 29, and a mixture containing a liquid crystal material and a polymerizable material was injected into the cell by a vacuum injection method. The resultant cell was placed in an oven, where the cell was decreased in temperature in 5 cycles at ±1° C./minute from 100° C. at which the mixture was in an isotropic phase to 52° C. at which the mixture was shifted to a liquid crystal phase.

The cell was kept at 50° C. and the mixture was thermally phase-separated into a liquid crystal material and a polymerizable material. While a voltage having a frequency of 60 Hz and an effective voltage of 2.5 volts was applied across transparent electrodes at this temperature, the cell was exposed to UV-rays with a high-pressure mercury lamp at 10 mW/cm$^2$ for 5 minutes, whereby the polymerizable material was cured. In this case, even under the application of a voltage, disclination lines were not formed in regions other than those where the spacers disturbed the orientation of the liquid crystal molecules, inversion phenomenon hardly occurred in gray scales, and the liquid crystal molecules were axis-symmetrically aligned in a relatively uniform manner.

Comparative Example 6

A pair of glass substrates (thickness: 1.1 mm) with a transparent electrode made of ITO (thickness: 50 nm) formed thereon were used in the same way as in Example 29. A negative photoresist with 5% by weight of plastic beads (Micropearl; produced by Sekisui Fine Chemical Co., Ltd.) having an average particle size of 4.5 μm was uniformly coated onto one of the substrates by spin coating. Then, the substrate was pre-baked in accordance with the condition of the photoresist. The substrate was exposed to light with a predetermined intensity through a photomask 14f shown in FIG. 41, developed, rinsed, and post-baked, whereby resist walls were formed. The surface free energy of the photoresist after curing is shown in Table 8.

TABLE 8

Surface free energy of photoresist after curing

| Sample | $\gamma_s$ (mN/m) | $\gamma_s^d$ (mN/m) | $\gamma_s^p$ (mN/m) | $\gamma_s^h$ (mN/m) | Polar component (mN/m) |
|---|---|---|---|---|---|
| E | 72.5 | 37.3 | 21.8 | 13.4 | 35.2 |
| F | 40.6 | 37.2 | 3.1 | 0.4 | 3.5 |

The polar component of surface free energy in Table 8 refers to the sum of a hydrogen bond component ($\gamma_s^h$) and a dipole component ($\gamma_s^p$) of surface free energy. The total sum of the polar component and a dispersion force component ($\gamma_s^d$) of surface free energy becomes surface free energy ($\gamma_s$) of a solid.

As is understood from Table 8, the dispersion of the plastic beads in the resist walls was as follows: In Sample E, the plastic beads in the resist walls aggregated in several portions, and in Sample F, 3 to 10 plastic beads aggregated in relatively many portions.

A sealant (Structbond XN-21S) with 2% by weight of glass fibers (4.5 μm) mixed therein was patterned on other substrates by printing.

Thereafter, the substrates with the sealant were attached to substrates provided with Samples E and F to construct Cells E and F. The thickness of Cells E and F was measured at 10 points thereof and an average and a standard deviation of the measurement were obtained. The results are shown in Table 9.

TABLE 9

Average and standard deviation of cell thickness

| Cell | Average all thickness (μm) | Standard deviation σ | Inconsistencies in color upon injection of liquid crystal composition |
|---|---|---|---|
| E | 4.59 | 0.064 | Recognized |
| F | 4.52 | 0.125 | Clearly recognized |

A liquid crystal composition ZLI-4792 (produced by Merck & Co., Inc.; containing 0.33% by weight of S-811) was injected into the liquid crystal cells by a vacuum injection method. The inconsistencies in color of the resultant cells were observed. The results are shown in Table 9.

In this example, a liquid crystal composition ZLI-4792 (produced by Merck & Co., Inc.; containing 0.33% by weight of S-811) was injected into the liquid crystal cells by a vacuum injection method in the same way as in Example 29. However, Schlieren patterns were shifted from the center of each pixel because of the inconsistencies in cell thickness and spacers present at the edge of the resist walls caused disclination lines to be formed upon the application of a voltage.

Comparative Example 7

A mixture containing a liquid crystal material and a polymerizable material, similar to that of Example 29 was injected into a cell produced in the same way as in Comparative Example 6 by a vacuum injection method. The cell was gradually cooled under the application of a voltage by the same method and exposed to UV-rays, whereby a liquid crystal device was produced.

In the device thus obtained, the orientation of liquid crystal regions in pixels was disturbed and Schilieren patterns were shifted from the center of each pixel even in regions where the liquid crystal molecules were axis-symmetrically aligned.

Comparative Example 8

A mixture containing a liquid crystal material and a polymerizable material, similar to that in Example 29 was injected into a cell produced in the same way as in Comparative Example 6 by a vacuum injection method. The cell was exposed to W-rays while temperature and a voltage were being controlled by the method of Example 30. The same results as those in Comparative Example 7 were obtained. That is, the orientation of the liquid crystal regions was disturbed, Schilieren patterns were shifted from the center of each pixel even in regions where the liquid crystal molecules were axis-symmetrically aligned, and inversion phenomenon occurred in gray scales.

Example 31

A pair of glass substrates (thickness: 1.1 mm) with a transparent electrode made of ITO (thickness: 50 nm) formed thereon were used. Four kinds of negative photoresists in Example 26 with 5% by weight of plastic beads (Micropearl; produced by Sekisui Fine Chemical Co., Ltd.) having an average particle size of 4.3 µm were uniformly coated onto one of the substrates by spin coating, respectively. Then, the substrates were pre-baked in accordance with the condition of the photoresists. The substrates were exposed to light with a predetermined intensity through a photomask 14e shown in FIG. 39, developed, rinsed, and post-baked, whereby first-stage resist walls were formed. The dispersion of the plastic beads in the first-stage resist walls was as follows: In Sample A, the plastic beads partially aggregated, and in Samples B to D, the plastic beads did not aggregate at all. Thus, the dispersion of the plastic beads in this example was satisfactory.

A negative photoresist OMR83 (produced by Tokyo Ohka-sha) was coated onto the substrate, pre-baked, exposed to light with a predetermined intensity through a photomask 14f shown in FIG. 41 whose line width was larger by 20 µm (i.e., larger by 10 µm in the right and left direction) than that of a photomask 14e in FIG. 39, developed, rinsed, and post-baked, whereby second-stage resist walls were formed.

A sealant (Structbond XN-21S) with 5% by weight of glass fibers (4.7 µm) mixed therein was patterned on other substrates by printing.

Thereafter, the substrates with the sealant were attached to substrates provided with Samples A to D to construct Cells A1 to D1. The thickness of Cells A1 to D1 was measured at 10 points thereof and an average and a standard deviation of the measurement were obtained. The results are shown in Table 10.

TABLE 10

| | Average and standard deviation of cell thickness | | |
|---|---|---|---|
| Cell | Average all thickness (µm) | Standard deviation σ | Inconsistencies in color upon injection of liquid crystal composition |
| A1 | 4.67 | 0.014 | None |
| B1 | 4.55 | 0.003 | None |

TABLE 10-continued

| | Average and standard deviation of cell thickness | | |
|---|---|---|---|
| Cell | Average all thickness (µm) | Standard deviation σ | Inconsistencies in color upon injection of liquid crystal composition |
| C1 | 4.59 | 0.009 | None |
| D1 | 4.56 | 0.007 | None |

A mixture was injected into the respective Cells A1 to D1 thus produced by a vacuum injection method. The mixture contained 0.15 g of β-(perfluorooctyl)ethyl acrylate, 0.25 g of lauryl acrylate, 0.1 g of R-684 (produced by Nippon Kayaku Co., Ltd.), and 0.2 g of p-phenyl styrene as a polymerizable material; 4.25 g of ZLI-4792 (produced by Merck & Co., Inc.; containing 0.33% by weight of S-811) as a liquid crystal material; and 0.025 g of a polymerization initiator (Irgacure 651). The results obtained by observing the color inconsistencies of the cells with the mixture injected therein are shown in Table 10.

While the Cells A1 to D1 were kept at a temperature allowing the mixture to be homogeneous (i.e., 110° C.) and a voltage with 60 Hz having an effective voltage of 2.5 volts was applied across transparent electrodes, the Cells A1 to D1 were respectively exposed to UV-rays with a high-pressure mercury lamp at 10 mW/cm$^2$ for 10 minutes from the substrate with a sealant formed thereon. Then, Cells A1 to D1 were gradually cooled to 25° C. over 6 hours under the application of a voltage, and exposed to UV-rays for 10 minutes, whereby the polymerizable materials were completely cured.

Observation with a polarizing microscope of Cells A1 to D1 under this condition revealed that liquid crystal regions surrounded by polymer regions were in a mono-domain state and the liquid crystal molecules were completely axis-symmetrically aligned in the same way as in Example 14, as shown in FIG. 27. Furthermore, under the condition that a polarizer and an analyzer of the microscope were fixed in a crossed-Nicols state, Cells A1 to D1 were rotated. In Cells A1 to D1 under this condition, it seemed that extinction patterns of the liquid crystal regions were regularly positioned and only polymer walls surrounding the patterns were rotated. When a voltage was applied to Cells A1 to D1, disclination lines were not formed, inversion phenomenon did not occur in gray scales, and the liquid crystal molecules were uniformly axis-symmetrically aligned.

Example 32

A mixture containing a liquid crystal material and a polymerizable material was injected into Cells A1 to D1 in the same way as in Example 30 by a vacuum injection method. Cells A1 to D1 with the mixture injected therein were placed in an oven, where Cells A1 to D1 were decreased in temperature in 5 cycles at ±1° C./minute from 100° C. at which the mixture was in an isotropic phase to 52° C. at which the mixture was shifted to a liquid crystal phase.

The cells were kept at 50° C. and the mixtures were thermally phase-separated into a liquid crystal material and a polymerizable material. While a voltage having a frequency of 60 Hz and an effective voltage of 2.5 volts was applied across transparent electrodes at this temperature, the cells were exposed to UV-rays with a high-pressure mercury lamp at 10 mW/cm$^2$ for 5 minutes, whereby the polymerizable materials were cured.

In this case, in the same way as in Example 31, liquid crystal regions surrounded by polymer walls were in a mono-domain state, and liquid crystal molecules were completely axis-symmetrically aligned. Furthermore, even when Cells A1 to D1 were rotated, the center position of each Schilieren pattern was not shifted. Disclination lines were not formed and inversion phenomenon did not occur in gray scales under the application of a voltage.

Comparative Example 9

First-stage resist walls were formed by using resist materials E and F shown in Table 8 by the same method as that of Example 32.

Second-stage resist walls were formed by using OMR83 (produced by Tokyo Ohka-sha) in the same way as in Example 32. The same material as that of Example 32 was injected into respective cells under the same condition as that of Example 32. The cells were exposed to UV-rays under the conditions of Example 31 (i.e., exposure is conducted after phase separation) and Example 32 (i.e., phase separation is effected after exposure), respectively, whereby the polymerizable materials were cured.

In this case, several plastic beads aggregated in the first-stage resist walls, and the thickness of the respective cells was not uniform in the vicinity of regions where plastic beads aggregated. Furthermore, the central axis of each Schilieren pattern was shifted in both of the cells.

Example 33

Thermal polymerizable resins having a surface free energy as shown in Table 11 after baked, with plastic beads (Micropearl; produced by Sekisui Fine Chemical Co., Ltd.) having an average particle size of 4.5 μm mixed therein were respectively coated onto the same substrate as that of Example 29 by spin coating.

TABLE 11

| | Surface free energy of photoresist after curing | | | | |
|---|---|---|---|---|---|
| Sample | $\gamma_s$ (mN/m) | $\gamma_s^d$ (mN/m) | $\gamma_s^p$ (mN/m) | $\gamma_s^h$ (mN/m) | Polar component (mN/m) |
| G | 67.4 | 36.6 | 20.8 | 10.0 | 30.0 |
| H | 54.4 | 33.5 | 17.7 | 3.2 | 20.9 |
| I | 43.3 | 32.1 | 5.6 | 6.1 | 11.7 |
| J | 41.6 | 19.1 | 15.7 | 6.8 | 22.5 |

The resultant substrates were baked at a predetermined temperature for a predetermined period of time, and then, a positive resist OFPR 800 (produced by Tokyo Ohka-sha) was coated onto each substrate. The substrates were further baked, exposed to light with a predetermined intensity through a photomask 14f shown in FIG. 41, developed, rinsed, and post-baked, whereby the thermal polymerizable resins were etched.

The resists OFPR 800 were peeled off. Insulating walls including spacers were formed. The dispersion of the spacers was remarkably good in all of the samples.

A sealant (Structbond XN-21S) with 2% by weight of glass fibers (4.5 μm) was patterned onto other substrates by printing. These substrates were respectively attached to the samples obtained in the above to construct cells G to J.

The thickness of the cells was measured at 10 points thereof and an average and a standard deviation of the measurement were obtained. The results are shown in Table 12.

TABLE 12

| | Average and standard deviation of cell thickness | | |
|---|---|---|---|
| Cell | Average all thickness (μm) | Standard deviation σ | Inconsistencies in color upon injection of liquid crystal composition |
| G | 4.48 | 0.005 | None |
| H | 4.53 | 0.003 | None |
| I | 4.57 | 0.009 | None |
| J | 4.51 | 0.007 | None |

A liquid crystal composition ZLI-4792 (produced by Merck & Co., Inc.; containing 0.33% by weight of S-811) was injected into the liquid crystal cells by a vacuum injection method. The inconsistencies in color of the resultant cells were observed. The results are shown in Table 12. As is understood from Table 12, inconsistencies in color were not found in any cells G to J.

A mixture was injected into other cells produced in the same way as the above by a vacuum injection method. The mixture contained 0.15 g of β-(perfluorooctyl)ethyl acrylate, 0.25 g of lauryl acrylate, 0.1 g of R-684 (produced by Nippon Kayaku Co., Ltd.), and 0.2 g of p-phenyl styrene as a polymerizable material; 4.25 g of ZLI-4792 (produced by Merck & Co., Inc.; containing 0.33% by weight of S-811) as a liquid crystal material; and 0.025 g of a polymerization initiator (Irgacure 651).

Thereafter, the following two kinds of cells were obtained.

While one of the cells obtained above was kept at a temperature allowing the mixture to be homogeneous (i.e., 110° C.) and a voltage having a frequency of 60 Hz and an effective voltage of 2.5 volts was applied across transparent electrodes, the cell was exposed to UV-rays with a high-pressure mercury lamp at 10 mW/cm² for 10 minutes from the substrate with a sealant formed thereon. Then, the cell was gradually cooled to 25° C. over 6 hours under the application of a voltage, and exposed to UV-rays for 10 minutes, whereby the polymerizable material was completely cured. Thus, a first cell was obtained.

Separately, the other cell obtained above was placed in an oven, where the cell temperature was decreased in 5 cycles of ±1° C./minute from 100° C. at which the mixture was in an isotropic phase, to 52° C. at which the mixture was shifted to a liquid crystal phase. The cell was kept at 50° C. and the mixture was thermally phase-separated into a liquid crystal material and a polymerizable material. While a voltage having a frequency of 60 Hz and an effective voltage of 2.5 volts was applied across transparent electrodes at this temperature, the cell was exposed to UV-rays with a high-pressure mercury lamp at 10 mW/cm² for 5 minutes, whereby the polymerizable material was cured. Thus, a second cell was obtained.

Observation with a polarizing microscope of both of the first and second cells revealed that liquid crystal regions surrounded by polymer regions were in a mono-domain state and liquid crystal molecules were relatively axis-symmetrically aligned although the orientation of the liquid crystal molecules was recognized to be disturbed by spacers present at the edge of the insulating walls, as shown in FIG. 27 in the same way as in Example 14. Furthermore, under the condition that a polarizer and an analyzer of the microscope were fixed in a crossed-Nicols state, and these cells were rotated. In these cells under this condition, it seemed that extinction patterns of liquid crystal regions were almost regularly positioned and only polymer walls surrounding the liquid crystal regions were rotated. Under the application of a voltage, disclination lines were not formed in regions other than those where the spacers disturbed the orientation and relatively uniform axis-symmetrical orientation was observed without any inversion phenomenon in gray scales.

Example 34

Thermal polymerizable resins (Sample G to J) similar to those of Example 33 with 5% by weight of plastic beads (Micropearl; produced by Sekisui Fine Chemical Co., Ltd.) having an average particle size of 4.3 μm mixed therein were coated onto substrates in the same way as in Example 33. The substrates were baked at a predetermined temperature for a predetermined period of time. Then, a positive photoresist OFPR 800 (produced by Tokyo Ohka-sha) was coated onto each substrate and pre-baked. The substrates thus obtained were exposed to light with a predetermined intensity through a photomask 14e shown in FIG. 39, developed, rinsed, and post-baked, whereby the thermal polymerizable resins were etched. The photoresists were peeled off and first-stage walls made of an insulator including spacers were formed. The dispersion of the spacers was remarkably good in any samples.

A negative photoresist OMR83 (produced by Tokyo Ohka-sha) was coated onto the respective substrates obtained in the above, the substrates were pre-baked in a predetermined manner, exposed to light with a predetermined intensity through a photomask 14f shown in FIG. 41 whose line width was larger by 20 μm (i.e., larger by 10 μm in the right and left direction) than that of a photomask 14e in FIG. 39, developed, rinsed, and post-baked, whereby second-stage resist walls were formed.

A sealant (Structbond XN-21S) with 5% by weight of glass fibers (4.5 μm) was patterned onto other substrates by printing. These substrates were respectively attached to the samples obtained in the above to construct cells G1 to J1.

The thickness of the cells were measured at 10 points thereof and an average and a standard deviation of the measurement were obtained. The results are shown in Table 13.

TABLE 13

| | Average and standard deviation of cell thickness | | |
|---|---|---|---|
| Cell | Average all thickness (μm) | Standard deviation σ | Inconsistencies in color upon injection of liquid crystal composition |
| G1 | 4.53 | 0.013 | None |
| H1 | 4.57 | 0.011 | None |
| I1 | 4.59 | 0.008 | None |
| J1 | 4.61 | 0.008 | None |

A mixture containing a liquid crystal material and a polymerizable material similar to that of Example 33 was injected into other cells produced in the same way as the above by a vacuum injection method. The respective polymerizable material were cured under the same conditions for obtaining the first and second cells in Example 33.

Observation with a polarizing microscope of both of the first and second cells revealed that liquid crystal regions surrounded by polymer regions were in a mono-domain state and liquid crystal molecules were axis-symmetrically aligned. Furthermore, under the condition that a polarizer and an analyzer of the microscope were fixed in a crossed-Nicols state, and these cells were rotated. In these cells under this condition, it seemed that extinction patterns of liquid crystal regions were regularly positioned. Under the application of a voltage, disclination lines were not formed and uniform axis-symmetrical orientation was observed without any inversion phenomenon in gray scales.

Comparative Example 10

Using insulating films shown in Table 14, substrates having first-stage insulating walls and second-stage resist walls were produced. In Samples K and L, dispersion of plastic beads was not satisfactory and 3 to 7 plastic beads aggregated in a relatively number of portions.

TABLE 14

| | Surface free energy of insulating film | | | | |
|---|---|---|---|---|---|
| Sample | $\gamma_s$ (mN/m) | $\gamma_s^d$ (mN/m) | $\gamma_s^p$ (mN/m) | $\gamma_s^h$ (mN/m) | Polar component (mN/m) |
| K | 75.2 | 42.3 | 25.1 | 7.8 | 32.9 |
| L | 45.6 | 41.7 | 3.0 | 0.9 | 3.9 |

Other substrates were obtained in the same way as in Example 34. Then, the substrates provided with Samples K and L were attached to these substrates obtained in the same way as in Example 34, respectively, to produce Cells K and L.

The thickness of Cells K and L was measured at 10 points thereof, and an average and a standard deviation were obtained. The results are shown in Table 15.

TABLE 15

| | Average and standard deviation of cell thickness | | |
|---|---|---|---|
| Cell | Average all thickness (μm) | Standard deviation σ | Inconsistencies in color upon injection of liquid crystal composition |
| K | 4.45 | 0.083 | Recognized |
| L | 4.52 | 0.069 | Recognized |

A mixture containing a liquid crystal material and a polymerizable material, similar to that of Example 33 was injected into Cells K and L by a vacuum injection method, and the respective polymerizable materials were cured under the same conditions as those for obtaining the first and second cells in Example 33.

In Cells K and L, liquid crystal regions were surrounded by polymer regions, and liquid crystal molecules in the liquid crystal regions were axis-symmetrically aligned in a mono-domain state; however, when Cells K and L were observed while being rotated, Schlieren patterns were shifted from the center of liquid crystal regions. Furthermore, under the application of a voltage, disclination lines were not formed and inversion phenomenon was slightly observed in gray scales depending upon the viewing direction.

As described above, by stipulating the surface free energy of the insulator including spacers, the dispersion of the spacers becomes satisfactory, and as a result, a satisfactory cell gap can be obtained. Because of this, spacers are not required to be dispersed on a substrate by a wet or dry method, so that the production steps can be made cleaner and simplified.

Example 35

A method for producing a liquid crystal device including two substrates, one of which has pixel electrodes in a matrix and which are positioned so as to oppose to each other, will be described, with reference to FIGS. 49A through 49F.

Figure 49A:
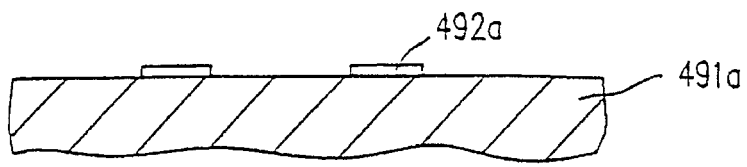
FIGS. 49A through 49F are views illustrating the steps of a method for producing a liquid crystal device including a pair of substrates opposing each other and one of the substrates having pixel electrodes formed thereon in a matrix according to the present invention.
Figure 49B:
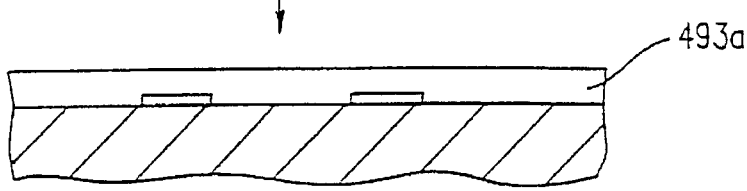

As shown in FIG. 49A, a resist 493a is coated onto a substrate 491a with required members such as pixel electrodes 492a formed thereon, so as to cover the pixel electrodes 492a as shown in FIG. 49B, thereby forming an insulating layer.

Figure 49C:
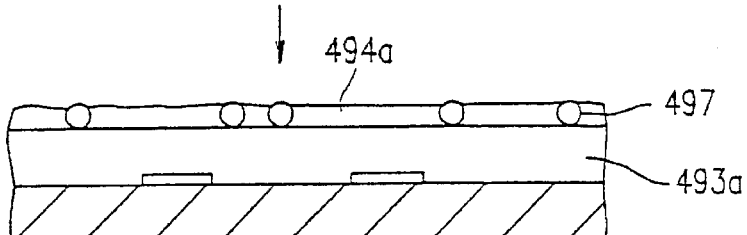

Then, as shown in FIG. 49C, spacers 497 are dispersed on the insulating layer 493a, and another resist 494a is coated thereon. Alternatively, in place of dispersing spacers and coating a resist, a resist including spacers can be coated on the insulating layer 493a. As the spacers 497, those having a spherical shape, a cylindrical shape, or a prism shape can be used.

Figure 49D:
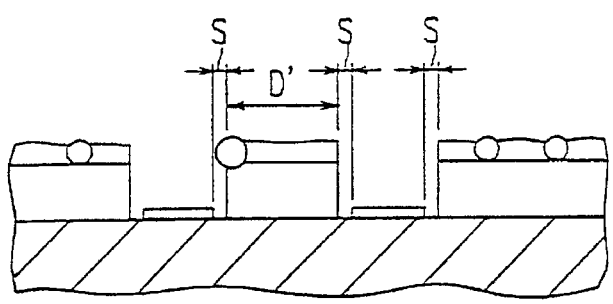

As shown in FIG. 49D, patterning is conducted so as to remove the resists 493a and 494a over the pixel electrodes 492a and in the vicinity thereof. In this patterning, the remaining resists 493a and 494a have a grid pattern so as to surround pixel electrodes 492a provided in a matrix. It is assumed that a pattern width D' satisfies the relationship D'≦D−2S, in the case where a final pattern width is D and a diameter or a length in a long axis direction of the spacers 497a is S. In this relationship, the diameter is used when the spacers are spherical, and the length in the long axis direction is used when the spacers have a cylindrical shape or a prism shape. Because of this patterning, a distance between the pixel electrodes 492a and the side walls at the edge of the resists 493a and 494a becomes S or more, and the spacers 497 are positioned shifted outside from the positions over the pixel electrodes 492a, even when the spacers 497 lie off the side walls at the edge of the resists 493a and 494a.

Figure 49E:
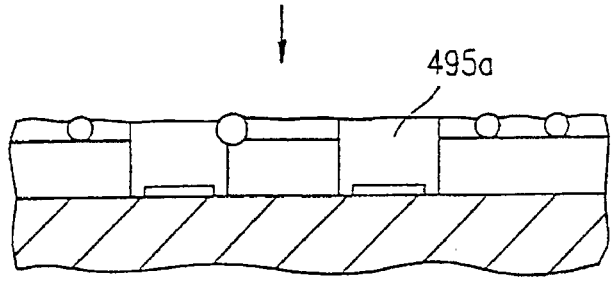

Next, as shown in FIG. 49E, a resist 495a is further coated onto the substrate with the resists 493a and 494a patterned thereon as described above. At this time, a resist 495a is coated mainly in portions where the previous resists 493a and 494a have not been coated. In the case where the upper portion of the spacers 497 is exposed, the resist 495a to be formed this time can be coated thereon.

Figure 49F:
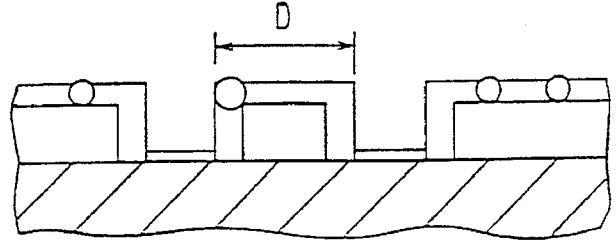

Next, as shown in FIG. 49F, patterning is conducted with a pattern width D. The center of patterning at this time is matched with that of patterning in FIG. 49D. Because of this, as described above, all of the spacers 497 which lie off the side walls at the edge of the resists 493a and 494a are finally covered with the resist 495a. The upper portion of the spacers 497 are kept lying off the resist 495a in order not to cause any problems in the steps conducted later when a mixture containing a liquid crystal material is injected. The dimension of the upper portion of the spacers lying off the resist is preferably set so that the gap between the resist and the substrate with which the resist is in contact is 1.5 μm or more.

By doing so, the spacers are not deposited on the interfaces between the pixels and the resist and the spacers do not remain in the pixels. Furthermore, in the case where liquid crystal molecules are axis-symmetrically aligned, the axis-symmetrical orientation is not disturbed by the spacers; therefore, roughness can be prevented.

Next, the case where liquid crystal molecules in each pixel are axis-symmetrically aligned will be described.

Figure 50A:
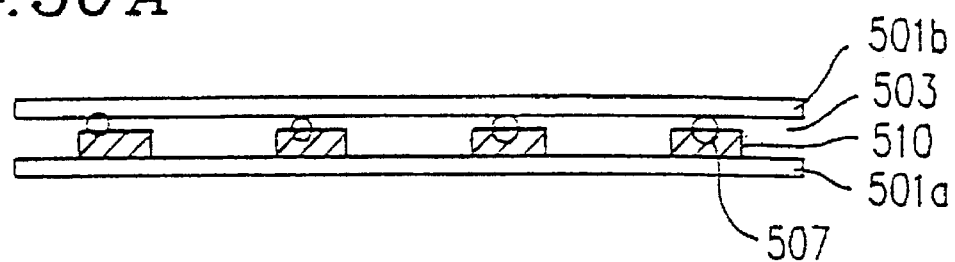
FIGS. 50A through 50B illustrate a method for producing a liquid crystal device in the case where liquid crystal molecules are axis-symmetrically aligned in each axis according to the present invention.
Figure 50B:
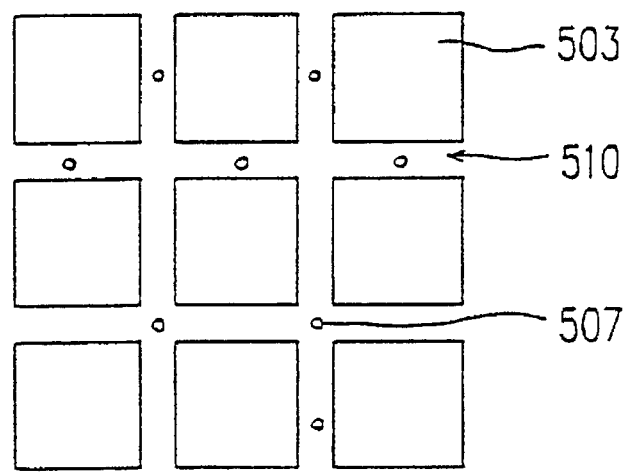

FIGS. 50A and 50B illustrate a method for producing a liquid crystal device in the above case.

As shown in FIGS. 50A and 50B, a cell is produced as described above, which includes a substrate 501a with a resist 510 including spacers 507 or the like formed in a predetermined pattern and a counter substrate 501b, both the substrates being positioned so as to oppose to each other while interposing a liquid crystal layer 503 therebetween.

Then, a mixture at least containing a liquid crystal material and a polymerizable material is injected into the cell.

In accordance with a method similar to that of Example 4, a liquid crystal device is produced by using the irradiation of UV-rays.

In this liquid crystal device, since spacers are not present in pixels, there is no possibility that the axis-symmetrical orientation is disturbed by the spacers. Thus, even in the case where the device is seen at a large angle in gray scales, roughness is not observed.

Example 36

A pair of glass substrates (thickness: 1.1 mm) with a transparent electrode (thickness: 50 nm) made of ITO were used. A negative photoresist OMR83 (produced by Tokyo Ohka-sha, 15 cp) was uniformly coated onto one of the substrates by spin coating at 3000 rpm for 20 seconds.

Then, the substrate was baked at 80° C. for 30 minutes. Then, plastics beads (Micropearl; produced by Sekisui Fine Chemical Co., Ltd.) having an average particle size of 4.5 μm were dispersed at an average 1000/mm². The resultant substrate on the substrate was provided with the negative photoresist OMR83 and baked.

Figure 51:
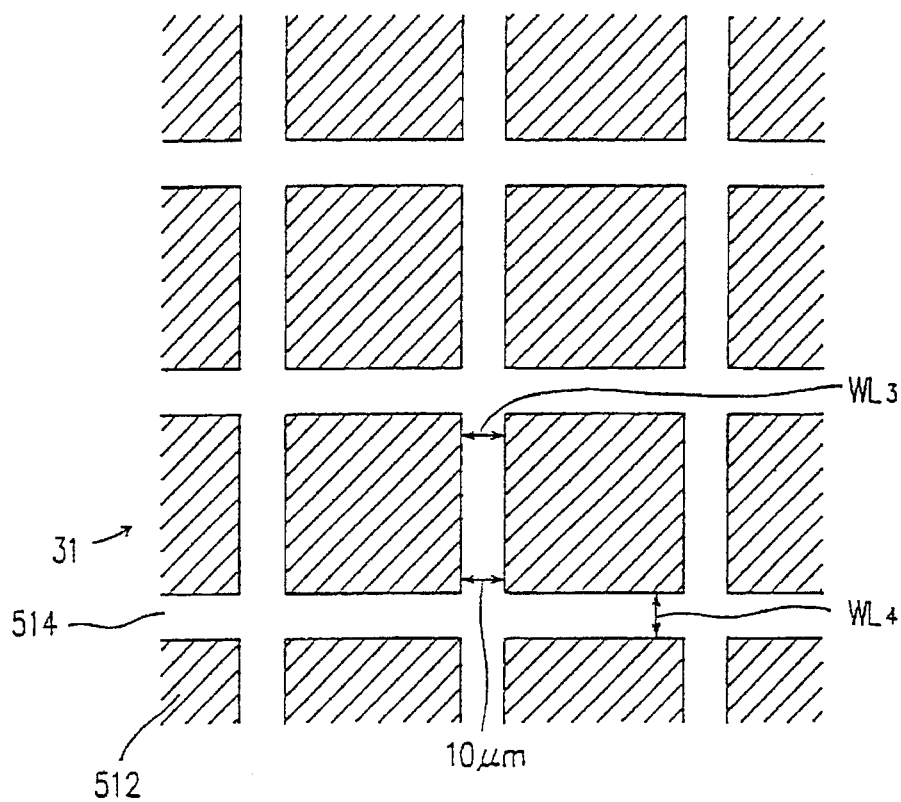
FIG. 51 is a plan view of a photomask 31 used in Examples 36 and 37 according to the present invention and Comparative Example 11.
Figure 52A:
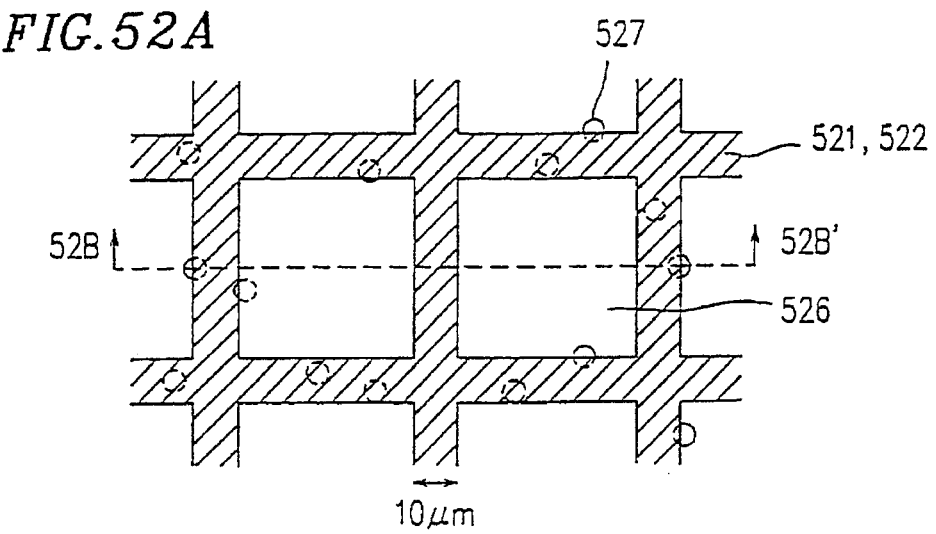
FIG. 52A is a plan view of an insulating film patterned using the photomask 31 shown in FIG. 51.
Figure 52B:
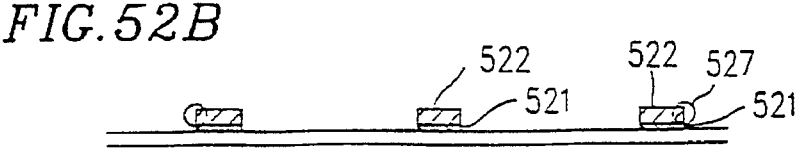
FIG. 52B is a cross-sectional view taken along a line 52B–52B' of FIG. 52A.

Then, the substrate was exposed to light (200 mJ/cm²) through a photomask 31 having light-shielding portions 512 (hatched portions) and light-transmitting portions 514 as shown in FIG. 51, developed, rinsed, and baked again at 120° C. for one hour. Then, insulating layers 521 and 522 (thickness: 0.5 μm; pattern width $WL_3$, $WL_4$: 10 μm) was patterned outside pixels, as shown in FIGS. 52A and 52B. At this time, spacers 527 were observed to be deposited at interfaces between the pixels and the resist. The photomask 31 shown in FIG. 51 has light-shielding portions positioned so as to be 10 μm apart from each other. FIG. 52A is a plan view of a resist pattern and FIG. 52B is a cross-sectional view thereof.

Next, the negative photoresist OMR83 (60 cp) was coated onto the substrate thus obtained by spin coating at 1500 rpm for 20 seconds and baked at 80° C. for 30 minutes. The substrate was exposed to light through a photomask 32 having light-shielding portions 532 and light-transmitting portion 534 (pattern width $WL_5$, $WL_6$: 20 μm) shown in FIG. 53, developed, rinsed, and baked again. Then, an insulating layer (thickness: 2.3 μm; pattern width: 20 μm) as shown in FIGS. 54A and 54B was patterned. The photomask 32 shown in FIG. 53 has light-shielding portions 532 (hatched portions) so as to be 20 μm apart from each other. FIG. 54A is a plan view of a resist pattern and FIG. 54B is a cross-sectional view thereof.

A sealant (Structbond XN-21S, baking temperature: 180° C. for 1.5 hours) was patterned on the other substrate by screening. This substrate can be provided with a sealant prior to prepare the above-mentioned substrate.

Both of the substrates were attached to each other so as to have a cell gap of 5.0 μm to construct a liquid crystal cell. Then, a mixture described later was injected into the cell by a vacuum injection method under a reduced pressure. The mixture contained 0.15 g of β-(perfluorooctyl)ethyl acrylate, 0.26 g of lauryl acrylate, and 0.1 g of R-684 (produced by Nippon Kayaku Co., Ltd.) as a polymerizable material; 0.19 g of p-phenyl styrene as a photopolymerization retarder; 4.25 g of ZLI-4792 (produced by Merck & Co., Inc.; containing 0.3% by weight of S-811) as a liquid crystal material; and 0.025 g of a polymerization initiator (Irgacure 651).

In accordance with a production method similar to that of Example 4, a liquid crystal device was produced using the irradiation of UV-rays.

Figure 55:
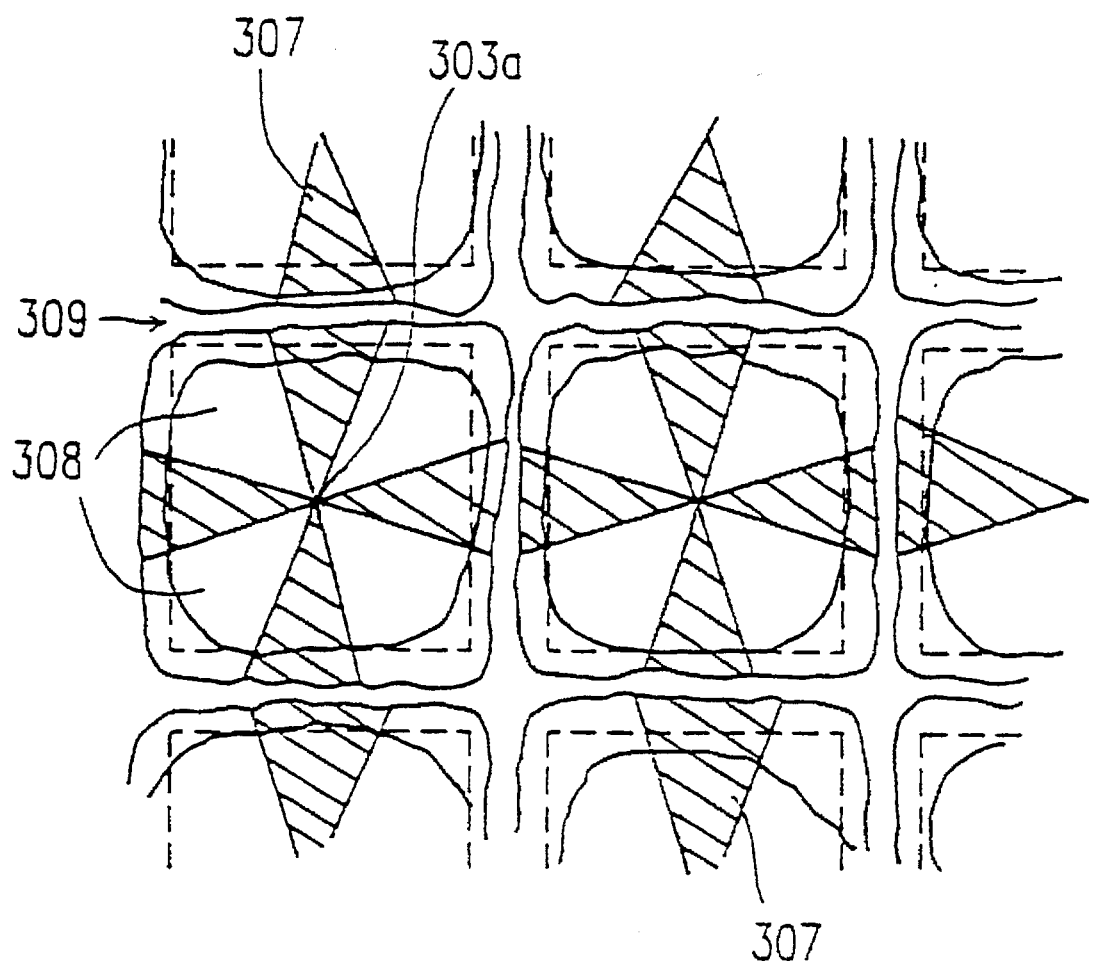
FIG. 55 is a view of liquid crystal devices in Examples 36 and 37 according to the present invention, observed with a polarizing microscope.

FIG. 55 shows results obtained by observing the cell under this condition with a polarizing microscope. As is understood from this figure, liquid crystal regions 308 surrounded by polymer regions 309 were in a mono-domain state with respect to each pixel, and the orientation of liquid crystal molecules in each pixel was not disturbed by spacers. Thus, the liquid crystal molecules were relatively uniformly aligned in an axis-symmetrical manner. Under the condition that a polarizer and an analyzer of the microscope was fixed in a crossed-Nicols state, the cell was rotated. It seemed that extinction patterns 307 of the liquid crystal regions 308 were regularly positioned, and only the polymer regions 309 surrounding the extinction patters 307 were rotated. The reference numeral 303 in FIG. 55 denotes the center of an axis of the liquid crystal regions 308 axis-symmetrically aligned.

It was understood from the above that uniform axis-symmetrical orientation was obtained in almost all of the liquid crystal regions.

Then, two polarizing plates were attached to the cell so that polarizing axes were orthogonal to each other to produce a liquid crystal device.

The device thus produced was observed with a polarizing microscope while a voltage was being applied thereto, indicating that disclination lines were not formed, and the cell was entirely black.

Table 16 shows the electro-optic characteristics and the evaluation of roughness of the liquid crystal device thus produced. The electro-optic characteristics were measured, assuming that two polarizing plates positioned so that polarizing axes are in parallel with each other allow light to transmit therethrough by 100%.

whereby a pattern was formed on the substrate in the same way as in Example 36. Observation with a polarizing microscope of the periphery of each pixel revealed that spacers deposited at interfaces between the resist and the pixels were covered with the resist, and the spacers remained in some pixels.

This substrate was attached to the other substrate to construct a liquid crystal cell with a cell gap of 5.0 μm.

A mixture containing a liquid crystal material and a polymerizable material, similar to that of Example 36 was injected into the cell by a vacuum injection method under a reduced pressure.

Figure 56:
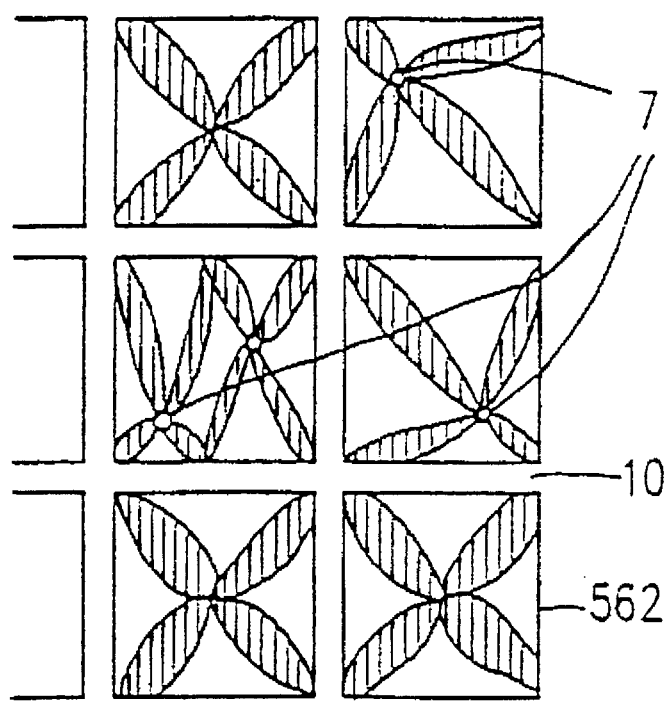
FIG. 56 is a view of a liquid crystal device in Comparative Example 11, observed with a polarizing microscope.

Then, a liquid crystal cell was produced in the same way as in Example 36, and the cell was observed with a polarizing microscope. As a result, as shown in FIG. 56, a number of pixels 562 whose axis-symmetrical orientation was disturbed by the spacers were observed.

Then, two polarizing plates were attached to the cell so that polarizing axes were orthogonal to each other to produce a liquid crystal device. Observation of the device at an angle in gray scales while a voltage was being applied to the device revealed the existence of roughness. The electro-optic characteristics of this device are shown in Table 16.

Comparative Example 12

A liquid crystal device of Comparative Example 12 was produced as follows.

First, OMR83 (15 cp) was uniformly coated onto a glass substrate with a transparent electrode similar to that of Example 36 by spin coating, and the substrate was baked at 80° C. for 30 minutes.

Then, plastic beads having a particle size of 4.0 pm were dispersed on the substrate at average 1000/mm$^2$. OMR83 (15 cp) was coated thereon by spin coating.

TABLE 16

| | Display characteristics of liquid crystal device | | | |
|---|---|---|---|---|
| | Example 36 | Comparative example 11 | Comparative example 12 | Example 37 |
| Light transmittance under application of voltage (%) | 72 | 68 | 66 | 75 |
| Light transmittance under application of voltage of 10 volts (%) | 0.5 | 0.9 | 0.7 | 0.4 |
| Saturated voltage V$_{90}$ (V) | 5.2 | 5.5 | 5.6 | 5.2 |
| Roughness | ○ | X | X | ○ |

Comparative Example 11

A liquid crystal device of Comparative Example 11 was produced as follows.

Plastic beads having a particle size of 4.5 μm were dispersed on a substrate similar to that of Example 36 at 1000/mm$^2$. Then, a negative photoresist OMR83 (15 cp) was coated onto the substrate at 80° C. for 30 minutes by spin coating.

Then, the substrate was exposed to light through a photomask 31 shown in FIG. 51, developed, rinsed, and baked again in the same way as in Example 36, whereby an insulating layer (thickness: 0.3 μm) was formed on the substrate.

Then, the negative photoresist OMR83 (60 cp) was coated onto the substrate by spin coating and baked at 80° C. for 30 minutes.

Figure 53:
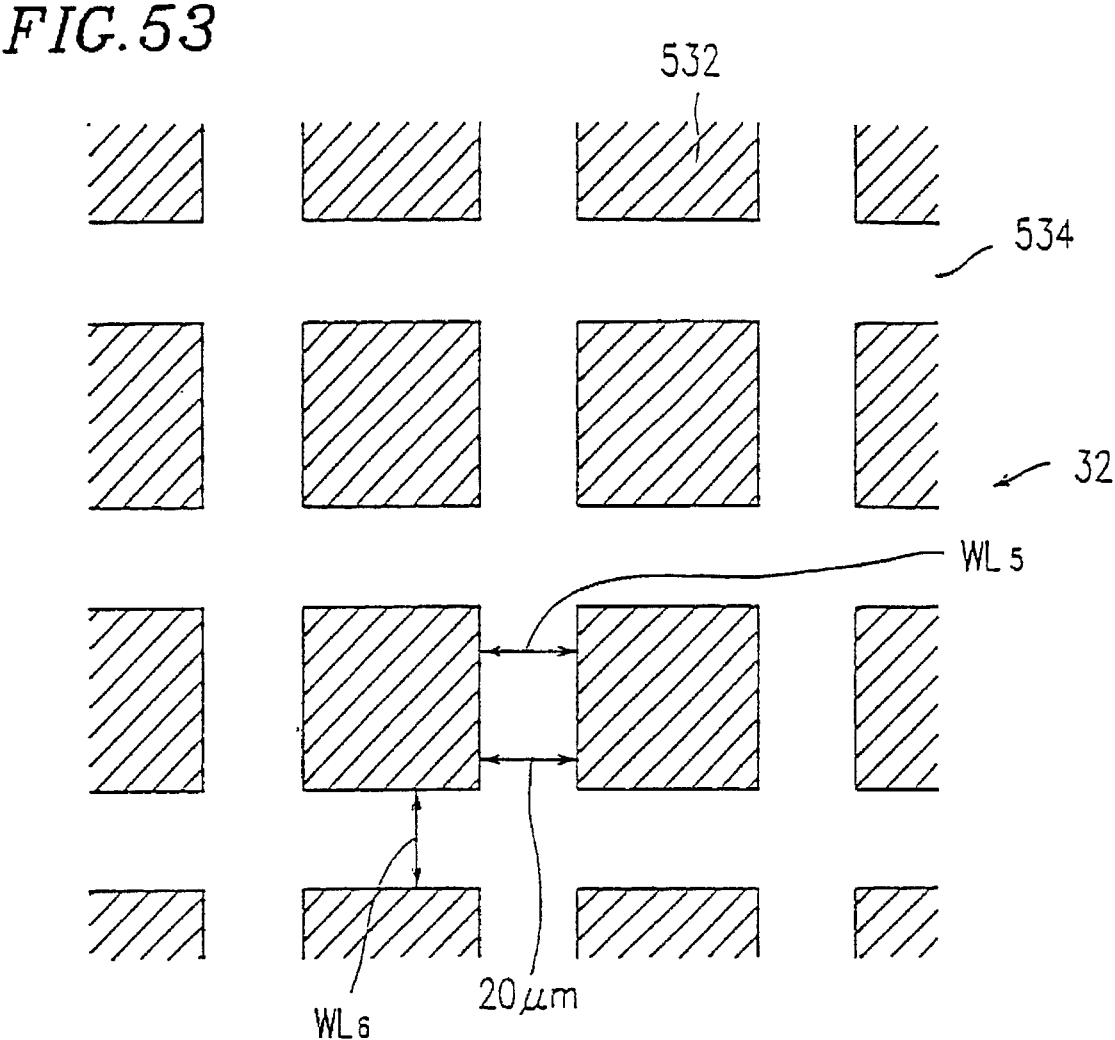
FIG. 53 is a plan view of a photomask used in Examples 36 and 37 according to the present invention and Comparative Example 12.
Figure 54A:
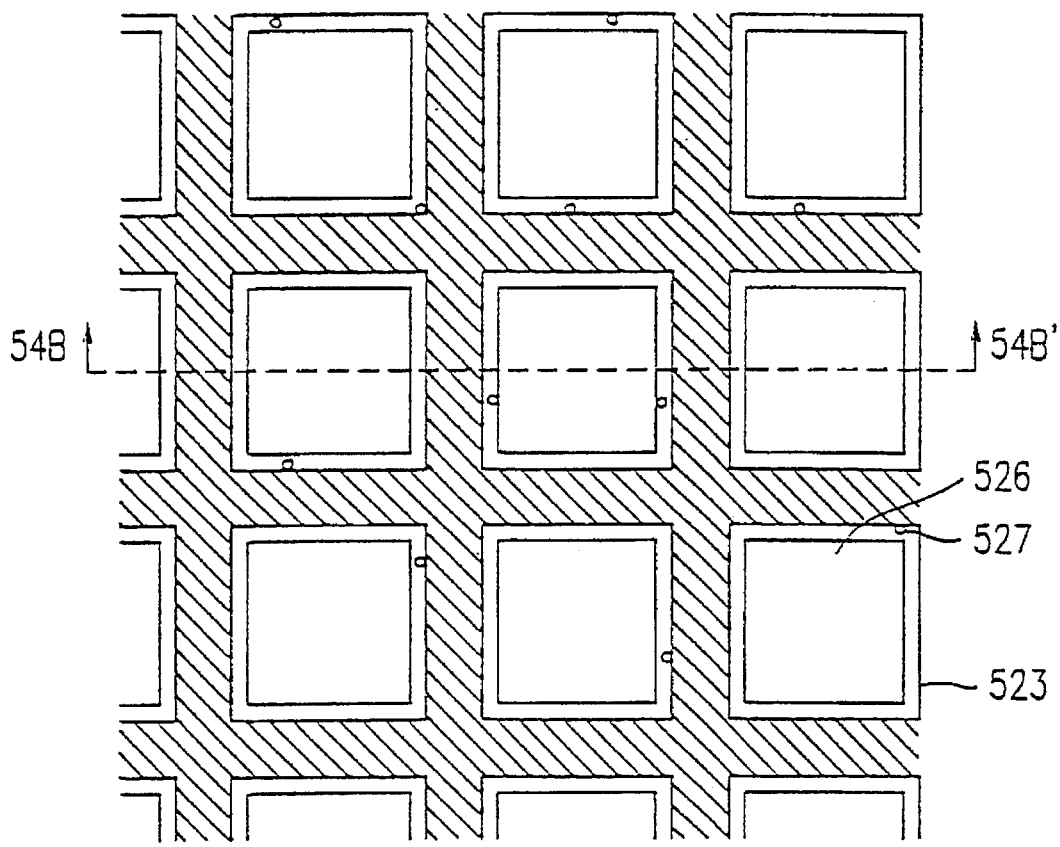
FIG. 54A is a plan view of an insulating film patterned using the photomask shown in FIG. 53.
Figure 54B:
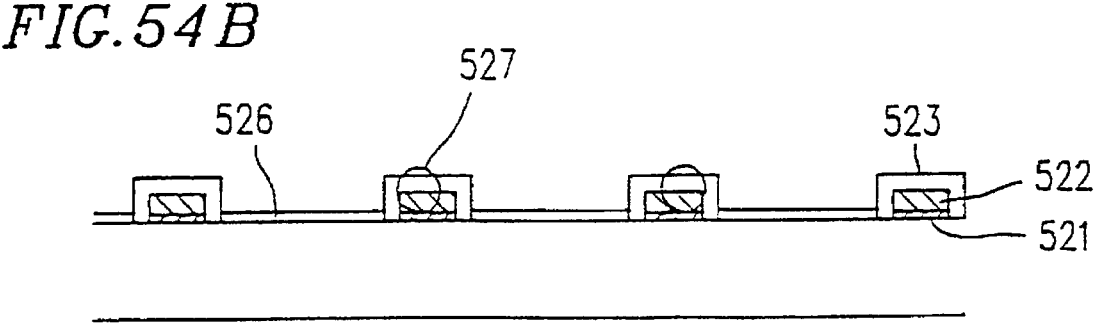
FIG. 54B is a cross-sectional view taken along a line 54B–54B' of FIG. 54A.

The substrate was exposed to light through a photomask 32 shown in FIG. 53, developed, rinsed, and baked again, Next, the resultant substrate was exposed to light through a photomask 32 shown in FIG. 53, developed, rinsed, and baked, whereby an insulating layer was formed on the substrate. At this time, although spacers remaining on pixels were not observed, spacers were deposited at the interfaces between the resist walls and the pixels.

The substrate was attached to the other glass substrate to construct a liquid crystal cell with a cell gap of 4.5 μm.

A mixture containing a liquid crystal material and a polymerizable material, similar to that of Example 36 was injected into the cell to produce a liquid crystal cell in the same way as in Example 36.

Figure 57:
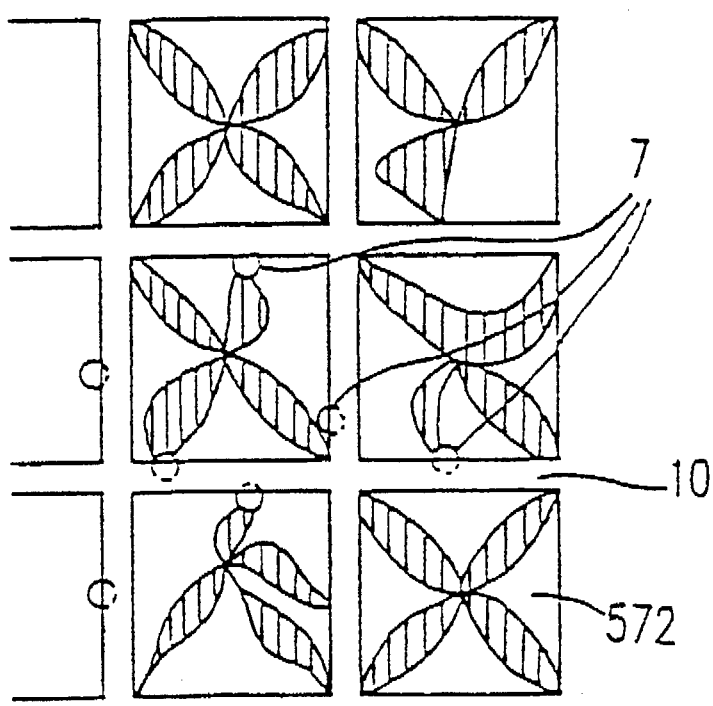
FIG. 57 is a view of a liquid crystal device in Comparative Example 12, observed with a polarizing microscope.

The cell thus obtained was observed with a polarizing microscope. Since there were less spacers in the pixels compared with Comparative Example 11, the axis-symmetrical orientation was less disturbed; however, the spacers 7 were deposited at the interfaces between the pixels 572 and the resist walls 10. Thus, the orientation was likely to be influenced by the spacers at the interfaces as shown in FIG. 57.

Next, two polarizing plates were attached to the cell so that polarizing axes were orthogonal to each other to produce a liquid crystal device. The electro-optic characteristics and the evaluation of roughness of the liquid crystal device are shown in Table 16.

Example 37

A liquid crystal device of Example 37 was produced.

First, OMR83 (15 cp) was uniformly coated onto a glass substrate similar to that of Example 36 by spin coating, and the substrate was baked at 80° C. for 30 minutes.

Then, OMR83 (60 cp) with 0.05% by weight of plastic beads having a particle size of 4.0 µm mixed therein was coated onto the substrate by spin coating.

The substrate was exposed to light through a photomask 31 shown in FIG. 51, developed, rinsed, and exposed to light, whereby an insulating layer was patterned on the substrate.

Next, OMR83 (60 cp) was coated onto the substrate by spin coating, and the substrate was baked at 80° C. for 30 minutes. Thereafter, the substrate was exposed to light through a photomask 32 as shown in FIG. 53, developed, rinsed, and baked at 120° C. for one hour. Observation with a microscope of the substrate subjected to the above-mentioned patterning revealed that no spacers were in pixels and spacers were not deposited at the interfaces between the resist and the pixels.

The substrate was attached to the other substrate to construct a cell. A mixture described later was injected into the cell by a vacuum injection method. The mixture contained 0.2 g of β-(perfluorooctyl)acrylate, 0.3 g of isobornyl acrylate, and 0.1 g of R-684 (produced by Nippon Kayaku Co., Ltd.) as a polymerizable material; 0.1 g of p-fluorostyrene as a photopolymerization retarder; and 4.25 g of ZLI-4792 (produced by Merck & Co., Inc.; containing 0.3% by weight of S-811) as a liquid crystal material; and 0.025 g of a photopolymerization initiator (Irgacure 651).

Then, in accordance with the method similar to that of Example 36, a liquid crystal cell was produced. The cell was observed with a polarizing microscope. As a result, relatively uniform axis-symmetrical orientation was obtained as shown in FIG. 55 in the same way as in Example 36; specifically, liquid crystal regions surrounded by polymer regions were in a mono-domain state with respect to each pixel, and the orientation in pixels was not disturbed by spacers. Furthermore, the cell was rotated under the condition that a polarizer and an analyzer of the microscope were fixed in a crossed-Nicols state. It seemed that extinction patterns in the liquid crystal regions were regularly positioned, and only polymer walls were rotated. It was understood from this fact that uniform axis-symmetrical orientation was obtained in almost all of the liquid crystal regions.

A liquid crystal device was produced in the same way as in Example 36 and the electro-optic characteristics thereof were measured. The results are shown in Table 16. The device was observed at an angle in gray scales under the application of a voltage; however, no roughness was observed.

As described above, in Examples 35 through 37, the cell gap is kept uniform by using spacers provided outside pixels or changes in display caused by external pressure are suppressed, whereby a liquid crystal device having outstanding strength and shock resistance and being applicable to a large area can be obtained. Furthermore, by suppressing unsatisfactory orientation of liquid crystal molecules in pixels caused by spacers, unsatisfactory orientation axes thereof, or formation of disclination lines; a high-quality display having a high contrast without any roughness, particularly in gray scales, can be obtained.

Example 38

In this example, a liquid crystal device, in which liquid crystal molecules are axis-symmetrically aligned without conducting a rubbing process, is produced.

A pair of glass substrates with a transparent electrode made of ITO similar to that of Example 1 were used. A polyimide material AL4552 (produced by Nippon Synthetic Rubber Co., Ltd.) used as an alignment film was coated onto one of the pair of substrates. Then, an insulating film similar to that of Example 19 was formed on the substrate and was patterned, whereby a gap keeping member composed of a wall-shaped insulating layer with spacers mixed therein was formed on the substrate.

A polyimide material AL4552 was formed on the other substrate, and both of the substrates were attached to each other using a sealant to construct a liquid crystal cell.

A liquid crystal composition ZLI-4801-000 (produced by Merck & Co., Inc.; containing 0.3% by weight of S-811, d/p(cell gap/ chiral pitch)=0.25) was injected into the cell by a vacuum injection method, so as to obtain a liquid crystal layer having 90 degree twist orientation.

Then, a heating step and a voltage application step similar to those of Example 4 were conducted for the purpose of controlling the orientation of liquid crystal molecules in liquid crystal regions of the liquid crystal panel, whereby a liquid crystal cell in which liquid crystal regions were homogeneously and axis-symmetrically aligned were produced in the same way as in Example 4.

In the liquid crystal panel produced in this example, unlike conventional uniaxial orientation, axis-symmetrical orientation effective for large viewing angle liquid crystal devices can be realized without applying a rubbing step used in the conventional liquid crystal cell. Furthermore, since the gap keeping member composed of an insulator including spacers is effectively formed in light-shielding layer regions outside pixels, uniformity of the cell gap is enhanced, and the strength of the panel and shock resistance can be remarkably improved.

As described above, according to the present invention, by keeping the cell gap uniform with an insulator provided outside pixels, a liquid crystal device having outstanding strength and shock resistance and being applicable to a large area can be obtained. Thus, it is not necessary to provide spacers in a liquid crystal layer or liquid crystal regions. A high-quality display having a high contrast without any roughness, particularly in gray scales, can be obtained by suppressing unsatisfactory orientation in liquid crystal molecules in pixels caused by spacers, unsatisfactory orientation axes thereof, and the formation of disclination lines.

Surface tension on a substrate is changed or a cell gap is changed by regulating the material and position of an insulator provided in or outside pixels, so that the position and configuration of polymer regions and liquid crystal regions can be controlled. Furthermore, liquid crystal molecules can be aligned in two or more directions, axis-symmetrically, or at random, by a non-rubbing process.

By selectively forming polymer regions outside pixels so as to combine with the insulator formed outside pixels, the changes in display caused by an external pressure can be suppressed, and shock resistance can be improved.

Furthermore, by patterning either one of or both of convex portions and concave portions at the center of each pixel on a substrate, liquid crystal molecules can be uniformly axis-symmetrically aligned with positions of orientation axes regularly aligned and a satisfactory display without any roughness can be obtained.

As an insulator provided outside pixels, at least one insulating film can be used partially or all around. In this case, when liquid crystal regions are grown from a mixture of a liquid crystal material and a polymerizable material by phase separation, a material for the insulator can be selected so that the liquid crystal regions are stably formed. When at least one colored additive such as a black additive is added to the insulator, the insulator can also be used as a BM, making disclination lines invisible. Furthermore, when spacers composed of at least inorganic material or organic material are included in the insulator, the resultant cell is not likely to be affected by use temperature environment, external pressure, etc., and a cell gap can be kept uniform.

In the case where the above-mentioned insulator is composed of at least two materials, a liquid crystal material is preferentially separated into pixels, and polymer regions are formed outside pixels due to the relationship in surface tension between the liquid crystal material and the polymerizable material.

When a voltage, a magnetic field, or both is applied to the cell during phase separation of the mixture, symmetry axes can be aligned in the vertical direction of the substrates, so that further uniform orientation control can be performed.

In the case where phase separation of the polymer material and the liquid crystal material is not used, orientation control can be performed without disturbing the orientation of the liquid crystal molecules by forming an alignment film controlling the alignment of the liquid crystal molecules on the substrate without alignment treatment.

By allowing liquid crystal molecules in liquid crystal regions to be axis-symmetrically aligned in each pixel and allowing spacers to be present only at symmetry axes of the liquid crystal regions or the vicinity thereof, the orientation axes of the liquid crystal molecules can be made present only at symmetry axes of the liquid crystal regions or the vicinity thereof. Thus, the liquid crystal molecules can be aligned axis-symmetrically with respect to the symmetry axes or the vicinity thereon, whereby a high quality liquid crystal device having a uniform display without any roughness can be obtained.

According to the present invention, in a liquid crystal device in which liquid crystal molecules are radially aligned in each pixel, adverse effects caused by the presence of spacers in pixels and at the interfaces between the pixels and the polymer walls on display characteristics such as the increase in roughness due to the disturbance of orientation of liquid crystal regions and positional shift of orientation axes can be prevented.

Furthermore, by stipulating the surface free energy of an insulator including spacers according to the present invention, the dispersion of the spacers becomes satisfactory and consequently, a preferred cell gap can be obtained. Because of this, it is not necessary to disperse spacers on a substrate by a wet or dry method, simplifying the steps and making them clean.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal device comprising a pair of substrates opposed to each other with a liquid crystal layer interposed therebetween, at least one of the substrates being transparent, wherein spacers covered with a light-shielding layer, provided so as to stipulate a size of each pixel, form gap keeping means for keeping a gap between the substrates, and liquid crystal molecules in the pixels are aligned in at least two directions, axis-symmetrically, or at random.

2. A liquid crystal device according to claim 1, wherein an insulator as the gap keeping means is formed outside the pixels.

3. A liquid crystal device comprising a pair of substrates opposed to each other with a composite containing polymer regions and liquid crystal regions interposed therebetween, at least one of the substrates being transparent, wherein spacers are present in the polymer regions outside pixels.

4. A liquid crystal device according to claim 3, wherein liquid crystal molecules in the liquid crystal regions are aligned in at least two directions, axis-symmetrically, or at random.

5. A liquid crystal device comprising a pair of substrates opposed to each other with a composite containing polymer regions and liquid crystal regions interposed therebetween, at least one of the substrates being transparent, wherein an insulator as gap keeping means for keeping a gap between the substrates is formed in the polymer regions.

6. A liquid crystal device according to claim 5, wherein liquid crystal molecules in the liquid crystal regions are aligned in at least two directions, axis-symmetrically, or at random.

7. A liquid crystal device according to claim 5, wherein the insulator as the gap keeping means is composed of at least one layer.

8. A liquid crystal device according to claim 7, wherein at least one of the insulator is composed of a photosensitive resin layer.

9. A liquid crystal device according to claim 7, wherein at least one layer of the insulator is composed of a polymer film.

10. A liquid crystal device according to claim 9, wherein the polymer film is composed of a dry film made of a photosensitive resin composition or a photosensitive polymer.

11. A liquid crystal device according to claim 5, wherein polymer walls made of a polymer film or a polymer sheet for partitioning the pixels are provided outside the pixels.

12. A liquid crystal device according to claim 10, wherein the polymer film is exposed to light and developed so as to be provided in a matrix.

13. A liquid crystal device according to claim 9, wherein spacers as the gap keeping means are included in the polymer film.

14. A liquid crystal device according to claim 9, wherein at least one pixel is surrounded by polymer walls made of the polymer film and a resin cured by phase separation of a mixture containing a photocurable resin and liquid crystal.

15. A liquid crystal device according to claim 9, wherein one or a plurality of insulator is formed on either face of the polymer film.

16. A liquid crystal device according to claim 15, wherein the insulator is composed of a photosensitive resin layer.

17. A liquid crystal device according to claim 9, wherein the polymer film contains dyes and functions as a light-shielding layer.

18. A liquid crystal device comprising a pair of substrates opposed to each other with a composite containing polymer regions and liquid crystal regions interposed therebetween, at least one of the substrates being transparent, the liquid crystal regions forming pixels, wherein an insulator composed of at least one layer is provided in the polymer regions, and spacers previously mixed in the at least one layer keep a gap between the substrates.

19. A liquid crystal device according to claim 18, wherein the pixels include at least one region in which the liquid crystal molecules are aligned in at least two directions, axis-symmetrically, or at random.

20. A liquid crystal device according to claim 18, wherein, as means for aligning the liquid crystal molecules in at least two directions, axis-symmetrically, or at random, polymer walls reaching both of the substrates are provided in the region in which the liquid crystal molecules are aligned in at least two directions, axis-symmetrically, or at random.

21. A liquid crystal device according to claim 18, wherein, as means for aligning the liquid crystal molecules in at least two directions, axis-symmetrically, or at random, either one of a convex portion and a concave portion is patterned at a center of the region in which the liquid crystal molecules are aligned in at least two directions, axis-symmetrically, or at random on at least one of the pair of substrates.

22. A liquid crystal device according to claim 1, wherein, as means for aligning the liquid crystal molecules in at least two directions, axis-symmetrically, or at random, spherulite is provided in the region in which the liquid crystal molecules are aligned in at least two directions, axis-symmetrically, or at random on at least one of the pair of substrates.

23. A liquid crystal device according to claim 18, wherein spacers are provided so as to be covered with an insulator at a center of the region in which the liquid crystal molecules are aligned in at least two directions, axis-symmetrically, or at random.

24. A liquid crystal device according to claim 2, wherein the spacers are fixed by a resin layer which is formed by patterning a resin with the spacers mixed therein, and a width D2 of a light-shielding layer covering the spacers satisfies a relationship: $D1+4r2<D2$, where D1 is a width of the resin layer, r2 is ½ of a length of the spacers in a width direction of the resin layer.

25. A liquid crystal device according to claim 3, wherein a width D of the polymer regions in which the spacers are present satisfies a relationship: $r1<A \leq D/2$, where r1 is ½ of a length of the spacers in a width direction of the polymer regions, and A is a distance from a center of the spacer in the width direction of the polymer regions to an end of the polymer regions.

26. A liquid crystal device according to claim 18, wherein a width D of the layer including spacers of the insulator satisfies a relationship: $r1<A \leq D/2$, where r1 is ½ of a length of the spacers in a width direction of the layer including the spacers of the insulator, and A is a distance from a center of the spacer in the width direction of the layer including spacers of the insulator to an end of the layer including spacers of the insulator.

27. A liquid crystal device according to claim 18, wherein the insulator is composed of a layer including spacers and at least one layer not including spacers, and a width D2 of the at least one layer not including spacers satisfies a relationship: $D1+4r2<D2$, where D1 is a width of the layer including the spacers, and r2 is ½ of a length of the spacers in a width direction of the layer including spacers.

28. A liquid crystal device according to claim 18, wherein the insulator is composed of a layer including spacers and at least one layer not including spacers, a width D of the layer including spacers satisfies a relationship: $r1<A \leq D/2$, where r1 is ½ of a length of the spacers in a width direction of the layer including the spacers of the insulator, and A is a distance from a center of the spacer in the width direction of the layer including spacers of the insulator to an end of the layer including spacers of the insulator, and a width D2 of the at least layer not including spacers satisfies a relationship: $D1+4r2<D2$, where D1 is a width of the layer including the spacers, and r2 is ½ of a length of the spacers in a width direction of the layer including spacers.

29. A method for producing a liquid crystal device of claim 1 comprising the steps of:

forming means for regulating orientation of a liquid crystal layer by a rubbingless process on at least one of a pair of substrates at least one of which is transparent;

patterning a light-shielding layer stipulating a size of pixels on the substrate with the means for regulating orientation formed thereon or on the other substrate and patterning a polymerizable material including spacers on the light-shielding layer, thereby forming gap keeping means for keeping a gap between the substrates;

attaching the pair of substrates so as to be opposed to each other to obtain a liquid crystal cell; and filling the liquid crystal cell with liquid crystal.

30. A method for producing a liquid crystal device comprising the steps of:

patterning a polymerizable material including spacers on one of a pair of substrates at least one of which is transparent;

attaching the pair of substrates so as to be opposed to each other and to have a uniform gap therebetween with the spacers to construct a liquid crystal cell; and filling the liquid crystal cell with a mixture containing at least a liquid crystal material and a polymerizable material, and allowing the mixture to be phase-separated by polymerization to provide polymer regions including portions corresponding to the patterned polymerizable material and liquid crystal regions in the other portions.

31. A method for producing a liquid crystal device comprising the steps of:

patterning an insulator as gap keeping means composed of at least one layer on one of a pair of substrates at least one of which is transparent;

attaching the pair of substrates so as to be opposed to each other and to have a uniform gap therebetween with the insulator to construct a liquid crystal cell;

filling the liquid crystal cell with a mixture containing at least a liquid crystal material and a polymerizable material, and allowing the mixture to be phase-separated by polymerization to provide polymer regions including portions corresponding to the insulator and liquid crystal regions in the other portions.

32. A method for producing a liquid crystal device according to claim 31, wherein a photosensitive resin is used for at least one layer of the insulator as the gap keeping means.

33. A method for producing a liquid crystal device comprising the steps of:

patterning an insulator composed of at least one photosensitive resin layer, at least one of which is mixed with spacers, on a pair of substrates at least one of which is transparent;

attaching the pair of substrates so as to be opposed to each other and to have a uniform gap therebetween with the spacers to construct a liquid crystal cell; and filling the liquid crystal cell with a mixture containing at least a liquid crystal material and a polymerizable material, and allowing the mixture to be phase-separated by polymerization to provide polymer regions including portions corresponding to the insulator and liquid crystal regions in the other portions.

34. A method for producing a liquid crystal device according to claim 33, wherein, in the step of allowing the mixture containing at least a liquid crystal material and a polymerizable material to be phase-separated by polymerization, the mixture is polymerized at a homogeneously miscible temperature or higher and phase-separated into the liquid crystal material and the polymerizable material, and the cell is cooled so as to regularly provide liquid crystal regions and polymer regions.

35. A method for producing a liquid crystal device according to claim 33, wherein, in the step of allowing the mixture containing at least a liquid crystal material and a polymerizable material to be phase-separated by polymerization, the mixture is cooled from a homogeneously miscible temperature, whereby the mixture is phase-separated by polymerization into the liquid crystal material and the polymerizable material so as to regularly provide liquid crystal regions and polymer regions.

36. A liquid crystal device comprising a pair of substrates with a composite containing polymer regions and liquid crystal regions interposed therebetween, at least one of which is transparent, wherein liquid crystal molecules are axis-symmetrically aligned with respect to axes made of an insulator in pixels and spacers are provided so as to be covered with the axes.

37. A liquid crystal device according to claim 36, wherein the axes made of the insulator are composed of a polymer.

38. A method for producing a liquid crystal device of claim 37, comprising the steps of:

forming polymer islands including spacers on one of a pair of substrates at least one of which is transparent;

attaching the pair of substrates so as to be opposed to each other and to have a uniform gap therebetween to construct a liquid crystal cell;

injecting a mixture containing at least a liquid crystal material and a polymerizable material in the liquid crystal cell; and polymerizing the mixture at a homogeneously miscible temperature or higher so as to phase-separate the mixture into a liquid crystal material and a polymerizable material, thereby providing liquid crystal regions around the polymer islands and polymer regions in the other portions.

39. A method for producing a liquid crystal device of claim 37, comprising the steps of:

forming polymer islands including spacers on one of or both of a pair of substrates at least one of which is transparent;

attaching the pair of substrates so as to be opposed to each other and to have a uniform gap therebetween to construct a liquid crystal cell;

injecting a mixture containing at least a liquid crystal material and a polymerizable material in the liquid crystal cell; and cooling the mixture from a homogeneously miscible temperature, thereby allowing the mixture to be phase-separated into the liquid crystal material and the polymerizable material and providing liquid crystal regions around the polymer islands and the polymer regions in the other portions.

40. A method for producing a liquid crystal device according to claim 33, wherein, in the step of patterning the polymerizable material including the spacers, the polymerizable material is patterned so that a width D of the polymerizable material satisfies a relationship: $r1<A \leq D/2$, where $r1$ is ½ of a length of the spacer in a width direction of the polymerizable material and A is a distance from a center of the spacer in the width direction of the polymerizable material to an end of the polymerizable material.

41. A method for producing a liquid crystal device according to claim 33, wherein, before or after the step of patterning the polymerizable material including the spacers, at least one layer different from the polymerizable material is patterned so that a width D2 thereof satisfies a relationship: $D1+4r2 \leq D2$, where D1 is a width of the polymerizable material including the spacers, and $r2$ is ½ of a length of the spacers in a width direction of the polymerizable material including the spacers.

42. A method for producing a liquid crystal device according to claim 33, wherein, in the step of patterning the polymerizable material including the spacers, the polymerizable material is patterned so that a width D of the polymerizable material satisfies a relationship: $r1<A \leq D/2$, where $r1$ is ½ of a length of the spacer in a width direction of the polymerizable material and A is a distance from a center of the spacer to an end of the polymerizable material, and before or after the step of patterning the polymerizable material including the spacers, at least one layer different from the polymerizable material is patterned so that a width D2 thereof satisfies a relationship: $D1+4r2<D2$, where D1 is a width of the polymerizable material including the spacers, and $r2$ is ½ of a length of the spacers in a width direction of the polymerizable material including the spacers.

43. A method for producing a liquid crystal device according to claim 33, wherein at least one of an electric field and a magnetic field is applied to the mixture provided between the pair of substrates during the phase separation and the polymerization.

44. A method for producing a liquid crystal device of claim 9 comprising the steps of:

preheating a substrate to which a polymer film is to adhere under pressure, the substrate being either one of a pair of substrates at least one of which is transparent;

allowing the polymer film to adhere to the substrate under pressure;

heating the polymer film and the substrate while allowing the polymer film to adhere to the substrate under pressure;

patterning the polymer film into an arbitrary shape;

attaching the pair of substrates to each other to obtain a liquid crystal cell; and filling the liquid crystal cell with a mixture containing at least a liquid crystal material and a polymerizable material, and allowing the mixture to be phase-separated polymerization to provide polymer regions including portions corresponding to the patterned polymer film and liquid crystal regions in the other portions.

45. A method for producing a liquid crystal device of claim 9, comprising the steps of:

patterning a polymer dry film outside pixels on either one of a pair of substrates at least one of which is transparent;

attaching the pair of substrates to each other to obtain a liquid crystal cell; and filling the liquid crystal cell with liquid crystal.

46. A liquid crystal device according to claim 18, wherein the insulator in a layered-shape including the spacers is composed of a polymerizable resin.

47. A liquid crystal device according to claim 46, wherein surface free energy of the polymerizable material after polymerized is about 70 mN/m or less.

48. A liquid crystal device according to claim 46, wherein a polar component of surface free energy of the polymerizable material after polymerized is in the range of about 5 mN/m to about 40 mN/m.

49. A liquid crystal device according to claim 47, wherein the polymerizable material is a photopolymerizable resin.

50. A liquid crystal device according to claim 47, wherein the polymerizable material is a thermally polymerizable resin.

51. A liquid crystal device according to claim 18, wherein at least one layer made of a polymerizable resin is formed on the layer made of the polymerizable material including the spacers.

52. A method for producing a liquid crystal device including a pair of substrates opposed to each other with a display medium interposed therebetween, at least one of which is transparent, comprising the steps of:

coating an insulator on at least one of the substrates (first insulating film coating step);

dispersing spacers over the insulator and coating another insulator thereon or coating an insulator including spacers on the insulator (second insulating film coating step);

patterning the insulator including the spacers with a pattern width D' satisfying a relationship: $D' \leq D-2S$, where D is a final pattern width, and S is a diameter of the spacers or a size thereof in a long axis direction (first patterning step);

coating an insulator on the substrate subjected to the first patterning step (third insulating film coating step);

patterning the insulator coated in the third insulating film coating step with the final pattern width D so that the spacers lying off an end of the insulator after the first patterning step and before the third insulating film coating step are covered with the insulator (second patterning step).

53. A method for producing a liquid crystal device according to claim 52, wherein the display medium is allowed to have liquid crystal regions in which liquid crystal molecules are aligned in at least two directions, axis-symmetrically, or at random and polymer regions.

54. A method for producing a liquid crystal device according to claim 52, wherein the display medium is allowed to have liquid crystal regions in which liquid crystal molecules are aligned in one direction and polymer regions.

55. A method for producing a liquid crystal device according to claim 52, wherein a photosensitive material is used as at least one layer of the insulator used in the first, second, and third insulating film coating steps.

56. A liquid crystal device according to claim 5, wherein the pixels include at least one region in which the liquid crystal molecules are aligned in at least two directions, axis-symmetrically, or at random.

* * * * *